US006723794B2

(12) United States Patent
Kawasaki et al.

(10) Patent No.: US 6,723,794 B2
(45) Date of Patent: Apr. 20, 2004

(54) OLEFIN THERMOPLASTIC ELASTOMER COMPOSITION COMPRISING CRYSTALLINE POLYOLEFIN RESIN AND ETHYLENE/α-OLEFIN/NONCONJUGATED POLYENE COPOLYMER RUBBER

(75) Inventors: Masaaki Kawasaki, Ichihara (JP); Keiji Okada, Ichihara (JP); Tetsuo Tojo, Ichihara (JP); Kyoko Kobayashi, Ichihara (JP); Yuichi Itoh, Ichihara (JP); Akira Uchiyama, Ichihara (JP); Toshiyuki Tsutsui, Waki-cho (JP); Toshihiro Sagane, Tokyo (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/066,575

(22) Filed: Feb. 6, 2002

(65) Prior Publication Data
US 2003/0096912 A1 May 22, 2003

Related U.S. Application Data

(63) Continuation of application No. 09/563,242, filed on May 1, 2000, now abandoned, which is a continuation of application No. 08/672,265, filed on Jun. 28, 1996, now abandoned.

(30) Foreign Application Priority Data

Jun. 29, 1995 (JP) .............................................. 7-164362
Nov. 13, 1995 (JP) .............................................. 7-294546

(51) Int. Cl.$^7$ ......................... C08L 23/02; C08L 23/16; C08L 47/00
(52) U.S. Cl. ......................... 525/213; 525/232; 525/194
(58) Field of Search ................................. 525/194, 211, 525/232

(56) References Cited

U.S. PATENT DOCUMENTS

| 3,904,470 A | 9/1975 | Fukuki et al. |
| 4,078,020 A | 3/1978 | Rose et al. |
| 4,140,732 A | 2/1979 | Schnetger et al. |
| 4,220,579 A | 9/1980 | Rinehart |
| 4,336,351 A | 6/1982 | Cinadr |
| 4,912,148 A | 3/1990 | Kim et al. |
| 5,011,891 A | 4/1991 | Spenadel et al. |
| 5,229,478 A | 7/1993 | Floyd et al. |
| 5,241,031 A | 8/1993 | Mehta |
| 5,290,886 A | 3/1994 | Ellui |
| 5,338,801 A | 8/1994 | Eppert et al. |
| 5,525,675 A | 6/1996 | Masuda et al. |
| 5,656,686 A | 8/1997 | Van Laak et al. |
| 5,763,532 A | 6/1998 | Harrington et al. |

FOREIGN PATENT DOCUMENTS

| EP | 0552946 A | 7/1993 |
| EP | 0748842 A | 12/1996 |
| GB | 1582279 | 1/1981 |
| JP | 55-071738 A | 5/1980 |
| JP | 02-113045 A | 4/1990 |
| JP | 04-114045 A | 4/1992 |
| JP | 07-041617 A | 2/1995 |
| JP | 07-113025 A | 5/1995 |
| JP | 08-337697 A | 12/1996 |
| KR | 97-4381 | 1/1997 |
| WO | WO 94/06858 A1 | 3/1994 |
| WO | WO 94/06859 A1 | 3/1994 |

OTHER PUBLICATIONS

Database WPI, Section CH, Week 9406, Derwent Publications, Ltd., London, GB, Abstract of Japanese Laid–Open Patent Publication No. 6–1887 (Jan. 11, 1994).
Williams et al., "Polymer Letters", vol. 6, pp. 621–624 (1968).

Primary Examiner—D. R. Wilson
(74) Attorney, Agent, or Firm—Burns, Doane, Swecker & Mathis, LLP

(57) ABSTRACT

An olefin thermoplastic elastomer composition comprises a crystalline polyolefin resin (A) and an ethylene/α-olefin/nonconjugated polyene copolymer rubber (B), and optionally a softener (C) and/or an inorganic filler (D), in a specific ratio. The copolymer rubber (B) is prepared by the use of a metallocene catalyst and comprises ethylene, an α-olefin of 3 to 20 carbon atoms and a nonconjugated polyene. This composition ca provide molded products of more excellent tensile strength, elongation at break, elastomeric properties (elongation set, permanent compression set, etc.), heat resistance and low-temperature properties than the conventional non-crosslinked olefin thermoplastic elastomers, even if the composition is in the non-crosslinked form. The composition in the partially or completely crosslinked form can provided molded products of more excellent low-temperature properties, tensile strength, elongation at break and elastomeric properties than the conventional vulcanized rubbers.

5 Claims, No Drawings

2

OLEFIN THERMOPLASTIC ELASTOMER COMPOSITION COMPRISING CRYSTALLINE POLYOLEFIN RESIN AND ETHYLENE/α-OLEFIN/NONCONJUGATED POLYENE COPOLYMER RUBBER

This is a continuation of application Ser. No. 09/563,242, filed May 1, 2000, which is now abandoned, which is a continuation of application Ser. No. 08/672,265, filed Jun. 28, 1996, which is now abandoned.

FIELD OF THE INVENTION

The present invention relates to olefin thermoplastic elastomers, and more particularly to olefin thermoplastic elastomer compositions capable of providing molded products having excellent tensile strength, elongation at break and elastomeric properties.

BACKGROUND OF THE INVENTION

Olefin thermoplastic elastomers have been widely used as elastomers of energy conservation type or resource conservation type, particularly as substituents for vulcanized rubbers, in the fields of, for example, automobile parts, industrial machine parts, electric or electronic parts and building materials.

The olefin thermoplastic elastomers can be divided into those in the crosslinked form and those in the non-crosslinked form. The non-crosslinked thermoplastic elastomers show small variability of quality and are available at low production cost because they need no crosslinking reaction in the preparation thereof. However, the crosslinked olefin thermoplastic elastomers are superior to the non-crosslinked thermoplastic elastomers in various properties such as tensile strength, elongation at break, elastomeric properties (e.g., elongation set, permanent compression set) and heat resistance. This is well known as described in detail in "Rubber Chemistry and Technology", vol. 53 (1980), p. 141, by A. Y. Coran et al.

The non-crosslinked or partially crosslinked olefin thermoplastic elastomers are described in, for example, Japanese Patent Publications No. 21021/1978, No. 18448/1980, No. 15741/1981, No. 15742/1981, No. 46138/1983, No. 56575/1983, No. 30376/1984 and No. 59139/1987.

As described above, the olefin thermoplastic elastomers include the non-crosslinked thermoplastic elastomers and the crosslinked thermoplastic elastomers, and the non-crosslinked thermoplastic elastomers are inferior to the conventionally known crosslinked thermoplastic elastomers in the tensile strength, elongation at break, elastomeric properties (e.g., elongation set, permanent compression set), heat resistance and low-temperature properties of the molded products thereof, while the crosslinked thermoplastic elastomers are inferior to the conventionally known vulcanized rubbers in the low-temperature properties, tensile strength, elongation at break and elastomeric properties of the molded products thereof. Further, both the non-crosslinked and crosslinked thermoplastic elastomers are superior to the conventionally known vulcanized rubbers such as those of natural rubber, EPDM, SBR, NBR and CR in the processability and cost but inferior in the tensile properties such as tensile strength and elongation at break.

Accordingly, now desired are development of non-crosslinked thermoplastic elastomer compositions capable of providing molded products having more excellent tensile strength, elongation at break, elastomeric properties (e.g., elongation set, permanent compression set), heat resistance and low-temperature properties than the conventionally known non-crosslinked thermoplastic elastomers and development of crosslinked thermoplastic elastomer compositions capable of providing molded products having more excellent low-temperature properties, tensile strength, elongation at break and elastomeric properties than the conventionally known vulcanized rubbers.

Also desired is development of olefin thermoplastic elastomer compositions capable of providing molded products having more excellent tensile properties such as tensile strength and elongation at break than the conventionally known vulcanized rubbers.

OBJECT OF THE INVENTION

It is, therefore, an object of the present invention to provide an olefin thermoplastic elastomer composition which can provide molded products of excellent tensile strength, elongation at break, elastomeric properties, heat resistance and low-temperature properties even when it is in the non-crosslinked form, and which can provide molded products of more excellent low-temperature properties, tensile strength, elongation at break and elastomeric properties than the conventionally known vulcanized rubbers when it is in the crosslinked form.

It is another object of the invention to provide a partially or completely crosslinked olefin thermoplastic elastomer composition capable of providing molded products having such excellent properties as mentioned above.

It is a further object of the invention to provide a partially or completely crosslinked olefin thermoplastic elastomer composition capable of providing molded products having more excellent tensile properties such as tensile strength and elongation at break than the conventionally known vulcanized rubbers.

SUMMARY OF THE INVENTION

The olefin thermoplastic elastomer composition of the invention is a thermoplastic elastomer composition comprising a crystalline polyolefin resin (A) in an amount of not less than 10 parts by weight and less than 60 parts by weight and an ethylene/α-olefin/nonconjugated polyene copolymer rubber (B) which comprises ethylene, an α-olefin of 3 to 20 carbon atoms and a nonconjugated polyene in an amount of not more than 90 parts by weight and more than 40 parts by weight, the total amount of said components (A) and (B) being 100 parts by weight, wherein the ethylene/α-olefin/nonconjugated polyene copolymer rubber (B) is obtained by random copolymerizing ethylene, an α-olefin of 3 to 20 carbon atoms and a nonconjugated polyene in the presence of a metallocene catalyst and has the following properties:

(1) said copolymer rubber contains (a) units derived from ethylene and (b) units derived from the (α-olefin of 3 to 20 carbon atoms in a molar ratio of 40/60 to 95/5 ((a)/(b));

(2) the iodine value is in the range of 1 to 50; and (3) the intrinsic viscosity (η), as measured in decalin at 135° C., is in the range of 0.1 dl/g to 10 dl/g.

Preferred embodiments of this thermoplastic elastomer composition are the following compositions (1) and (2).

The olefin thermoplastic elastomer composition (1) is a thermoplastic elastomer composition comprising a crystalline polyolefin resin (A) in an amount of not less than 10 parts by weight and less than 60 parts by weight and an ethylene/α-olefin/nonconjugated polyene copolymer rubber (B) which comprises ethylene, an α-olefin of 3 to 20 carbon atoms and a nonconjugated polyene in an amount of not more than 90 parts by weight and more than 40 parts by weight, the total amount of said components (A) and (B) being 100 parts by weight, wherein the ethylene/α-olefin/nonconjugated polyene copolymer rubber (B) is obtained by random copolymerizing ethylene, an α-olefin of 3 to 20 carbon atoms and a nonconjugated polyene in the presence of a metallocene catalyst and has the following properties:

(1) said copolymer rubber contains (a) units derived from ethylene and (b) units derived from the α-olefin of 3 to 20 carbon atoms in a molar ratio of 40/60 to 95/5 ((a)/(b));

(2) the iodine value is in the range of 1 to 50;

(3) the intrinsic viscosity (η), as measured in decalin at 135° C., is in the range of 0.1 dl/g to 10 dl/g, and (4) the ratio gη* of the intrinsic viscosity (η) of said copolymer rubber (B) determined in the property (3) to the intrinsic viscosity $(\eta)_{blank}$ of a linear ethylene-propylene copolymer having the same weight-average molecular weight (measured by a light scattering method) as the copolymer rubber (B) and having an ethylene content of 70% by mol, $(\eta)/(\eta)_{blank}$, is more than 0.95.

The ethylene/α-olefin/nonconjugated polyene copolymer rubber (B) for constituting the thermoplastic elastomer composition (1) preferably further has, in addition to the above properties (1) to (4), the following properties:

(5) the intensity ratio D of Tαβ to Tαα in the $^{13}$C-NMR spectrum, Tαβ/Tαα, is not more than 0.5;

(6) the B value, as determined by the $^{13}$C-NMR spectrum and the following equation, is in the range of 1.00 to 1.50, $$B \text{ value}=(P_{OE})/(2 \cdot (P_E) \cdot (P_O))$$

wherein ($P_E$) is a molar fraction of the units derived from ethylene (a) in the copolymer rubber (B), ($P_O$) is a molar fraction of the units derived from the α-olefin (b) in the copolymer rubber (B), and ($P_{OE}$) is a proportion of the number of the α-olefin/ethylene sequences to the number of all the dyad sequences in the copolymer rubber (B); and (7) the glass transition temperature (Tg), as measured by DSC, is not higher than −50° C.

The olefin thermoplastic elastomer composition (2) is a thermoplastic elastomer composition comprising a crystalline polyolefin resin (A) in an amount of not less than 10 parts by weight and less than 60 parts by weight and an ethylene/α-olefin/nonconjugated polyene copolymer rubber (B) which comprises ethylene, an α-olefin of 3 to 20 carbon atoms and a nonconjugated polyene in an amount of not more than 90 parts by weight and more than 40 parts by weight, the total amount of said components (A) and (B) being 100 parts by weight, wherein the ethylene/α-olefin/nonconjugated polyene copolymer rubber (B) is obtained by, in the presence of a metallocene catalyst, random copolymerizing ethylene, an α-olefin of 3 to 20 carbon atoms and a nonconjugated polyene containing, in one molecule, only one carbon-to-carbon double bond polymerizable by the metallocene catalyst among carbon-to-carbon double bonds and has the following properties:

(1) said copolymer rubber contains (a) units derived from ethylene and (b) units derived from the α-olefin of 3 to 20 carbon atoms in a molar ratio of 40/60 to 95/5 ((a)/(b));

(2) the iodine value is in the range of 1 to 50;

(3) the intrinsic viscosity (η), as measured in decalin at 135° C., is in the range of 1.0 dl/g to 10 dl/g; and (4) the ratio gη* of the intrinsic viscosity (η) of said copolymer rubber (B) determined in the property (3) to the intrinsic viscosity $(\eta)_{blank}$ of a linear ethylene/propylene copolymer having the same weight-average molecular weight (measured by a light scattering method) as the copolymer rubber (B) and having an ethylene content of 70% by mol, $(\eta)/(\eta)_{blank}$, is in the range of 0.2 to 0.95.

The olefin thermoplastic elastomer composition of the invention may contain 2 to 100 parts by weight of a softener (C) and/or 2 to 50 parts by weight of an inorganic filler (D) based on 100 parts by weight of the total amount of the crystalline polyolefin resin (A) and the ethylene/α-olefin/nonconjugated polyene copolymer rubber (B).

The olefin thermoplastic elastomer composition according to the invention can provide molded products of excellent low-temperature properties, tensile strength, elongation at break, elastomeric properties and heat resistance even if it is in the non-crosslinked form. The olefin thermoplastic elastomer composition in the partially or completely crosslinked form can provide molded products of more excellent low-temperature properties, tensile strength, elongation at break and elastomeric properties than the conventionally known vulcanized rubbers.

The other olefin thermoplastic elastomer composition according to the invention is a partially or completely crosslinked thermoplastic elastomer composition comprising a crystalline polyolefin resin (E) in an amount of 10 to 85 parts by weight and an ethylene/α-olefin copolymer rubber (F) which comprises ethylene and an α-olefin of 3 to 20 carbon atoms in an amount of 15 to 90 parts by weight, the total amount of said components (E) and (F) being 100 parts by weight, wherein the ethylene/α-olefin copolymer rubber (F) is obtained by random copolymerizing ethylene and an α-olefin of 3 to 20 carbon atoms in the presence of a metallocene catalyst and has the following properties:

(1) said copolymer rubber contains (a) units derived from ethylene and (b) units derived from the α-olefin of 3 to 20 carbon atoms in a molar ratio of 55/45 to 98/2 ((a)/(b));

(2) the density is in the range of 0.860 to 0.900 g/cm$^3$;

(3) the melt flow rate (ASTM D 1238, 230° C., load of 2.16 kg) is in the range of 0.01 to 20 g/10 min; and (4) the intrinsic viscosity (η), as measured in decalin at 135° C., is in the range of 0.1 dl/g to 10 dl/g.

Preferred embodiments of this thermoplastic elastomer composition are the following compositions (3) and (4).

The olefin thermoplastic elastomer composition (3) is a partially or completely crosslinked thermoplastic elastomer composition comprising a crystalline polyolefin resin (E) in an amount of 10 to 85 parts by weight and an ethylene/α-olefin copolymer rubber (F) which comprises ethylene and an α-olefin of 3 to 20 carbon atoms in an amount of 15 to 90 parts by weight, the total amount of said components (E) and (F) being 100 parts by weight, wherein the ethylene/α-olefin copolymer rubber (F) is obtained by random copolymerizing ethylene and an α-olefin of 3 to 20 carbon atoms in the presence of a metallocene catalyst and has the following properties:

(1) said copolymer rubber contains (a) units derived from ethylene and (b) units derived from the α-olefin of 3 to 20 carbon atoms in a molar ratio of 55/45 to 98/2 ((a)/(b));

(2) the density is in the range of 0.860 to 0.900 g/cm$^3$;

(3) the melt flow rate (ASTM D 1238, 230° C., load of 2.16 kg) is in the range of 0.01 to 20 g/10 min;

(4) the intrinsic viscosity (η), as measured in decalin at 135° C., is in the range of 0.1 dl/g to 10 dl/g; and (5) the ratio gη* of the intrinsic viscosity (η) of said copolymer rubber determined (F) in the property (4) to the intrinsic viscosity (η)$_{blank}$ of a linear ethylene/propylene copolymer having the same weight-average molecular weight (measured by a light scattering method) as the copolymer rubber (F) and having an ethylene content of 70% by mol, (η)/(η)$_{blank}$, is more than 0.95.

The ethylene/α-olefin copolymer rubber (F) for constituting the thermoplastic elastomer composition (3) preferably further has, in addition to the above properties (1) to (5), the following properties:

(6) the intensity ratio D of Tαβ to Tαα in the $^{13}$C-NMR spectrum, Tαβ/Tαα, is not more than 0.5;

(7) the B value, as determined by the $^{13}$C-NMR spectrum and the following equation, is in the range of 1.00 to 1.50;

$$B\ value=(P_{OE})/(2\cdot(P_E)\cdot(P_O))$$

wherein ($P_E$) is a molar fraction of the units derived from ethylene (a) in the copolymer rubber, ($P_O$) is a molar fraction of the units derived from the α-olefin (b) in the copolymer rubber (F), and ($P_{OE}$) is a proportion of the number of the α-olefin/ethylene sequences to the number of all the dyad sequences in the copolymer rubber (F); and (8) the glass transition temperature (Tg), as measured by DSC, is not higher than −50° C.

The olefin thermoplastic elastomer composition (4) is a partially or completely crosslinked thermoplastic elastomer composition comprising a crystalline polyolefin resin (E) in an amount of 10 to 85 parts by weight and an ethylene/α-olefin copolymer rubber (F) which comprises ethylene and an α-olefin of 3 to 20 carbon atoms in an amount of 15 to 90 parts by weight, the total amount of said components (E) and (F) being 100 parts by weight, wherein the ethylene/α-olefin copolymer rubber (F) is obtained by random copolymerizing ethylene and an α-olefin of 3 to 20 carbon atoms in the presence of a metallocene catalyst and has the following properties:

(1) said copolymer rubber contains (a) units derived from ethylene and (b) units derived from the α-olefin of 3 to 20 carbon atoms in a molar ratio of 55/45 to 98/2 ((a)/(b));

(2) the density is in the range of 0.860 to 0.900 g/cm$^3$;

(3) the melt flow rate (ASTM D 1238, 230° C., load of 2.16 kg) is in the range of 0.01 to 20 g/10 min;

(4) the intrinsic viscosity (η), as measured in decalin at 135° C., is in the range of 0.1 dl/g to 10 dl/g; and (5) the ratio gη* of the intrinsic viscosity (η) of said copolymer rubber (F) determined in the property (4) to the intrinsic viscosity (η)$_{blank}$ of a linear ethylene/propylene copolymer having the same weight-average molecular weight (measured by a light scattering method) as the copolymer rubber (B) and having an ethylene content of 70% by mol, (η)/(η)$_{blank}$, is in the range of 0.2 to 0.95.

The other olefin thermoplastic elastomer composition may comprise the crystalline polyolefin resin (E) in an amount of 10 to 85 parts by weight, the ethylene/α-olefin copolymer rubber (F) in an amount of 15 to 90 parts by weight, and an olefin rubber (G) in an amount of 1 to 40 parts by weight and/or a softer (H) in an amount of 1 to 40 parts (the total amount of said components (E), (F), (G) and (H) being 100 parts by weight). In this composition, a ratio of the total amount of the components (E), (F) and (G) to the total amount of the components (E), (F), (G) and (H) is in the range of 60 to 100% by weight.

This olefin thermoplastic elastomer composition can provide molded products of more excellent tensile properties such as tensile strength and elongation at break than the conventionally known vulcanized rubbers.

DETAILED DESCRIPTION OF THE INVENTION

The olefin thermoplastic elastomer compositions according to the invention are described in detail hereinafter.

One of the olefin thermoplastic elastomer compositions of the invention is a non-crosslinked thermoplastic elastomer composition or a partially or completely crosslinked thermoplastic elastomer composition, and comprises a crystalline polyolefin resin (A) and an ethylene/α-olefin/nonconjugated polyene copolymer rubber (B) (or copolymer rubber (B)).

The other of the olefin thermoplastic elastomer compositions of the invention is a partially or completely crosslinked thermoplastic elastomer composition, and comprises a crystalline polyolefin resin (E) and an ethylene/α-olefin polyene copolymer rubber (F) (or copolymer rubber (F)).

First, the former olefin thermoplastic elastomer composition of the invention is described.

Crystalline Polyolefin Resin (A)

The crystalline polyolefin resin (A) used in the invention is a crystalline, high-molecular weight solid obtained by polymerizing at least one kind of monoolefin by means of either a high-pressure method or a low-pressure method. Examples of such resins include isotactic and syndiotactic monoolefin polymer resins, and their typical resins are commercially available.

Examples of the olefins suitably used for preparing the crystalline polyolefin resin (A) include ethylene, propylene, 1-butene, 1-pentene, 1-hexene, 1-octene, 1-decene, 2-methyl-1-propene, 3-methyl-1-pentene, 4-methyl-1-pentene and 5-methyl-1-hexene. These olefins are used singly or in combination of two or more kinds.

Any polymerization process such as random polymerization process or block polymerization process may be adopted, as far as a resinous product is obtained.

The crystalline polyolefin resins may be used singly or in combination of two or more kinds.

The crystalline polyolefin resin (A) used in the invention desirably has MFR (ASTM D 1238-65T, 230° C.) of usually 0.01 to 100 g/10 min, preferably 0.05 to 50 g/10 min.

The crystalline polyolefin resin (A) serves to enhance fluidity and heat resistance of the resulting composition.

In the present invention, the crystalline polyolefin resin (A) is used in an amount of not less than 10 parts by weight and less than 60 parts by weight, preferably 20 to 55 parts by weight, based on 100 parts by weight of the crystalline polyolefin resin (A) and the ethylene/α-olefin/nonconjugated polyene copolymer rubber (B).

When the crystalline polyolefin resin (A) is used in the above-mentioned amount, an olefin thermoplastic elastomer composition having excellent elastomeric properties and molding processability can be obtained.

Ethylene/α-olefin/nonconjugated Polyene Copolymer Rubber (B)

The ethylene/α-olefin/nonconjugated polyene copolymer rubber (B) is obtained by random copolymerizing ethylene, an α-olefin of 3 to 20 carbon atoms and a nonconjugated polyene in the presence of the later-described specific metallocene catalyst.

In the present invention, the ethylene/α-olefin/nonconjugated polyene copolymer rubber (B) is used in an amount of not more than 90 parts by weight and more than 40 parts by weight, preferably 80 to 45 parts by weight, based on 100 parts by weight of the total amount of the crystalline polyolefin resin (A) and the ethylene/α-olefin/nonconjugated polyene copolymer rubber (B).

An ethylene/α-olefin/nonconjugated polyene copolymer rubber (B1), or copolymer rubber (B1), for constituting the preferred olefin thermoplastic elastomer composition (1) of the invention has a linear molecular structure, and an ethylene/α-olefin/nonconjugated polyene copolymer rubber (B2), or copolymer rubber (B2), for constituting the preferred olefin thermoplastic elastomer composition (2) of the invention has a long-chain branched molecular structure.

α-Olefin

Examples of the α-olefins of 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These α-olefins may be used in combination.

Of these, α-olefins of 4 to 10 carbon atoms, particularly 1-butene, 1-hexene, 1-octene and 1-decene, are preferred as the α-olefins for forming the linear ethylene/α-olefin/nonconjugated polyene copolymer rubber (B1).

On the other hand, α-olefins of 3 to 10 carbon atoms, particularly propylene, 1-butene, 1-hexene and 1-octene, are preferred as the α-olefins for forming the long-chain branched ethylene/α-olefin/nonconjugated polyene copolymer rubber (B2).

Nonconjugated Polyene

Examples of the nonconjugated polyenes for forming the linear ethylene/α-olefin/nonconjugated polyene copolymer rubber (B1) include aliphatic polyenes, alicyclic polyenes and aromatic polyenes.

Particular examples of the aliphatic polyenes include:
1,4-hexadiene, 1,5-hexadiene, 1,6-heptadiene, 1,6-octadiene, 1,7-octadiene, 1,8-nonadiene, 1,9-decadiene, 1,13-tetradecadiene, 1,5,9-decatriene,
3-methyl-1,4-hexadiene, 4-methyl-1,4-hexadiene, 5-methyl-1,4-hexadiene, 4-ethyl-1,4-hexadiene, 3-methyl-1,5-hexadiene, 3,3-dimethyl-1,4-hexadiene, 3,4-dimethyl-1,5-hexadiene,
5-methyl-1,4-heptadiene, 5-ethyl-1,4-heptadiene, 5-methyl-1,5-heptadiene, 6-methyl-1,5-heptadiene, 5-ethyl-1,5-heptadiene, 3-methyl-1,6-heptadiene, 4-methyl-1,6-heptadiene, 4,4-dimethyl-1,6-heptadiene, 4-ethyl-1,6-heptadiene,
4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene,
4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene,
5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene,
6-methyl-1,6-undecadiene and 9-methyl-1,8-undecadiene.

Particular examples of the alicyclic polyenes include:
vinylcyclohexene, vinylnorbornene, ethylidene norbornene, dicyclopentadiene, cyclooctadiene, 2,5-norbornadiene,
1,4-divinylcyclohexane, 1,3-divinylcyclohexane, 1,3-divinylcyclopentane, 1,5-divinylcyclooctane, 1-allyl-4-vinylcyclohexane, 1,4-diallylcyclohexane, 1-allyl-5-vinylcycloocatane, 1,5-diallylcyclooctane, 1-allyl-4-isopropenylcyclohexane, 1-isopropenyl-4-vinylcyclohexane and 1-isopropenyl-3-vinylcyclopentane.

Particular examples of the aromatic polyenes include divinylbenzene and vinylisopropenylbenzene.

Of these, preferably used are nonconjugated polyenes having 7 or more carbon atoms, for example, methyloctadiene (MOD) such as 7-methyl-1,6-octadiene, ethylidene norbornene (ENB) such as 5-ethylidene-2-norbornene, and dicyclopentadiene (DCPD).

These nonconjugated polyenes can be used singly or in combination of two or more kinds.

The nonconjugated polyene for forming the long-chain branched ethylene/α-olefin/nonconjugated polyene copolymer rubber (B2) is a nonconjugated polyene containing, in one molecule, only one carbon-to-carbon double bond polymerizable by a metallocene catalyst among carbon-to-carbon double bonds. In this nonconjugated polyene, a chain polyene having vinyl groups at the both ends is not included. When one vinyl group out of the two or more vinyl groups is an end vinyl group, it is preferable that other vinyl groups are not the other end vinyl group but form an inside olefinic structure.

Examples of such nonconjugated polyenes include aliphatic polyenes and alicyclic polyenes.

More specifically, there can be mentioned aliphatic polyenes such as:
1,4-hexadiene, 3-methyl-1,4-hexadiene, 4-methyl-1,4-hexadiene, 5-methyl-1,4-hexadiene, 4-ethyl-1,4-hexadiene, 3-methyl-1,5-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene and 9-methyl-1,8-undecadiene.

Preferred alicyclic polyenes are those consisting of alicyclic parts having one unsaturated bond and chain parts having inside olefinic bond, and examples thereof include 5-ethylidene-2-norbornene, 5-isopropylidene-2-norbornene and 6-chloromethyl-5-isopropenyl-2-norbornene.

Also employable are trienes such as 2,3-diisopropylidene-5-norbornene and 2-ethylidene-3-isopropylidene-5-norbornene.

Of the above nonconjugated polyenes, particularly preferable are 5-ethylidene-2-norbornene and 1,4-hexadiene.

These nonconjugated polyenes can be used singly or in combination of two or more kinds.

Properties of Linear Ethylene/α-olefin/non-conjugated Polyene Copolymer Rubber (B1)

The linear ethylene/α-olefin/nonconjugated polyene copolymer rubber (B1) preferably used in the invention has the following properties.

(1) Ethylene/α-olefin Component Ratio

The ethylene/α-olefin/nonconjugated polyene copolymer rubber (B1) used in the invention contains (a) units derived from ethylene, or ethylene units (a), and (b) units derived from the α-olefin of 3 to 20 carbon atoms (sometimes referred to simply as "α-olefin" hereinafter), or α-olefin units (b), in a molar ratio of 40/60 to 95/5 (ethylene units (a)/α-olefin units (b)), preferably 40/60 to 90/10, particularly preferably 50/50 to 85/15.

The ethylene/α-olefin/nonconjugated polyene copolymer rubber having an ethylene/α-olefin component ratio within the above range is excellent in both the low-temperature flexibility and heat resistance. If the ethylene/α-olefin component ratio exceeds 95/5, the copolymer rubber comes to exhibit resinous properties to deteriorate the low-temperature flexibility. On the other hand, if the ethylene/α-olefin component ratio is less than 40/60, the heat resistance of the copolymer rubber tends to be lowered.

(2) Iodine Value

The iodine value of the ethylene/α-olefin/nonconjugated polyene copolymer rubber (B1), that is one index of the amount of the nonconjugated polyene component in the copolymer rubber (B1), is in the range of 1 to 50, preferably 1 to 30.

(3) Intrinsic Viscosity (η)

The intrinsic viscosity (η) of the ethylene/α-olefin/nonconjugated polyene copolymer rubber (B1), as measured in decalin at 135° C., is in the range of 0.1 to 10 dl/g, preferably 1.5 to 7 dl/g.

(4) gη* Value

The gη* value determined by the intrinsic viscosity (η) of the linear ethylene/α-olefin/nonconjugated polyene copolymer rubber (B1) exceeds 0.95.

The gη* value is defined by the following equation:

$$g\eta^* = (\eta)/(\eta)_{blank}$$

wherein (η) is an intrinsic viscosity measured in the property (3), and $(\eta)_{blank}$ is an intrinsic viscosity of a linear ethylene/propylene copolymer which has the same weight-average molecular weight (measured by a light scattering method) as the copolymer rubber (B1) and has an ethylene content of 70% by mol.

From the linear ethylene/α-olefin/nonconjugated polyene copolymer rubber (B1) having such properties as mentioned above, a thermoplastic elastomer composition and a molded product thereof both of which are excellent not only in mechanical strength, weathering resistance and ozone resistance but also in low-temperature resistance (low-temperature flexibility) and heat resistance can be obtained.

It is preferable that the linear ethylene/α-olefin/nonconjugated polyene copolymer rubber (B1) further has the following properties (5) to (7).

(5) D Value

The intensity (area) ratio D of Tαβ to Tαα in the $^{13}$C-NMR spectrum of the ethylene/α-olefin/nonconjugated polyene copolymer rubber (B1), Tαβ/Tαα, is not more than 0.5, preferably not more than 0.3.

The intensity ratio D of the copolymer rubber (B1) varies depending on the kind of the α-olefin used for forming the copolymer rubber (B1).

Tαβ and Tαα in the $^{13}$C-NMR spectrum are each a peak intensity of $CH_2$ in the units derived from the α-olefin, and each respectively represents either of two kinds of $CH_2$ having different positions to the tertiary carbon as shown below.

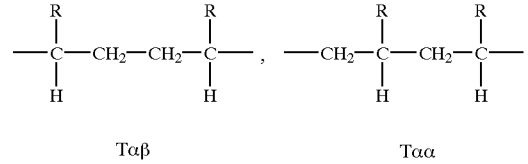

Tαβ            Tαα

The intensity ratio D of the copolymer rubber can be determined in the following manner.

The $^{13}$C-NMR spectrum of the copolymer rubber is obtained by measuring a mixture solution of hexachlorobutadiene with a sample (concentration: 5% by weight)/$d_6$-benzene (2/1 by volume) by means of a NMR measuring device (e.g., JEOL-GX270 manufactured by Japan Electron Optics Laboratory Co., Ltd.) at 25° C. and 67.8 MHz on the basis of $d_6$-benzene (128 ppm).

Analysis of the $^{13}$C-NMR spectrum was basically carried out in accordance with the proposals of Lindemann Adams (Analysis Chemistry 43, p1245 (1971)) and J. C. Randall (Review Macromolecular Chemistry Physics, C29, 201 (1989)).

The intensity ratio D is now described in more detail with reference to an ethylene/1-butene/7-methyl-1,6-octadiene copolymer rubber.

In the $^{13}$C-NMR spectrum of the ethylene/1-butene/7-methyl-1,6-octadiene copolymer rubber, the peak appearing at 39 to 40 ppm is assigned to Tαα, and the peak appearing at 31 to 32 ppm is assigned to Tαβ.

The intensity ratio D is calculated as a ratio between the integrated values of those peak areas.

The intensity ratio D thus determined is considered as an index of a proportion of occurrence of the 2,1-addition reaction of 1-butene subsequent to the 1,2-addition reaction or an index of a proportion of occurrence of the 1,2-addition reaction sebsequent to the 2,1-addition reaction. Therefore, the larger the intensity ratio D becomes, the more irregular the linkage direction of the α-olefin (1-butene) becomes. To the contrary, the smaller the D value becomes, the more regular the linkage direction of the α-olefin (1-butene) becomes. When the regularity is high, the molecular chains tend to be assembled and the copolymer rubber tends to have high strength and is preferred.

In the present invention, a copolymer rubber (B1) having an intensity ratio D of not more than 0.5 is obtained by copolymerizing ethylene, an α-olefin and a nonconjugated polyene using a specific Group IVB metallocene catalyst as described later. However, even if ethylene, 1-butene and 7-methyl-1,6-octadiene are copolymerized in the presence of a Group VB metallocene (e.g., vanadium) catalyst, an ethylene/1-butene/7-methyl-1,6-octadiene copolymer rubber having an intensity ratio D of not more than 0.5 cannot be obtained. The same applies to other α-olefins than 1-butene.

(6) B Value

The B value of the ethylene/α-olefin/nonconjugated polyene copolymer rubber (B1), as determined by the $^{13}$C-NMR spectrum and the following equation, is in the range of 1.00 to 1.50.

$$B\ \text{value}=(P_{OE})/(2\cdot(P_E)\cdot(P_O))$$

wherein ($P_E$) is a molar fraction of the ethylene units (a) in the copolymer rubber; ($P_O$) is a molar fraction of the α-olefin units (b) in the copolymer rubber; and ($P_{OE}$) is a proportion of a number of the α-olefin/ethylene sequences to a number of all the dyad sequences in the copolymer rubber.

This B value is an index of distribution of the ethylene and the α-olefin in the copolymer rubber, and it can be determined based on the reports by J. C. Randall (Macromolecules, 15, 353 (1982)) and J. Ray (Macromolecules, 10, 773 (1977)).

The larger the B value becomes, the shorter the block-like sequence of the ethylene or the α-olefin becomes, and this shows that the sequence distribution of the ethylene and the α-olefin is uniform and the composition distribution of the copolymer rubber is narrow. The smaller the B value becomes (particularly smaller than 1.00), the composition distribution of the copolymer rubber is widened, and such copolymer rubber does not sufficiently exhibit its properties such as strength when vulcanized, differently from a copolymer rubber of narrow composition distribution.

In the present invention, a copolymer rubber (B1) having a B value of 1.00 to 1.50 is obtained by copolymerizing ethylene, an α-olefin and a nonconjugated polyene using a specific Group IVB metallocene catalyst as described later. However, even if ethylene, an α-olefin and a nonconjugated polyene are copolymerized in the presence of a non-metallocene type titanium catalyst, an ethylene/α-olefin/nonconjugated polyene copolymer rubber having a B value within the above range cannot be obtained.

(7) Glass Transition Temperature

The Glass Transition Temperature (Tg) of the ethylene/α-olefin/nonconjugated polyene copolymer rubber (B1), as measured by DSC (differential scanning calorimeter), is preferably not higher than −50° C.

From the copolymer rubber (B1) having a glass transition temperature (Tg) of not higher than −50° C., a thermoplastic elastomer composition of good low-temperature flexibility can be obtained.

The ethylene/α-olefin/nonconjugated polyene copolymer rubber (B1) used in the invention, e.g., a random copolymer rubber of ethylene, 1-butene and ethylidene norbornene (ENB), has a glass transition temperature (Tg) lower by about 5 to 10° C. than that of an ethylene/propylene/ENB random copolymer rubber (EPDM) having the same monomer ratio among ethylene, α-olefin and polyene as this copolymer rubber, and this copolymer rubber exhibits excellent low-temperature properties.

Properties of Long-chain Branched Ethylene/α-olefin/nonconjugated Polyene Copolymer Rubber (B2)

The long-chain branched ethylene/α-olefin/nonconjugated polyene copolymer rubber (B2) preferably used in the invention has the following properties.

(1) Ethylene/α-olefin Component Ratio

The ethylene/α-olefin/nonconjugated polyene copolymer rubber (B2) used in the invention contains (a) units derived from ethylene, or ethylene units (a), and (b) units derived from the α-olefin of 3 to 20 carbon atoms (sometimes referred to simply as "α-olefin" hereinafter), or α-olefin units (b), in a molar ratio of 40/60 to 95/5 (ethylene units (a)/α-olefin units (b)), preferably 55/45 to 90/10.

(2) Iodine Value

The iodine value of the ethylene/α-olefin/nonconjugated polyene copolymer rubber (B2) is in the range of 1 to 50, preferably 5 to 40.

The ethylene/α-olefin/nonconjugated polyene copolymer rubber having an iodine value within the above range has a high vulcanization rate and can be vulcanized at a high speed.

(3) Intrinsic Viscosity (η)

The intrinsic viscosity (η) of the ethylene/α-olefin/nonconjugated polyene copolymer rubber (B2), as measured in decalin at 135° C., is in the range of 1.0 to 10 dl/g, preferably 1.2 to 6 dl/g, more preferably 1.5 to 5 dl/g.

(4) gη* Value

The gη* value of the long-chain branched ethylene/α-olefin/nonconjugated polyene copolymer rubber (B2) is in the range of 0.2 to 0.95, preferably 0.4 to 0.9, more preferably 0.5 to 0.85. This gη* value is determined by the method previously described.

By the fact that the gη* value of the ethylene/α-olefin/nonconjugated polyene copolymer rubber is not more than 0.95, it is indicated that a long-chain branch is formed in the molecule.

Preparation of Ethylene/α-olefin/nonconjugated Polyene Copolymer Rubber (B)

The linear or long-chain branched ethylene/α-olefin/nonconjugated polyene copolymer rubber (B) is prepared by random copolymerizing ethylene, an α-olefin or 3 to 20 carbon atoms and a nonconjugated polyene in the presence of a specific metallocene catalyst.

There is no specific limitation on the metallocene catalyst employable in the invention, except that the metallocene catalyst contains a metallocene compound [a]. For example, the metallocene catalyst may be formed from the metallocene compound [a] and an organoaluminum oxy-compound [b] and/or a compound [c] which reacts with the metallocene compound [a] to form an ion pair, or the catalyst may be formed from the metallocene compound [a], the organoaluminum compound [b] and/or the compound [c], and the organoaluminum compound [d].

Details of the metallocene catalyst and the copolymerization process will be described later.

Other Components

The olefin thermoplastic elastomer composition (1), (2) according to the invention may further contain a softener (C) and/or an inorganic filler (D), in addition to the crystalline polyolefin resin (A) and the ethylene/α-olefin/nonconjugated polyene copolymer rubber (B).

As the softener (C), those conventionally used for rubbers are employable.

Examples of such softeners include:

petroleum type materials, such as process oil, lubricating oil, paraffin, liquid paraffin, petroleum asphalt and vaseline;

coal tars, such as coal tar and coal tar pitch;

fatty oils, such as castor oil, linseed oil, rapeseed oil, soybean oil and coconut oil;

waxes, such as tall oil, beeswax, carnauba wax and lanolin;

fatty acids and metallic salts thereof, such as ricinolic acid, palmitic acid, stearic acid, barium stearate and calcium stearate;

synthetic polymer materials, such as petroleum resin, coumarone-indene resin and atactic polypropylene;

ester type plasticizers, such as dioctyl phthalate, dioctyl adipate and dioctyl sebacate; and other softeners, such as microcrystalline wax, factice, liquid polybutadiene, modified liquid polybutadiene and liquid thiokol.

In the present invention, the softener (C) is used in an amount of not more than 200 parts by weight, preferably 2 to 100 parts by weight, more preferably 5 to 80 parts by weight, based on 100 parts by weight of the total amount of the crystalline polyolefin resin (A) and the ethylene/α-olefin/nonconjugated polyene copolymer rubber (B). When the softener (C) is used in this amount, the resulting thermoplastic elastomer composition shows good fluidity in the molding process, and the mechanical properties of its molded product are not deteriorated. If the amount of the softener (C) exceeds 200 parts by weight, the heat resistance and the thermal aging resistance of the resulting thermoplastic elastomer composition tend to lower.

Examples of the inorganic filler (D) employable in the invention include calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass balloon, Shirasu balloon, basic magnesium sulfate whisker, calcium titanate whisker and aluminum borate whisker.

In the present invention, the inorganic filler (D) is used in an amount of not more than 100 parts by weight, preferably 2 to 50 parts by weight, based on 100 parts by weight of the total amount of the crystalline polyolefin resin (A) and the ethylene/α-olefin/nonconjugated polyene copolymer rubber (B). If the amount of the inorganic filler (D) exceeds 100 parts by weight, the elastomeric properties and the molding processability of the resulting thermoplastic elastomer composition tend to lower.

The olefin thermoplastic elastomer composition of the invention may further contain an ethylene/propylene copolymer rubber (EPR) and an ethylene/propylene/nonconjugated diene copolymer rubber (EPDM), in addition to the crystalline polyolefin resin (A), the ethylene/α-olefin/nonconjugated polyene copolymer rubber (B), the softener (C) and the inorganic filler (D).

Examples of the ethylene/propylene/nonconjugated diene copolymer rubbers include an ethylene/propylene/5-ethylidene-2-norbornene copolymer rubber and an ethylene/propylene/dicyclopentadiene copolymer rubber.

In the invention, the ethylene/propylene copolymer rubber (EPR) or the ethylene/propylene/nonconjugated diene copolymer rubber (EPDM) is used in an amount of preferably 10 to 200 parts by weight, more preferably 20 to 150 parts by weight, based on 100 parts by weight of the total amount of the crystalline polyolefin resin (A) and the ethylene/α-olefin/nonconjugated polyene copolymer rubber (B).

To the olefin thermoplastic elastomer composition (1), (2) of the invention, additives such as conventionally known heat stabilizer, anti-aging agent, weathering stabilizer, anti-static agent, metallic soap and lubricant (e.g., wax) can be further added as far as it is not prejudicial to the objects of the invention.

Of the olefin thermoplastic elastomer compositions of the invention, the non-crosslinked thermoplastic elastomer composition is obtained by a process comprising mixing the crystalline polyolefin resin (A) and the ethylene/α-olefin/nonconjugated polyene copolymer rubber (B) and optionally the softener (C) and/or the inorganic filler (D) and then dynamically heat-treating the resulting mixture.

The partially or completely crosslinked thermoplastic elastomer composition according to the invention is obtained by dynamically heat-treating a mixture of the crystalline polyolefin resin (A) and the ethylene/α-olefin/nonconjugated polyene copolymer rubber (B) and optionally the softener (C) and/or the inorganic filler (D) in the presence of the below-described organic peroxide so as to partially or completely crosslink the mixture.

By the term "dynamically heat-treating" is meant that a mixture is kneaded in a molten state.

Examples of the organic peroxides employable in the invention include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide.

Of these, 2,5-dimethyl-2,5-di-(tert-butylperoxy)hexane, 2,5-dimethyl-2,5-di-(tert-butylperoxy)hexyne-3 and 1,3-bis(tert-butylperoxyisopropyl)benzene are preferable from the viewpoints of odor and scorch stability. Among them, most preferred is 2,5-dimethyl-2,5-di-(tert-butylperoxy)hexane.

The organic peroxide is used in an amount of 0.02 to 3 parts by weight, preferably 0.05 to 1 part by weight, based on 100 parts by weight of the whole object to be treated, i.e., based on 100 parts by weight of the total amount of the crystalline polyolefin resin (A) and the ethylene/α-olefin/nonconjugated polyene copolymer rubber (B). If the amount of the organic peroxide is less than the above-mentioned amount, the heat resistance, tensile properties, elastic recovery and impact resilience of the resulting thermoplastic elastomer composition become insufficient because of low degree of crosslinking. If the amount thereof exceeds the above-mentioned amount, the degree of crosslinking of the resulting thermoplastic elastomer composition becomes too high, sometimes resulting in lowering of moldability.

In the crosslinking treatment with the organic peroxide, there can be added peroxy crosslinking assistants, such as sulfur, p-quinone dioxime, p,p'-dibenzoylquinone dioxime, N-methyl-N-4-dinitrosoaniline, nitrosobenzene, diphenylguanidine and trimethylolpropnane-N,N'-m-phenylenedimaleimide; polyfunctional methacrylate monomers, such as divinylbenzene, triallyl cyanurate, ethylene glycol dimethacrylate, diethylene glycol dimethacrylate, polyethylene glycol dimethacrylate, trimethylolpropane trimethacrylate and allyl methacrylate; and polyfunctional vinyl monomers, such as vinyl butyrate and vinyl stearate.

By the use of the above compounds, uniform and mild crosslinking reaction can be expected. Of the above compounds, divinylbenzene is most preferably used in the invention. Divinylbenzene can be easily handled and is compatible with the crystalline polyolefin resin (A) and the ethylene/α-olefin/nonconjugated polyene copolymer rubber (B) which are major components of the object of the crosslinking treatment. Moreover, divinylbenzene has a function of solubilizing the organic peroxide and serves as a dispersant of the organic peroxide. Hence, by the use of divinylbenzene, a thermoplastic elastomer composition which exerts uniform crosslinking effects by heat treatment and which is well-balanced in fluidity and other properties can be obtained.

The crosslinking assistant or the polyfunctional vinyl monomer is used in an amount of usually not more than 2 parts by weight, preferably 0.3 to 1 part by weight, based on 100 parts by weight of the whole object to be crosslinked.

In order to accelerate the decomposition of the organic peroxide, decomposition accelerators may be used, and examples thereof include tertiary amines, such as triethylamine, tributylamine and 2,4,6-tri(dimethylamino) phenol, and naphthenic salts of various metals such as aluminum, cobalt, vanadium, copper, calcium, zirconium, manganese, magnesium lead and mercury.

The dynamic heat treatment is preferably carried out in an apparatus of closed type and in an atmosphere of inert gas such as nitrogen or carbon dioxide. The temperature in the heat treatment is in the range of a melting point of the crystalline polyolefin resin (A) to 300° C., usually 150 to 250° C., preferably 170 to 225° C. The kneading time is in the range of usually 1 to 20 minutes, preferably 1 to 10 minutes. The shear force applied is in the range of 10 to 100,000 sec$^{-1}$, preferably 100 to 50,000 sec$^{-1}$, in terms of shear rate.

Various kneading devices such as a mixing roll, an intensive mixer (e.g., Banbury mixer, kneader) and a single-screw or twin-screw extruder are employable, but preferably used are those of closed type.

Through the dynamic heat treatment, a non-crosslinked olefin thermoplastic elastomer composition or a partially or completely crosslinked olefin thermoplastic elastomer composition is obtained from the crystalline polyolefin resin (A) and the ethylene/αolefin/nonconjugated polyene copolymer rubber (B).

By the expression "the thermoplastic elastomer composition is partially crosslinked" used herein is meant that the gel content measured in the below-described manner is preferably not less than 20% by weight and less than 99.5% by weight, particularly preferably 45 to 98% by weight. By the expression "the thermoplastic elastomer composition is completely crosslinked" is meant that the gel content is not less than 99.5% by weight.

Measurement of Gel Content

A sample of a thermoplastic elastomer composition of 100 g is cut into fine fragments (size: 0.5 mm×0.5 mm×0.5 mm). In a closed vessel, the sample is immersed in 30 ml of cyclohexane at 23° C. for 48 hours. Then, the sample is taken out, placed on a filter paper and dried at room temperature for not shorter than 72 hours until a constant weight is reached.

From the weight of the dry residue, the weight of all the cyclohexane-insoluble components (e.g., fibrous filler, filler, pigment) other than the polymer component and the weight of the crystalline polyolefin resin (A) in the sample before immersed in the cyclohexane are subtracted. The obtained value is taken as "corrected final weight (Y)".

On the other hand, the weight of the ethylene/α-olefin/nonconjugated polyene copolymer rubber (B) in the sample is taken as "corrected initial weight (X)".

The gel content is calculated by the following equation.

Gel content (wt. %)=(corrected final weight (Y)/corrected initial weight (X))×100

Next, the other olefin thermoplastic elastomer composition according to the invention is described.

Crystalline Polyolefin Resin (E)

The crystalline polyolefin resin (E) used in the invention is a homopolymer or copolymer of an α-olefin of 2 to 20 carbon atoms, and this resin is included in the aforesaid crystalline polyolefin resin (A).

Examples of the crystalline polyolefin resin (E) include the following (co)polymers as follows:

(1) an ethylene homopolymer (which may be prepared by any of a low-pressure process and a high-pressure process), (2) a copolymer of ethylene and not more than 10% by mol of other α-olefin or a vinyl monomer such as vinyl acetate or ethyl acrylate, (3) a propylene homopolymer, (4) a random copolymer of propylene and not more than 10% by mol of other α-olefin, (5) a block copolymer of propylene and not more than 30% by mol of other α-olefin, (6) a 1-butene homopolymer, (7) a random copolymer of 1-butene and not more than 10% by mol of other α-olefin, (8) a 4-methyl-1-pentene homopolymer, and (9) a random copolymer of 4-methyl-1-pentene and not more than 20% by mol of other α-olefin.

Examples of the α-olefins include ethylene, propylene, 1-butene, 4-methyl-1-pentene, 1-hexene and 1-octene.

Of the above crystalline polyolefin resins, a propylene homopolymer and a propylene/α-olefin copolymer having a propylene content of not less than 50% by mol are particularly preferable.

These crystalline polyolefin resins can be used singly or in combination.

The crystalline polyolefin resin (E) has a melt flow rate (MFR, ASTM D 1238, 230° C., load of 2.16 kg) of 0.01 to 100 g/10 min, preferably 0.3 to 70 g/10 min.

The crystalline polyolefin resin (E) has a crystallinity, as measured by means of X-ray analysis, of usually 5 to 100%, preferably 20 to 80%.

The crystalline polyolefin resin (E) is used in an amount of 10 to 85 parts by weight, preferably 10 to 75 parts by weight, more preferably 15 to 70 parts by weight, based on 100 parts by weight of the total amount of the crystalline polyolefin resin (E), the ethylene/α-olefin copolymer rubber (F), the olefin rubber (G) and the softener (H). The olefin rubber (G) and the softener (H) are arbitrary components, so that the amount thereof may become 0 part by weight.

When the crystalline polyolefin resin (E) is used in the above-mentioned amount, a thermoplastic elastomer composition having good moldability and capable of providing molded products of high heat resistance can be obtained.

Ethylene/α-olefin Copolymer Rubber (F)

The ethylene/α-olefin copolymer rubber (F) is obtained by random copolymerizing ethylene and an α-olefin of 3 to 20 carbon atoms in the presence of the later-described specific metallocene catalyst.

In the present invention, the ethylene/α-olefin copolymer rubber (F) is used in an amount of 15 to 90 parts by weight, preferably 25 to 90 parts by weight, more preferably 30 to 85 parts by weight, based on 100 parts by weight of the total amount of the crystalline polyolefin resin (E), the ethylene/α-olefin copolymer rubber (F), the olefin rubber (G) and the softener (H). The olefin rubber (G) and the softener (H) are arbitrary components, so that the amount thereof may become 0 part by weight.

When the ethylene/α-olefin copolymer rubber (F) is used in the above-mentioned amount, a thermoplastic elastomer composition having good moldability and capable of providing molded products of excellent tensile properties such as tensile strength and tensile elongation can be obtained.

An ethylene/α-olefin copolymer rubber (F1), or copolymer rubber (F1), for constituting the preferred olefin thermoplastic elastomer composition (3) of the invention has a linear molecular structure, and an ethylene/α-olefin copolymer rubber (F2), or copolymer rubber (F2), for constituting the preferred olefin thermoplastic elastomer composition (4) of the invention has a long-chain branched molecular structure.

α-Olefin

Examples of the α-olefins of 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These α-olefins may be used in combination.

Of these, α-olefins of 4 to 10 carbon atoms, particularly 1-butene, 1-hexene, 1-octene and 1-decene, are preferred as the α-olefins for forming the linear ethylene/α-olefin copolymer rubber (F1).

On the other hand, α-olefins of 3 to 10 carbon atoms, particularly propylene, 1-butene, 1-hexene and 1-octene, are preferred as the α-olefins for forming the long-chain branched ethylene/α-olefin copolymer rubber (F2).

Properties of Linear Ethylene/α-olefin Copolymer Rubber (F1)

The linear ethylene/α-olefin copolymer rubber (F1) preferably used in the invention has the following properties.

(1) Ethylene/α-olefin Component Ratio

The ethylene/α-olefin copolymer rubber (F1) used in the invention contains (a) units derived from ethylene, or ethylene units (a), and (b) units derived from the α-olefin of 3 to 20 carbon atoms (sometimes referred to simply as "α-olefin" hereinafter), or α-olefin units (b), in a molar ratio of 55/45 to 98/2 (ethylene units (a)/α-olefin units (b)), preferably 60/40 to 95/5, more preferably 60/40 to 90/10.

The ethylene/α-olefin copolymer rubber having an ethylene/α-olefin component ratio within the above range has excellent heat resistance.

(2) Density

The density of the ethylene/α-olefin copolymer rubber (F1) is in the range of 0.860 to 0.900 g/cm$^3$, preferably 0.862 to 0.885 g/cm$^3$, more preferably 0.862 to 0.880 g/cm$^3$. When an ethylene/α-olefin copolymer rubber having a density within the above range is used, the resulting thermoplastic elastomer composition can be easily handled when they are in the form of pellets, and a molded product of high flexibility can be provided.

(3) Melt Flow Rate

The melt flow rate (MFR, ASTM D 1238, 230° C., load of 2.16 kg) of the ethylene/α-olefin copolymer rubber (F1) is in the range of 0.01 to 20 g/10 min, preferably 0.2 to 10 g/10 min, more preferably 0.2 to 5 g/10 min.

(4) Intrinsic Viscosity (η)

The intrinsic viscosity (η) of the ethylene/α-olefin rubber (F1), as measured in decalin at 135° C., is in the range of 0.1 to 10 dl/g, preferably 1.0 to 5 dl/g.

(5) gη* Value

The gη* value determined by the intrinsic viscosity (η) of the linear ethylene/α-olefin copolymer rubber (F1) exceeds 0.95.

The gη* value is defined by the following equation:

$$g\eta^* = (\eta)/(\eta)_{blank}$$

wherein (η) is an intrinsic viscosity of the ethylene/α-olefin copolymer rubber (F1) measured in the property (4), and $(\eta)_{blank}$ is an intrinsic viscosity of a linear ethylene/propylene copolymer which has the same weight-average molecular weight (measured by a light scattering method) as the copolymer rubber (F1) and has an ethylene content of 70% by mol.

From the linear ethylene/α-olefin copolymer rubber (F1) having such properties as mentioned above, a thermoplastic elastomer composition and a molded product thereof both of which are excellent not only in mechanical properties but also in heat resistance can be obtained.

It is preferable that the linear ethylene/α-olefin copolymer rubber (F1) further has the following properties (6) to (8).

(6) D Value

The intensity (area) ratio D of Tαβ to Tαα in the $^{13}$C-NMR spectrum of the ethylene/α-olefin copolymer rubber (F1), Tαβ/Tαα, is not more than 0.5, preferably not more than 0.3.

The intensity ratio D of the copolymer rubber (F1) varies depending on the kind of the α-olefin used which constitutes the copolymer rubber (F1).

The meanings of Tαβ and Tαα in the $^{13}$C-NMR spectrum and the method to determine the intensity ratio D of the copolymer rubber (F1) are the same as those described hereinbefore.

The intensity ratio D is now described in more detail with reference to an ethylene/1-butene copolymer rubber.

In the $^{13}$C-NMR spectrum of the ethylene/1-butene copolymer rubber, the peak appearing at 39 to 40 ppm is assigned to Tαα, and the peak appearing at 31 to 32 ppm is assigned to Tαβ.

The intensity ratio D is calculated as a ratio between the integrated values of those peak areas.

The intensity ratio D thus determined is considered as an index of a proportion of occurrence of the 2,1-addition reaction of 1-butene subsequent to the 1,2-addition reaction or an index of a proportion of occurrence of the 1,2-addition reaction subsequent to the 2,1-addition reaction. Therefore, the larger the intensity ratio D becomes, the more irregular the linkage direction of the α-olefin (1-butene) becomes. To the contrary, the smaller the D value becomes, the more regular the linkage direction of the α-olefin (1-butene) becomes. When the regularity is high, the molecular chains tend to be assembled and the copolymer rubber tends to have high strength and is preferred.

In the present invention, a copolymer rubber (F1) having an intensity ratio D of not more than 0.5 is obtained by copolymerizing ethylene and an α-olefin using a specific Group IVB metallocene catalyst as described later. However, even if ethylene and 1-butene are copolymerized in the presence of a Group VB metallocene (e.g., vanadium) catalyst, an ethylene/1-butene copolymer rubber having an intensity ratio D of not more than 0.5 cannot be obtained. The same applies to other α-olefins than 1-butene.

(7) B Value

The B value of the ethylene/α-olefin copolymer rubber (F1) is in the range of 1.00 to 1.50.

The meaning of the B value and the method to determine the B value are the same as those described hereinbefore.

In the present invention, a copolymer rubber (F1) having a B value of 1.00 to 1.50 is obtained by copolymerizing ethylene and an α-olefin using a specific Group IVB metallocene catalyst as described later. However, even if ethylene and an α-olefin are copolymerized in the presence of a non-metallocene type titanium catalyst, an ethylene/α-olefin copolymer rubber having a B value within the above range cannot be obtained.

(8) Glass Transition Temperature

The glass transition temperature (Tg) of the ethylene/α-olefin copolymer rubber (F1), as measured by DSC (differential scanning calorimeter), is preferably not higher than −50° C.

From the copolymer rubber (F1) having a glass transition temperature (Tg) of not higher than −50° C., a thermoplastic elastomer composition of good low-temperature flexibility can be obtained.

Properties of Long-chain Branched Ethylene/α-olefin Copolymer Rubber (F2)

The long-chain branched ethylene/α-olefin copolymer rubber (F2) preferably used in the invention has the following properties.

(1) Ethylene/α-olefin Component Ratio

The ethylene/α-olefin copolymer rubber (F2) used in the invention contains (a) units derived from ethylene, ethylene units (a), and (b) units derived from the α-olefin of 3 to 20 carbon atoms (sometimes referred to simply as "α-olefin" hereinafter), α-olefin units (b), in a molar ratio of 55/45 to 98/2 (ethylene units (a) α-olefin units (b)), preferably 60/40 to 95/5, more preferably 60/40 to 90/10.

(2) Density

The density of the ethylene/α-olefin copolymer rubber (F2) is in the range of 0.860 to 0.900 g/cm$^3$, preferably 0.862 to 0.885 g/cm$^3$, more preferably 0.862 to 0.880 g/cm$^3$. When an ethylene/α-olefin copolymer rubber having a density within the above range is used, the resulting thermoplastic elastomer can be easily handled when they are in the form of pellets, and a molded product of high flexibility can be provided.

(3) Melt Flow Rate

The melt flow rate (MFR, ASTM D 1238, 230° C., load of 2.16 kg) of the ethylene/α-olefin copolymer rubber (F2) is in the range of 0.01 to 20 g/10 min, preferably 0.2 to 10 g/10 min, more preferably 0.2 to 5 g/10 min.

(4) Intrinsic Viscosity (η)

The intrinsic viscosity (η) of the ethylene/α-olefin-copolymer rubber (F2), as measured in decalin at 135° C., is in the range of 0.1 to 10 dl/g, preferably 1.0 to 5 dl/g.

(5) gη* Value

The gη* value of the long-chain branched ethylene/α-olefin copolymer rubber (F2) is in the range of 0.2 to 0.95, preferably 0.4 to 0.9, more preferably 0.5 to 0.85. The gη* value can be determined by the method previously described.

By the fact that a gη* value of a long-chain branched ethylene/α-olefin copolymer rubber is not more than 0.95, it is indicated that a long-chain branch is formed in the molecule.

Preparation of Ethylene/α-olefin Copolymer Rubber (F)

The linear or long-chain branched ethylene/α-olefin copolymer rubber (F) is prepared by random copolymerizing ethylene and an α-olefin of 3 to 20 carbon atoms in the presence of a specific metallocene catalyst.

There is no specific limitation on the metallocene catalyst employable in the invention, except that the metallocene catalyst contains a metallocene compound [a]. For example, the metallocene catalyst may be formed from the metallocene compound [a] and an organoaluminum oxy-compound [b] and/or a compound [c] which reacts with the metallocene compound [a] to form an ion pair, or the catalyst may be formed from the metallocene compound [a], the organoaluminum compound [b] and/or the compound [c], and the organoaluminum compound [d].

Details of the metallocene catalyst and the copolymerization process will be described later.

Olefin Rubber (G)

The olefin rubber (G), which is optionally used in the invention, is for example an amorphous random elastic copolymer containing not less than 50% by mol of an α-olefin of 2 to 20 carbon atoms. In the invention, the olefin rubber (G) can be used in combination with rubbers other than the olefin rubber (G), e.g., diene rubbers such as styrene/butadiene rubber (SBR), nitrile rubber (NBR), natural rubber (NR) and butyl rubber (IIR), and polyisobutylene rubber, as far as it is not prejudicial to the objects of the invention.

In the present invention, the olefin rubber (G) is used in an amount of 1 to 40 parts by weight, preferably 5 to 35 parts by weight, more preferably 5 to 30 parts by weight, based on 100 parts by weight of the total amount of the crystalline polyolefin resin (E), the ethylene/α-olefin copolymer rubber (F), the olefin rubber (G) and the softener (H). When the olefin rubber (G) is used in this amount, a thermoplastic elastomer composition capable of providing a molded product of good flexibility can be obtained.

The amorphous random elastic copolymer includes an α-olefin copolymer of two or more kinds of α-olefins and an α-olefin/nonconjugated diene copolymer of two or more kinds of α-olefins and a nonconjugated diene.

Examples of such copolymers include the following rubbers:

(1) an ethylene/α-olefin copolymer rubber (ethylene units/α-olefin units (by mol)=about 90/10 to 50/50), (2) an ethylene/α-olefin/nonconjugated diene copolymer rubber (ethylene units/α-olefin units (by mol)=about 90/10 to 50/50), (3) a propylene/α-olefin copolymer rubber (propylene units/α-olefin units (by mol)=about 90/10 to 50/50), and (4) a butene/α-olefin copolymer rubber (butene units/α-olefin units (by mol)=about 90/10 to 50/50).

Examples of the α-olefins include ethylene, propylene, 1-butene, 4-methyl-1-pentene, 1-hexene and 1-octene.

Examples of the nonconjugated dienes include dicyclopentadiene, 1,4-hexadiene, cyclooctadiene, methylene norbornene and ethylidene norbornene.

The ethylene/α-olefin/nonconjugated diene copolymer rubber (2) wherein the above-mentioned nonconjugated diene is copolymerized has an iodine value of preferably not more than 25.

The copolymer rubbers (1) to (4) have a Mooney viscosity ($ML_{1+4}$(100° C.)) of 10 to 250, preferably 30 to 150.

Softener (H)

The softener (H), which is optionally used in the invention, is the same as the softener (C) previously described.

In the present invention, the softener (H) is used in an amount of 1 to 40 parts by weight, preferably 5 to 35 parts by weight, more preferably 5 to 30 parts by weight, based on 100 parts by weight of the total amount of the crystalline polyolefin resin (E) and the ethylene/α-olefin copolymer rubber (F). When the softener (H) is used in this amount, a thermoplastic elastomer composition having good fluidity in the molding process can be obtained.

Other Components

To the olefin thermoplastic elastomer composition (3), (4) according to the invention, additives such as conventionally known heat stabilizer, weathering stabilizer, anti-aging agent, antistatic agent, filler, colorant and lubricant can be added as far as it is not prejudicial to the objects of the invention.

Olefin Thermoplastic Elastomer Composition (3), (4)

In the olefin thermoplastic elastomer composition (3), (4), a ratio of the total amount of the polymer components to the total amount of the crystalline polyolefin resin (E), the ethylene/α-olefin copolymer rubber (F), the olefin rubber (G) and the softener (H), namely, a ratio of the total amount of the crystalline polyolefin resin (E), the ethylene/α-olefin copolymer rubber (F) and the olefin rubber (G) to the total amount of the components (E), (F), (G) and (H), is in the range of 60 to 100% by weight.

Preparation of Olefin Thermoplastic Elastomer Composition

The olefin thermoplastic elastomer composition (3), (4) can be prepared by a process similar to the process for preparing the aforesaid olefin thermoplastic elastomer composition (1), (2). That is, the crystalline polyolefin resin (E) and the ethylene/α-olefin copolymer rubber (F) and optionally the olefin rubber (G) and/or the softener (H) are blended in a specific ratio, and the blend is dynamically heat-treated in the presence of the organic peroxide so as to partially or completely crosslink the blend.

The organic peroxide is used in an amount of 0.05 to 3% by weight, preferably 0.1 to 2% by weight, based on the whole object to be crosslinked, i.e., based on 100% by weight of the total amount of the crystalline polyolefin resin (E), the ethylene/α-olefin copolymer rubber (F), the olefin rubber (G) and the softener (H).

The crosslinking assistant or the polyfunctional vinyl monomer is desirably used in an amount of 0.1 to 3% by weight, particularly 0.3 to 2% by weight, based on 100% by weight of the whole object to be crosslinked.

By the term "dynamically heat-treating" is meant that a blend of the components is kneaded in a molten state.

The dynamic heat treatment can be carried out using various kneading devices such as a mixing roll, an intensive mixer (e.g., Banbury mixer, kneader) and a single-screw or twin-screw extruder, but is preferably carried out using kneading devices of closed type. The dynamic heat treatment is preferably carried out in an atmosphere of inert gas such as nitrogen.

The kneading operation is desirably carried out at a temperature at which the half-life period of the organic peroxide used corresponds to less than one minute. The kneading temperature is in the range of usually 150 to 280° C., preferably 170 to 240° C., and the kneading time is in the range of usually 1 to 20 minutes, preferably 1 to 5 minutes. The shear force applied in the kneading operation is in the range of usually 10 to 10,000 $sec^{-1}$, preferably 100 to 10,000 $sec^{-1}$, in terms of shear rate.

Through the above operation, an olefin thermoplastic elastomer composition (3), (4) wherein the ethylene/α-olefin copolymer rubber (F), further the olefin rubber (G) and the crystalline polyolefin resin (E) are partially or completely crosslinked can be obtained.

By the expression "the thermoplastic elastomer composition is partially crosslinked" used herein is meant that the gel content measured in the manner previously described is not less than 10% by weight, preferably 20 to 99.5% by weight, particularly preferably 30 to 97% by weight. By the expression "the thermoplastic elastomer composition is completely crosslinked" is meant that the gel content is more than 99.5% by weight.

Next, the components for forming the metallocene catalyst used in the invention are described.

Metallocene Compound [a]

The metallocene compound [a] used in the preparation of the linear ethylene/α-olefin/nonconjugated polyene copolymer rubber (B1) and the linear ethylene/α-olefin copolymer rubber (F1) is, for example, a compound represented by the following formula [I].

$$ML_x \qquad [I]$$

In the formula [I], M is a transition metal selected from Group IVB of the periodic table, specifically, zirconium, titanium or hafnium, and x is a valence of the transition metal.

L is a ligand coordinated to the transition metal. At least one ligand L is a ligand having cyclopentadienyl skeleton, and the ligand having cyclopentadienyl skeleton may have a substituent.

Examples of the ligands having cyclopentadienyl skeleton include cyclopentadienyl group; alkyl or cycloalkyl substituted cyclopentadienyl groups, such as methylcyclopentadienyl, ethylcyclopentadienyl, n- or i-propylcyclopentadienyl, n-, i-, sec- or t-butylcyclopentadienyl, hexylcyclopentadienyl, octylcyclopentadienyl, dimethylcyclopentadienyl, trimethylcyclopentadienyl, tetramethylcyclopentadienyl, pentamethylcyclopentadienyl, methylethylcyclopentadienyl, methylpropylcyclopentadienyl, methylbutylcyclopentadienyl, methylhexylcyclopentadienyl, methylbenzylcyclopentadienyl, ethylbutylcyclopentadienyl, ethylhexylcyclopentadienyl and methylcyclohexylcyclopentadienyl; indenyl group; 4,5,6,7-tetrahydroindenyl group; and fluorenyl group.

These groups may be substituted with halogen atoms or trialkylsilyl groups.

Of the above groups, particularly preferable are alkyl substituted cyclopentadienyl groups.

When the compound represented by the formula [I] has two or more groups having cyclopentadienyl skeleton as the ligands L, two of them may be bonded to each other through an alkylene group such as ethylene or propylene, a substituted alkylene group such as isopropylidene or diphenylmethylene, a silylene group, or a substituted silylene group such as dimethylsilylene, diphenylsilylene or methylphenylsilylene.

Examples of L other than the ligand having cyclopentadienyl skeleton (sometimes referred to simply as "other L" hereinafter) include hydrocarbon groups of 1 to 12 carbon atoms, alkoxy groups, aryloxy groups, halogen atoms, hydrogen and sulfonic acid-containing groups ($-SO_3R^a$ wherein the $R^a$ is an alkyl group, an alkyl group substituted with a halogen atom, an aryl group, or an aryl group substituted with a halogen atom or an alkyl group).

Examples of the hydrocarbon groups of 1 to 12 carbon atoms include alkyl groups, cycloalkyl groups, aryl groups and aralkyl groups.

More specifically, there can be mentioned:
  alkyl groups, such as methyl, ethyl, n-propyl, isopropyl, n-butyl, isobutyl, sec-butyl, t-butyl, pentyl, hexyl, octyl, decyl and dodecyl;
  cycloalkyl groups, such as cyclopentyl and cyclohexyl;
  aryl groups, such as phenyl and tolyl; and
  aralkyl group, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

Examples of the aryloxy groups include phenoxy.

Examples of the sulfonic acid-containing group ($-SO_3R^a$) include methanesulfonato, p-toluenesulfonato, trifluoromethansulfonate and p-chlorobenzenesulfonato.

Examples of the halogen atoms include fluorine, chlorine, bromine and iodine.

The metallocene compound of the above formula wherein the valence of the transition metal is 4 is more is specifically represented by the following formula [I-a]:

$$R^2{}_kR^3{}_lR^4{}_mR^5{}_nM \qquad [\text{I-a}]$$

wherein M is the above-mentioned transition metal, $R^2$ is a group (ligand) having cyclopentadienyl skeleton, $R^3$, $R^4$ and $R^5$ are each independently a group having cyclopentadienyl skeleton or the other L in the above formula [I], k is an integer of not less than 1, and k+l+m+n=4.

Listed below are examples of the metallocene compounds containing zirconium as M and containing at least two ligands having cyclopentadienyl skeleton.

Bis(cyclopentadienyl)zirconium monochloride monohydride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)zirconium phenoxymonochloride,
Bis(methylcyclopentadienyl)zirconium dichloride,
Bis(ethylcyclopentadienyl)zirconium dichloride,
Bis(n-propylcyclopentadienyl)zirconium dichloride,
Bis(isopropylcyclopentadienyl)zirconium dichioride,
Bis(t-butylcyclopentadienyl)zirconium dichloride,
Bis(n-butylcyclopentadienyl)zirconium dichloride,
Bis(sec-butylcyclopentadienyl)zirconium dichloride,
Bis(isobutylcyclopentadienyl)zirconium dichloride,
Bis(hexylcyclopentadienyl)zirconium dichloride,
Bis(octylcyclopentadienyl)zirconium dichloride,
Bis(indenyl)zirconium dichloride,
Bis(4,5,6,7-tetrahydroindenyl)zirconium dichloride,
Bis(indenyl)zirconium dibromide,
Bis(cyclopentadienyl)zirconium dimethyl,
Bis(cyclopentadienyl)zirconium methoxychloride,
Bis(cyclopentadienyl)zirconium ethoxychloride,
Bis(fluorenyl)zirconium dichloride,
Bis(cyclopentadienyl)zirconiumbis(methanesulfonato),
Bis(cyclopentadienyl)zirconiumbis(p-toluenesulfonato),
Bis(cyclopentadienyl)zirconiumbis (trifluoromethanesulfonato),
Bis(methylcyclopentadienyl)zirconiumbis (trifluoromethanesulfonato),
Bis(ethylcyclopentadienyl)zirconiumbis (trifluoromethanesulfonato),
Bis(propylcyclopentadienyl)zirconiumbis (trifluoromethanesulfonato),
Bis(butylcyclopentadienyl)zirconiumbis (trifluoromethanesulfonato),
Bis(hexylcyclopentadienyl)zirconiumbis (trifluoromethanesulfonato),
Bis(1,3-dimethylcyclopentadienyl)zirconiumbis (trifluoromethanesulfonato),
Bis(1-methyl-3-ethylcyclopentadienyl)zirconiumbis (trifluoromethanesulfonato),
Bis(1-methyl-3-propylcyclopentadienyl)zirconiumbis (trifluoromethanesulfonato),
Bis(1-methyl-3-butylcyclopentadienyl)zirconiumbis (trifluoromethanesulfonato),
Bis(1,3-dimethylcyclopentadienyl)zirconium dichloride,
Bis(1-methyl-3-ethylcyclopentadienyl)zirconium dichloride,
Bis(1-methyl-3-propylcyclopentadienyl)zirconium dichloride,
Bis(1-methyl-3-butylcyclopentadienyl)zirconium dichloride,
Bis(1-methyl-3-hexylcyclopentadienyl)zirconium dichloride, Bis(1-methyl-3-octylcyclopentadienyl)zirconium dichloride, Bis(1-ethyl-3-butylcyclopentadienyl)zirconium dichloride, Bis(trimethylcyclopentadienyl)zirconium dichloride, Bis(tetramethylcyclopentadienyl)zirconium dichloride, Bis(pentamethylcyclopentadienyl)zirconium dichloride, Bis(methylbenzylcyclopentadienyl)zirconium dichloride, Bis(ethylhexylcyclopentadienyl)zirconium dichloride, and Bis(methylcyclohexylcyclopentadienyl)zirconium dichloride.

Also employable in the invention are compounds wherein the 1,3-position substituted cyclopentadienyl group is replaced with a 1,2-position substituted cyclopentadienyl group in the above-exemplified compounds.

Further, also employable is a bridge type metallocene compound represented by the above formula [I-a] wherein at least two of $R^2$, $R^3$, $R^4$ and $R^5$, e.g., $R^2$ and $R^3$, are groups (ligands) having cyclopentadienyl skeleton, and these at least two groups are bonded to each other through an alkylene group, a substituted alkylene group, a silylene group or a substituted silylene group. In this case, $R^4$ and $R^5$ are each independently the other L, which is described in the formula [I].

Listed below are examples of such bridge type metallocene compounds.

Ethylenebis(indenyl)dimethylzirconium,

Ethylenebis(indenyl)zirconium dichloride,

Ethylenebis(indenyl)zirconiumbis(trifluoromethanesulfonato),

Ethylenebis(indenyl)zirconiumbis(methanesulfonato),

Ethylenebis(indenyl)zirconiumbis(p-toluenesulfonato),

Ethylenebis(indenyl)zirconiumbis(p-chlorobenzenesulfonato),

Ethylenebis(4,5,6,7-tetrahydroindenyl)zirconium dichloride,

Isopropyliderie(cyclopentadienyl-fluorenyl)zirconium dichloride,

Isopropylidene(cyclopentadienyl-methylcyclopentadienyl)zirconium dichloride,

Dimethylsilylenebis(cyclopentadienyl)zirconium dichloride,

Dimethylsilylenebis(methylcyclopentadienyl)zirconium dichloride,

Dimethylsilylenebis(dimethylcyclopentadienyl)zirconium dichloride,

Dimethylsilylenebis(trimethylcyclopentadienyl)zirconium dichloride,

Dimethylsilylenebis(indenyl)zirconium dichloride,

Dimethylsilylenebis(indenyl)zirconiumbis(trifluoromethanesulfonato),

Dimethylsilylenebis(4,5,6,7-tetrahydroindenyl)zirconium dichloride,

Dimethylsilylenebis(cyclopentadienylfluorenyl)zirconium dichloride,

Diphenylsilylenebis(indenyl)zirconium dichloride, and

Methylphenylsilylenebis(indenyl)zirconium dichloride.

Furthermore, a metallocene compound of the following formula [A], which is described in Japanese Patent Laid-Open Publication No. 268307/1992, is also employable.

[A]

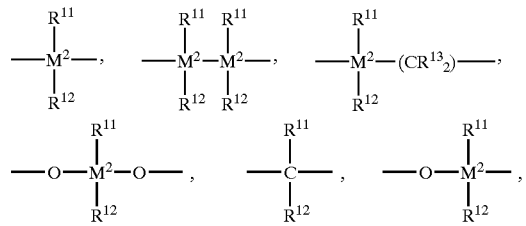

In the formula (A), $M^1$ is a metal of Group IVB of the periodic table, specifically, titanium, zirconium or hafnium.

$R^1$ and $R^2$ may be the same as or different from each other, and are each hydrogen, an alkyl group of 1 to 10 carbon atoms, preferably 1 to 3 carbon atoms, an alkoxy group of 1 to 10 carbon atoms, preferably 1 to 3 carbon atoms, an aryl group of 6 to 10 carbon atoms, preferably 6 to 8 carbon atoms, an aryloxy group of 6 to 10 carbon atoms, preferably 6 to 8 carbon atoms, an alkenyl group of 2 to 10 carbon atoms, preferably 2 to 4 carbon atoms, an arylalkyl group of 7 to 40 carbon atoms, preferably 7 to 12 carbon atoms, an alkylaryl group of 7 to 40 carbon atoms, preferably 7 to 12 carbon atoms, an arylalkenyl group of 8 to 40 carbon atoms, preferably 8 to 12 carbon atoms, or a halogen atom, preferably chlorine.

$R^3$ and $R^4$ may be the same as or different from each other, and are each hydrogen, a halogen atom, preferably fluorine, chlorine or bromine, an alkyl group of 1 to 10 carbon atoms, preferably 1 to 4 carbon atoms, which may be halogenated, an aryl group of 6 to 10 carbon atoms, preferably 6 to 8 carbon atoms, or a group of $-NR^{10}_2$, $-SR^{10}$, $-OSiR^{10}_3$, $-SiR^{10}_3$ or $-PR^{10}_2$ (the $R^{10}$ is a halogen atom, preferably chlorine, an alkyl group of 1 to 10 carbon atoms, preferably 1 to 3 carbon atoms, or an aryl group of 6 to 10 carbon atoms, preferably 6 to 8 carbon atoms).

$R^3$ and $R^4$ are each preferably hydrogen.

$R^5$ and $R^6$ may be the same as or different from each other, preferably the same as each other, and $R^5$ and $R^6$ are the same as $R^3$ and $R^4$, but each of $R^5$ and $R^6$ is not hydrogen. $R^5$ and $R^6$ are each preferably an alkyl group of 1 to 4 carbon atoms which may be halogenated, specifically, methyl, ethyl, propyl, isopropyl, butyl, isobutyl or trifluoromethyl, preferably methyl.

$R^7$ is represented by the following formulae:

$$-\underset{R^{12}}{\overset{R^{11}}{M^2}}-, \quad -\underset{R^{12}}{\overset{R^{11}}{M^2}}-\underset{R^{12}}{\overset{R^{11}}{M^2}}-, \quad -\underset{R^{12}}{\overset{R^{11}}{M^2}}-(CR^{13}_2)-,$$

$$-O-\underset{R^{12}}{\overset{R^{11}}{M^2}}-O-, \quad -\underset{R^{12}}{\overset{R^{11}}{C}}-, \quad -O-\underset{R^{12}}{\overset{R^{11}}{M^2}}-,$$

$=BR^{11}$, $=AlR^{11}$, $-Ge-$, $-Sn-$, $-O-$, $-S-$, $=SO$, $=SO_2$, $=NR^{11}$, $=CO$, $=PR^{11}$, or $=P(O)R^{11}$ wherein the $R^{11}$, $R^{12}$ and $R^{13}$ may be the same as or different from each other; and they are each hydrogen, a halogen atom, an alkyl group of 1 to 10 carbon atoms, preferably 1 to 4 carbon atoms, more preferably methyl, a fluoroalkyl group of 1 to 10 carbon atoms, preferably $CF_3$, an aryl group of 6 to 10 carbon atoms, preferably 6 to 8 carbon atoms, a fluoroaryl group of 6 to 10 carbon atoms, preferably pentafluorophenyl, an alkoxy group of 1 to 10 carbon atoms, preferably 1 to 4 carbon atoms, particularly preferably methoxy, an alkenyl group of 2 to 10 carbon atoms, preferably 2 to 4 carbon atoms, an arylalkyl group of 7 to 40 carbon atoms, preferably 7 to 10 carbon atoms, an arylalkenyl group of 8 to 40 carbon atoms, preferably 8 to 12 carbon atoms, or an alkylaryl group of 7 to 40 carbon atoms, preferably 7 to 12 carbon atoms; or $R^{11}$ and $R^{12}$ or $R^{11}$ and $R^{13}$ may form a ring together with an atom to which they are bonded.

$M^2$ is silicon, germanium or tin, preferably silicon or germanium.

$R^7$ is preferably $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

$R^8$ and $R^9$ may be the same as or different from each other, and they are the same as $R^{11}$.

m and n may be the same as or different from each other, and are each 0, 1 or 2, preferably 0 or 1, and m+n is 0, 1 or 2, preferably 0 or 1.

Particularly preferred metallocene compounds satisfying the above conditions are those represented by the following formulae (i) to (iii):

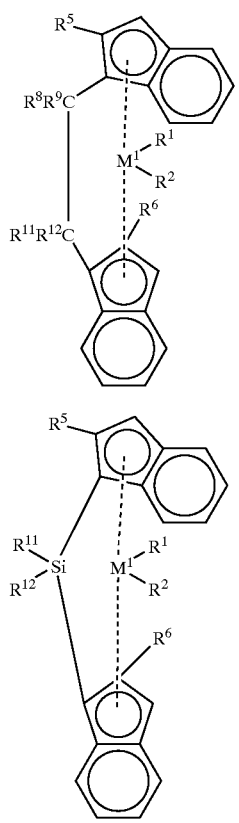

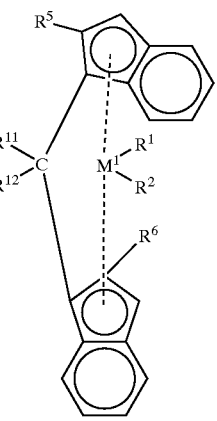

In the above formulae (i), (ii) and (iii), $M^1$ is Zr or Hf, $R^1$ and $R^2$ are each methyl or chlorine, $R^5$ and $R^6$ are each methyl, ethyl or trifluoromethyl, and $R^8$, $R^9$, $R^{10}$ and $R^{12}$ are the same as ones described above.

Of the compounds represented by the formulae (i), (ii) and (iii), the following compounds are particularly preferable.

rac-Ethylene(2-methyl-1-indenyl)$_2$-zirconium dichloride,
rac-Dimethylsilylene(2-methyl-1-indenyl)$_2$-zirconium dichloride,
rac-Dimethylsilylene(2-methyl-1-indenyl)$_2$-zirconium dimethyl,
rac-Ethylene(2-methyl-1-indenyl)$_2$-zirconium dimethyl,
rac-Phenyl(methyl)silylene-(2-methyl-1-indenyl)$_2$-zirconium dichloride,
rac-Diphenyl-silylene-(2-methyl-1-indenyl)$_2$-zirconium dichloride,
rac-Methylethylene(2-methyl-1-indenyl)$_2$-zirconium dichloride, and
rac-Dimethylsilylene(2-ethyl-1-indenyl)$_2$-zirconium dichloride.

The metallocene compounds mentioned above can be prepared by conventionally known processes (see: Japanese Patent Laid-Open Publication No. 268307/1992).

In the present invention, a transition metal compound (metallocene compound) represented by the following formula [B] is also employable.

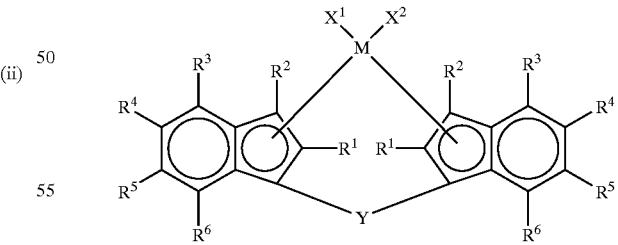

In the formula [B], M is a transition metal atom of Group IVB of the periodic table, specifically, titanium, zirconium or hafnium.

$R^1$ and $R^2$ are each independently hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group.

Examples of the halogen atoms include fluorine, chlorine, bromine and iodine.

Examples of the hydrocarbon groups of 1 to 20 carbon atoms include alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthracenyl and phenanthryl.

Examples of the halogenated hydrocarbon groups include those wherein the above-exemplified hydrocarbon groups are substituted with halogen atoms.

Examples of the silicon-containing groups include monohydrocarbon-substituted silyl groups, such as methylsilyl and phenylsilyl; dihydrocarbon-substituted silyl groups, such as dimethylsilyl and diphenylsilyl; trihydrocarbon-substituted silyl groups, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of the hydrocarbon-substituted silyls, such as trimethylsilyl ether; silicon-substituted alkyl groups, such as trimethylsilylmethyl; and silicon-substituted aryl groups, such as trimethylsilylphenyl.

Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituents wherein oxygen is replaced with sulfur in the above-exemplified oxygen-containing groups.

Examples of the nitrogen-containing groups include amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include phosphino groups, such as dimethylphosphino and diphenylphosphino.

Of these, $R^1$ is preferably a hydrocarbon group, particularly preferably a hydrocarbon group of 1 to 3 carbon atoms, i.e., methyl, ethyl or propyl. $R^2$ is preferably hydrogen or a hydrocarbon group, particularly preferably hydrogen or a hydrocarbon group of 1 to 3 carbon atoms, i.e., methyl, ethyl or propyl.

$R^3$, $R^4$, $R^5$ and $R^6$ are each independently hydrogen, a halogen atom, a hydrocarbon group of 1 to 20 carbon atoms or a halogenated hydrocarbon group of 1 to 20 carbon atoms. Of these, hydrogen, the hydrocarbon group or the halogenated hydrocarbon group is preferable. At least one pair out of pairs of $R^3$ and $R^4$, $R^4$ and $R^5$, and $R^5$ and $R^6$ may form a monocyclic aromatic ring together with a carbon atom to which they are bonded.

When there are two or more hydrocarbon groups or halogenated hydrocarbon groups, the groups other than those for forming the aromatic ring may be bonded to each other to form a ring. When $R^6$ is a substituent other than the aromatic group, it is preferably hydrogen.

Examples of the halogen atoms, the hydrocarbon groups of 1 to 20 carbon atoms and the halogenated hydrocarbon groups of 1 to 20 carbon atoms are the same as those described for $R^1$ and $R^2$.

Examples of the ligands, which contain a monocyclic aromatic ring formed by at least one pair of $R^3$ and $R^4$, $R^4$ and $R^5$, and $R^5$ and $R^6$ and which is coordinated to M, include the following ones.

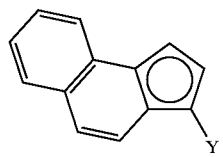

(1)

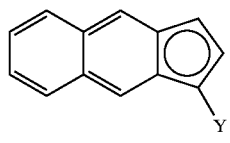

(2)

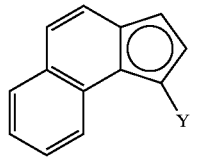

(3)

Of these, the ligand represented by the formula (1) is preferable.

The aromatic ring may be substituted with a halogen atom, a hydrocarbon group of 1 to 20 carbon atoms or a halogenated hydrocarbon group of 1 to 20 carbon atoms.

Examples of the halogen atoms, the hydrocarbon groups of 1 to 20 carbon atoms and the halogenated hydrocarbon groups of 1 to 20 carbon atoms used as the substituents of the aromatic ring are the same as those described for $R^1$ and $R^2$.

$X^1$ and $X^2$ are each independently hydrogen, a halogen atom, a hydrocarbon group of 1 to 20 carbon atoms, a halogenated hydrocarbon group of 1 to 20 carbon atoms, an oxygen-containing group or a sulfur-containing group.

Examples of the halogen atoms, the hydrocarbon groups of 1 to 20 carbon atoms, the halogenated hydrocarbon groups of 1 to 20 carbon atoms and the oxygen-containing groups are the same as those described for $R^1$ and $R^2$.

Examples of the sulfur-containing groups include the same groups as described for $R^1$ and $R^2$; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^7$—, —P(R$^7$)—, —P(O)(R$^7$)—, —BR$^7$— or —AlR$^7$— (the R$^7$ is hydrogen, a halogen atom, a hydrocarbon group of 1 to 20 carbon atoms or a halogenated hydrocarbon group of 1 to 20 carbon atoms).

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene.

Examples of the divalent halogenated hydrocarbon groups include those wherein the above-exemplified divalent hydrocarbon groups of 1 to 20 carbon atoms are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl) silylene; and alkyldisilylene, alkylaryldisilylene and aryldisilylene groups, such as tetramethyl-1,2-disilylene and tetraphenyl-1,2-disilylene.

Examples of the divalent germanium-containing groups include those wherein silicon is replaced with germanium in the above-exemplified divalent silicon-containing groups.

Examples of the divalent tin-containing groups include those wherein silicon is replaced with tin in the above-exemplified divalent silicon-containing groups.

$R^7$ is the same halogen atom, hydrocarbon group of 1 to 20 carbon atoms or halogenated hydrocarbon group of 1 to 20 carbon atoms as described for $R^1$ or $R^2$.

Of the above groups, preferable are divalent silicon-containing groups, divalent germanium-containing groups and divalent tin-containing group, and more preferable are divalent silicon-containing groups. Among them, particularly preferable are alkylsilylene groups, alkylarylsilylene groups and arylsilylene groups.

Listed below are examples of the transition metal compounds represented by the formula [B].

| $R^1$ | $R^2$ | $R^5$ | $R^6$ | $R^8$ | $R^9$ | $R^{10}$ | $R^{11}$ | Y | $X^1$ | $X^2$ | M |
|---|---|---|---|---|---|---|---|---|---|---|---|
| H | H | H | H | H | H | H | H | $SiMe_2$ | Cl | Cl | Zr |
| $CH_3$ | H | H | H | H | H | H | H | $SiMe_2$ | Cl | Cl | Zr |
| $CH_3$ | H | H | H | H | H | H | H | SiMePh | Cl | Cl | Zr |
| $CH_3$ | H | H | H | H | H | H | H | $SiPh_2$ | Cl | Cl | Zr |
| $CH_3$ | H | H | H | H | H | H | H | $Si(pMePh)_2$ | Cl | Cl | Zr |
| $CH_3$ | H | H | H | H | H | H | H | $Si(pClPh)_2$ | Cl | Cl | Zr |
| $CH_3$ | H | H | H | H | H | H | H | $C_2H_4$ | Cl | Cl | Zr |
| $CH_3$ | H | H | H | H | H | H | H | $GeMe_2$ | Cl | Cl | Zr |
| $CH_3$ | H | H | H | H | H | H | H | $SnMe_2$ | Cl | Cl | Zr |
| $CH_3$ | H | H | H | H | H | H | H | $SiMe_2$ | Br | Br | Zr |
| $CH_3$ | H | H | H | H | H | H | H | $SiMe_2$ | Cl | $OSO_2CH_3$ | Zr |
| $CH_3$ | H | H | H | H | H | H | H | $SiMe_2$ | Cl | $SO_2CH_3$ | Zr |
| $CH_3$ | H | H | H | H | H | H | H | $SiMe_2$ | Cl | Cl | Ti |
| $CH_3$ | H | H | H | H | H | H | H | $SiMe_2$ | Cl | Cl | Hf |
| $C_2H_5$ | H | H | H | H | H | H | H | $SiMe_2$ | Cl | Cl | Zr |
| $nC_3H_7$ | H | H | H | H | H | H | H | $SiMe_2$ | Cl | Cl | Zr |
| $C_6H_5$ | H | H | H | H | H | H | H | $SiMe_2$ | Cl | Cl | Zr |
| $CH_3$ | $CH_3$ | H | H | H | H | H | H | $SiMe_2$ | Cl | Cl | Zr |
| $CH_3$ | $CH_3$ | H | H | H | H | H | H | $SiPh_2$ | Cl | Cl | Zr |
| $CH_3$ | $CH_3$ | $CH_3$ | H | H | H | H | H | $SiMe_2$ | Cl | Cl | Zr |
| $CH_3$ | H | Cl | H | H | H | H | H | $SiMe_2$ | Cl | Cl | Zr |
| $CH_3$ | H | $CH_3$ | H | H | H | H | H | $SiMe_2$ | Cl | Cl | Zr |
| $CH_3$ | H | $C_2H_5$ | H | H | H | H | H | $SiMe_2$ | Cl | Cl | Zr |
| $CH_3$ | H | $C_6H_5$ | H | H | H | H | H | $SiMe_2$ | Cl | Cl | Zr |
| $CH_3$ | H | H | $CH_3$ | H | H | H | H | $SiMe_2$ | Cl | Cl | Zr |
| $CH_3$ | H | $CH_3$ | $CH_3$ | H | H | H | H | $SiMe_2$ | Cl | Cl | Zr |
| $CH_3$ | H | $CH_2$*[1] | $CH_3$ | H | H | H | $CH_2$*[1] | $SiMe_2$ | Cl | Cl | Zr |
| $CH_3$ | H | H | H | H | H | H | $C_6H_5$ | $SiMe_2$ | Cl | Cl | Zr |

*[1] $R^5$ and $R^{11}$ are bonded to each other to form a five-membered ring.
Me: methyl;
Et: ethyl;
Ph: phenyl.

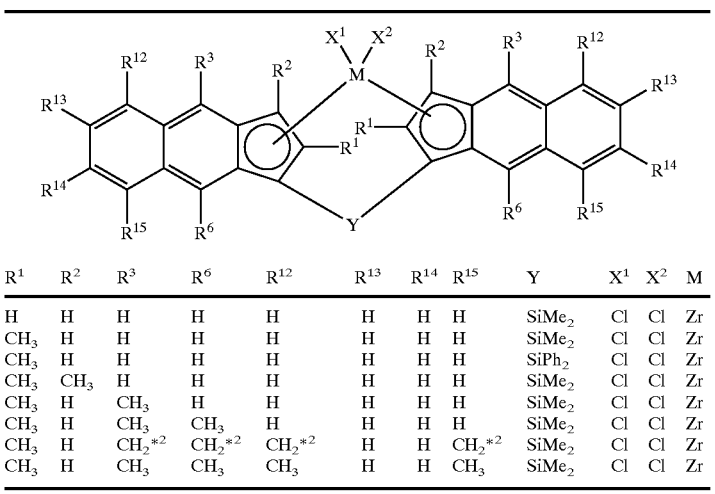

| $R^1$ | $R^2$ | $R^3$ | $R^6$ | $R^{12}$ | $R^{13}$ | $R^{14}$ | $R^{15}$ | Y | $X^1$ | $X^2$ | M |
|---|---|---|---|---|---|---|---|---|---|---|---|
| H | H | H | H | H | H | H | H | SiMe$_2$ | Cl | Cl | Zr |
| CH$_3$ | H | H | H | H | H | H | H | SiMe$_2$ | Cl | Cl | Zr |
| CH$_3$ | H | H | H | H | H | H | H | SiPh$_2$ | Cl | Cl | Zr |
| CH$_3$ | CH$_3$ | H | H | H | H | H | H | SiMe$_2$ | Cl | Cl | Zr |
| CH$_3$ | H | CH$_3$ | H | H | H | H | H | SiMe$_2$ | Cl | Cl | Zr |
| CH$_3$ | H | CH$_3$ | CH$_3$ | H | H | H | H | SiMe$_2$ | Cl | Cl | Zr |
| CH$_3$ | H | CH$_2$*$^2$ | CH$_2$*$^2$ | CH$_2$*$^2$ | H | H | CH$_2$*$^2$ | SiMe$_2$ | Cl | Cl | Zr |
| CH$_3$ | H | CH$_3$ | CH$_3$ | CH$_3$ | H | H | CH$_3$ | SiMe$_2$ | Cl | Cl | Zr |

*$^2$R$^3$ and R$^{12}$, and R$^6$ and R$^{15}$ are bonded to each other to form a five-membered ring, respectively.
Me: methyl;
Ph: phenyl

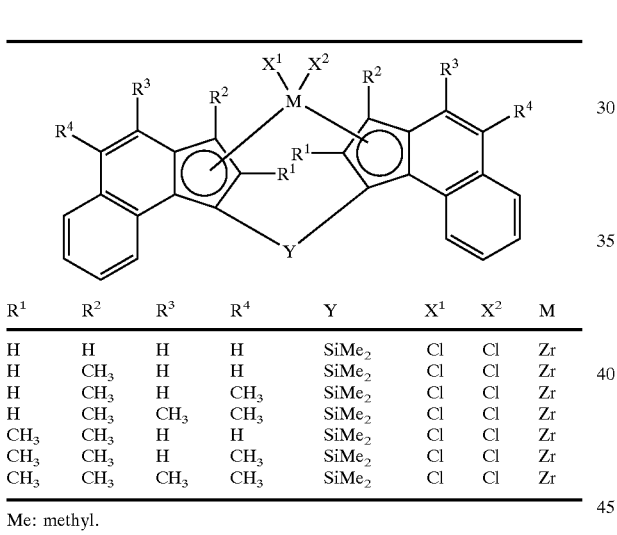

| $R^1$ | $R^2$ | $R^3$ | $R^4$ | Y | $X^1$ | $X^2$ | M |
|---|---|---|---|---|---|---|---|
| H | H | H | H | SiMe$_2$ | Cl | Cl | Zr |
| H | CH$_3$ | H | H | SiMe$_2$ | Cl | Cl | Zr |
| H | CH$_3$ | H | CH$_3$ | SiMe$_2$ | Cl | Cl | Zr |
| H | CH$_3$ | CH$_3$ | CH$_3$ | SiMe$_2$ | Cl | Cl | Zr |
| CH$_3$ | CH$_3$ | H | H | SiMe$_2$ | Cl | Cl | Zr |
| CH$_3$ | CH$_3$ | H | CH$_3$ | SiMe$_2$ | Cl | Cl | Zr |
| CH$_3$ | CH$_3$ | CH$_3$ | CH$_3$ | SiMe$_2$ | Cl | Cl | Zr |

Me: methyl.

Also employable in the invention are transition metal compounds wherein zirconium is replaced with titanium or hafnium in the above-mentioned compounds.

A racemic modification of the transition metal compound is generally used as the olefin polymerization catalyst component, but R type or S type is also employable.

The indene derivative ligands of the transition metal compounds can be synthesized in accordance with ordinary organic synthesis through, for example, the reaction route described below.

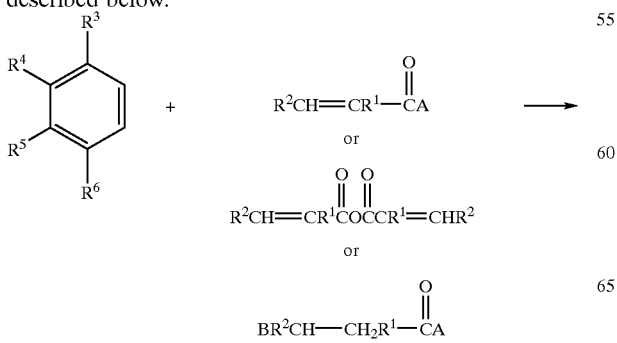

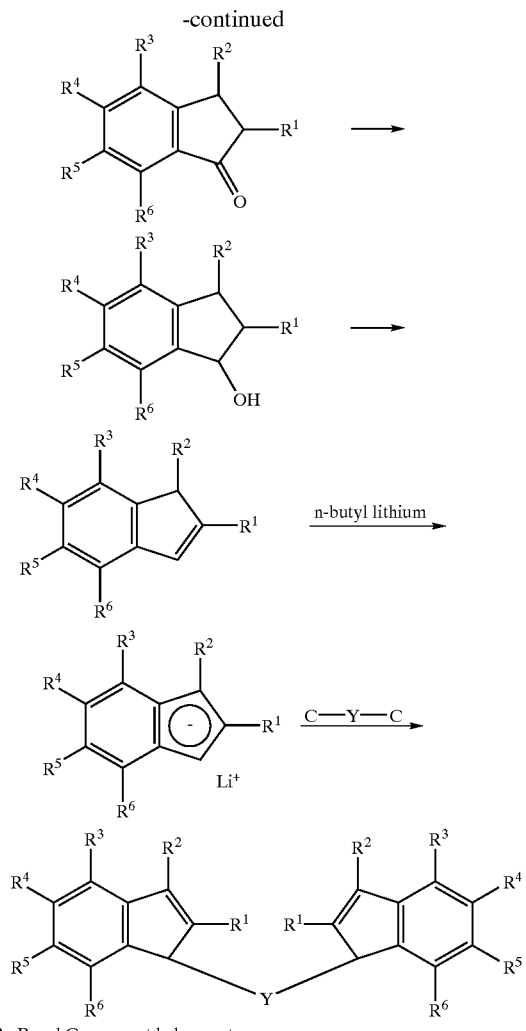

A, B and C represent halogen atoms.

The transition metal compounds employable in the invention can be synthesized from these indene derivatives in accordance with conventionally known processes, for example, a process described in Japanese Patent Laid-Open Publication No. 268307/1992.

In the present invention, a transition metal compound (metallocene compound) represented by the following formula [C] is also employable.

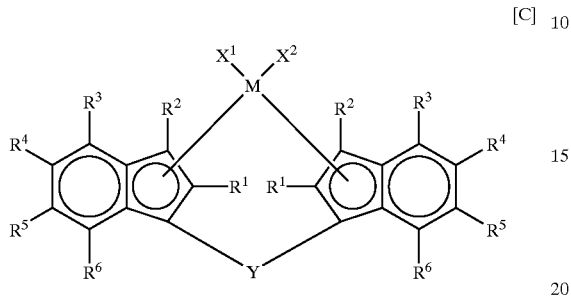

[C]

In the formula [C], M, $R^1$, $R^2$, $R^3$, $R^4$, $R^5$ and $R^6$ are the same as those in the aforesaid formula [B].

Among $R^3$, $R^4$, $R^5$ and $R^6$, two groups including $R^3$ are preferably alkyl groups, and it is more preferred that $R^3$ and $R^5$, or $R^3$ and $R^6$ are alkyl groups. These alkyl groups are preferably secondary or tertiary alkyl groups, and they may be substituted with halogen atoms or silicon-containing groups. Examples of the halogen atoms and the silicon-containing groups include the same substituents as described for $R^1$ and $R^2$.

Of the groups indicated by $R^3$, $R^4$, $R^5$ and $R^6$, groups other than the alkyl groups are each preferably hydrogen.

Examples of the alkyl groups (the hydrocarbon groups of 1 to 20 carbon atoms) include chain alkyl groups and cyclic alkyl groups, such as methyl, ethyl, n-propyl, i-propyl, n-butyl, i-butyl, sec-butyl, tert-butyl, pentyl, hexyl, cyclohexyl, heptyl, octyl, nonyl, dodecyl, eicosyl, norbornyl and adamantyl; and arylalkyl groups, such as benzyl, phenylethyl, phenylpropyl and tolylmethyl. These groups may contain a double bond or a triple bond.

Two groups selected from $R^3$, $R^4$, $R^5$ and $R^6$ may be bonded to each other to form a monocyclic or polycyclic ring other than the aromatic ring.

Examples of the halogen atoms are the same as those described for $R^1$ and $R^2$.

$X^1$, $X^2$, Y and $R^7$ are the same as those in the aforesaid formula [B].

Listed below are examples of the metallocene compounds (transition metal compounds) represented by the formula [C].

rac-Dimethylsilylene-bis(4,7-dimethyl-1-indenyl)zirconium dichloride,
rac-Dimethylsilylene-bis(2,4,7-trimethyl-1-indenyl)zirconium dichloride,
rac-Dimethylsilylene-bis(2,4,6-trimethyl-1-indenyl)zirconium dichloride,
rac-Dimethylsilylene-bis(2,5,6-trimethyl-1-indenyl)zirconium dichloride,
rac-Dimethylsilylene-bis(2,4,5,6-tetramethyl-1-indenyl)zirconium dichloride,
rac-Dimethylsilylene-bis(2,4,5,6,7-pentamethyl-1-indenyl)zirconium dichloride,
rac-Dimethylsilylene-bis(2-methyl-4-n-propyl-7-methyl-1-indenyl)zirconium dichloride,
rac-Dimethylsilylene-bis(4-i-propyl-7-methyl-1-indenyl)zirconium dichloride,
rac-Dimethylsilylene-bis(2-methyl-4-i-propyl-7-methyl-1-indenyl)zirconium dichloride,
rac-Dimethylsilylene-bis(2-methyl-4-i-propyl-6-methyl-1-indenyl)zirconium dichloride,
rac-Dimethylsilylene-bis(2-methyl-4-methyl-6-i-propyl-1-indenyl)zirconium dichloride,
rac-Dimethylsilylene-bis(2-methyl-4-i-propyl-5-methyl-1-indenyl)zirconium dichloride,
rac-Dimethylsilyl-bis(2-methyl-4,6-di(i-propyl)-1-indenyl)zirconium dichloride,
rac-Dimethylsilylene-bis(2-methyl-4,6-di(i-propyl)-7-methyl-1-indenyl)zirconium dichloride,
rac-Dimethylsilylene-bis(2-methyl-4-i-butyl-7-methyl-1-indenyl)zirconium dichloride,
rac-Dimethylsilylene-bis(2-methyl-4-sec-butyl-7-methyl-1-indenyl)zirconium dichloride,
rac-Dimethylsilylene-bis(2-methyl-4,6-di(sec-butyl)-1-indenyl)zirconium dichloride,
rac-Dimethylsilylene-bis(2-methyl-4-tert-butyl-7-methyl-1-indenyl)zirconium dichloride,
rac-Dimethylsilylene-bis(2-methyl-4-cyclohexyl-7-methyl-1-indenyl)zirconium dichloride,
rac-Dimethylsilylene-bis(2-methyl-4-benzyl-7-methyl-1-indenyl)zirconium dichloride,
rac-Dimethylsilylene-bis(2-methyl-4-phenylethyl-7-methyl-1-indenyl)zirconium dichloride,
rac-Dimethylsilylene-bis(2-methyl-4-phenyldichloromethyl-7-methyl-1-indenyl)zirconium dichloride,
rac-Dimethylsilylene-bis(2-methyl-4-chloromethyl-7-methyl-1-indenyl)zirconium dichloride,
rac-Dimethylsilylene-bis(2-methyl-4-trimethylsilylmethyl-7-methyl-1-indenyl)zirconium dichloride,
rac-Dimethylsilylene-bis(2-methyl-4-trimethylsiloxymethyl-7-methyl-1-indenyl)zirconium dichioride,
rac-Diethylsilylene-bis(2-methyl-4-i-propyl-7-methyl-1-indenyl)zirconium dichloride,
rac-Di(i-propyl)silylene-bis(2-methyl-4-i-propyl-7-methyl-1-indenyl)zirconium dichloride,
rac-Di(n-butyl)silylene-bis(2-methyl-4-i-propyl-7-methyl-1-indenyl)zirconium dichloride,
rac-Di(cyclohexyl)silylene-bis(2-methyl-4-i-propyl-7-methyl-1-indenyl)zirconium dichloride,
rac-Methylphenylsilylene-bis(2-methyl-4-i-propyl-7-methyl-1-indenyl)zirconium dichloride,
rac-Diphenylsilylene-bis(2-methyl-4-i-propyl-7-methyl-1-indenyl)zirconium dichloride,
rac-Diphenylsilylene-bis(2-methyl-4,6-di(i-propyl)-1-indenyl)zirconium dichloride,
rac-Di(p-tolyl)silylene-bis(2-methyl-4-i-propyl-7-methyl-1-indenyl)zirconium dichloride,
rac-Di(p-chlorophenyl)silylene-bis(2-methyl-4-i-propyl-7-methyl-1-indenyl)zirconium dichloride,
rac-Dimethylsilylene-bis(2-methyl-4-i-propyl-7-methyl-1-indenyl)zirconium dibromide,
rac-Dimethylsilylene-bis(2-methyl-4-i-propyl-7-methyl-1-indenyl)zirconium dimethyl,
rac-Dimethylsilylene-bis(2-methyl-4-i-propyl-7-methyl-1-indenyl)zirconium methylchloride,
rac-Dimethylsilylene-bis(2-methyl-4-i-propyl-7-methyl-1-indenyl)zirconium-bis(methanesulfonato), rac-Dimethylsilylene-bis(2-methyl-4-i-propyl-7-methyl-1-indenyl)zirconium-bis(p-phenylsulfinato), rac-Dimethylsilylene-bis(2-methyl-3-methyl-4-i-propyl-6-methyl-1-indenyl)zirconium dichloride, rac-Dimethylsilylene-bis(2-ethyl-4-i-propyl-6-methyl-1-indenyl)zirconium dichloride, and rac-Dimethylsilylene-bis(2-phenyl-4-i-propyl-6-methyl-1-indenyl)zirconium dichloride.

Also employable in the invention are transition metal compounds wherein zirconium is replaced with titanium or hafnium in the above-exemplified compounds.

A racemic modification of the transition metal compound is generally used, but R type or S type is also employable.

The indene derivative ligands of the transition metal compounds can be synthesized in accordance with ordinary organic synthesis through, for example, the reaction route previously described.

The transition metal compounds (metallocene compounds) represented by the formula [C] can be synthesized from these indene derivatives in accordance with conventionally known processes, for example, a process described in Japanese Patent Laid-Open Publication No. 268307/1992.

Of the metallocene compounds mentioned above, compounds represented by the following formulas [C-a] and [B-a] are particularly preferably employed. The metallocene compounds represented by the formula [C-a] are included in the compounds represented by the formula [C], and the metallocene compounds represented by the formula [B-a] are included in the compounds represented by the formula [B].

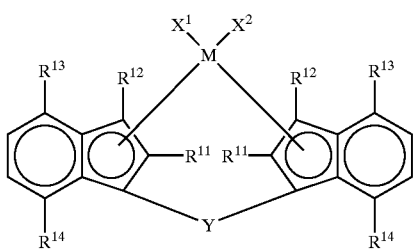

[C-a]

In the formula [C-a], M is a transition metal atom of Group IVB of the periodic table, specifically titanium, zirconium or hafnium, preferably zirconium.

$R^{11}$ and $R^{12}$ $R^{11}$ and $R^{12}$ are each hydrogen, a halogen atom, a hydrocarbon group of 1 to 20 carbon atoms which may be halogenated, a silicon-containing group, an oxygen-containing group, a sulfur-containing group, a nitrogen-containing group or a phosphorus-containing group.

Examples of the hydrocarbon groups of 1 to 20 carbon atoms include:

alkyl groups, such as methyl, ethyl, propyl, n-butyl, isobutyl, sec-butyl, tert-butyl, pentyl, neopentyl, hexyl, cyclohexyl, octyl, nonyl, dodecyl, eicosyl, norbornyl and adamantyl;

alkenyl groups, such as vinyl, propenyl and cyclohexenyl;

arylalkyl groups, such as benzyl, phenylethyl and phenylpropyl; and aryl groups, such as phenyl, tolyl, dimethylphenyl, trimethylphenyl, ethylphenyl, propylphenyl, biphenyl, α- or β-naphthyl, methylnaphthyl, anthracenyl, phenanthryl, benzylphenyl, pyrenyl, acenaphthyl, phenalenyl, aceanthrylenyl, tetrahydronaphthyl, indanyl and biphenylyl.

These hydrocarbon groups may be substituted with halogen atoms such as fluorine, chlorine, bromine and iodine, or organosilyl groups such as trimethylsilyl, triethylsilyl and triphenylsilyl.

Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituents wherein oxygen is replaced with sulfur in the above-exemplified oxygen-containing groups; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Examples of the nitrogen-containing groups include amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include dimethylphosphino and diphenylphosphino.

Of these, $R^{11}$ is preferably a hydrocarbon group, particularly a hydrocarbon group of 1 to 3 carbon atoms, i.e., methyl, ethyl or propyl.

$R^{12}$ is preferably hydrogen or a hydrocarbon group, particularly hydrogen or a hydrocarbon group of 1 to 3 carbon atoms, i.e., methyl, ethyl or propyl.

$R^{13}$ and $R^{14}$ $R^{13}$ and $R^{14}$ are each an alkyl group of 1 to 20 carbon atoms, and examples thereof are the same as those described above. $R^{13}$ is preferably a secondary or tertiary alkyl group. $R^{14}$ may contain a double bond or a triple bond.

$X^1$ and $X^2$ $X^1$ and $X^2$ are each hydrogen, a halogen atom, a hydrocarbon group of 1 to 20 carbon atoms, a halogenated hydrocarbon group of 1 to 20 carbon atoms, an oxygen-containing group or a sulfur-containing group. Examples of these groups are the same as those described above. $X^1$ and $X^2$ are each preferably a halogen atom or a hydrocarbon group of 1 to 20 carbon atoms.

Y

Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, —NR$^{15}$—, —P(R$^{15}$)—, —P(O)(R$^{15}$)—, —BR$^{15}$— or —AlR$^{15}$— (The R$^{15}$ is hydrogen, a halogen atom, a hydrocarbon group of 1 to 20 carbon atoms or a halogenated hydrocarbon group of 1 to 20 carbon atoms).

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene.

Examples of the divalent halogenated hydrocarbon groups include those wherein the above-exemplified divalent hydrocarbon groups of 1 to 20 carbon atoms are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene; and alkyldisilyl, alkylaryldisilyl and aryldisilyl groups, such as tetramethyl-1,2-disilyl and tetraphenyl-1,2-disilyl.

Examples of the divalent germanium-containing groups include those wherein silicon is replaced with germanium in the above-exemplified divalent silicon-containing groups.

$R^{15}$ is the same halogen atom, hydrocarbon group of 1 to 20 carbon atoms or halogenated hydrocarbon group of 1 to 20 carbon atoms as described above.

Of these, Y is preferably a divalent silicon-containing group or a divalent germanium-containing group, more preferably a divalent silicon-containing group, particularly preferably an alkylsilylene group, an alkylarylsilylene group or an arylsilylene group.

Listed below are examples of the metallocene compounds represented by the formula [C-a].

rac-Dimethylsilylene-bis(2,7-dimethyl-4-ethyl-1-indenyl)zirconium dichloride,
rac-Dimethylsilylene-bis(2,7-dimethyl-4-n-propyl-1-indenyl)zirconium dichloride,
rac-Dimethylsilylene-bis(2,7-dimethyl-4-i-propyl-1-indenyl)zirconium dichloride,
rac-Dimethylsilylene-bis(2,7-dimethyl-4-n-butyl-1-indenyl)zirconium dichloride,
rac-Dimethylsilylene-bis(2,7-dimethyl-4-sec-butyl-1-indenyl)zirconium dichloride,
rac-Dimethylsilylene-bis(2,7-dimethyl-4-t-butyl-1-indenyl)zirconium dichloride,
rac-Dimethylsilylene-bis(2,7-dimethyl-4-n-pentyl-1-indenyl)}zirconium dichloride,
rac-Dimethylsilylene-bis(2,7-dimethyl-4-n-hexyl-1-indenyl)zirconium dichloride,
rac-Dimethylsilylene-bis(2,7-dimethyl-4-cyclohexyl-1-indenyl)zirconium dichloride,
rac-Dimethylsilylene-bis(2,7-dimethyl-4-methylcyclohexyl-1-indenyl)}zirconium dichloride,
rac-Dimethylsilylene-bis(2,7-dimethyl-4-phenylethyl-1-indenyl)zirconium dichloride,
rac-Dimethylsilylene-bis(2,7-dimethyl-4-phenyldichloromethyl-1-indenyl)zirconium dichloride,
rac-Dimethylsilylene-bis(2,7-dimethyl-4-chloromethyl-1-indenyl)zirconium dichloride,
rac-Dimethylsilylene-bis(2,7-dimethyl-4-trimethylsilylmethyl-1-indenyl)zirconium dichloride,
rac-Dimethylsilylene-bis(2,7-dimethyl-4-trimethylsiloxymethyl-1-indenyl)zirconium dichloride,
rac-Diethylsilylene-bis(2,7-dimethyl-4-i-propyl-1-indenyl)zirconium dichloride,
rac-Di(i-propyl)silylene-bis(2,7-dimethyl-4-i-propyl-1-indenyl)}zirconium dichloride,
rac-Di(n-butyl)silylene-bis(2,7-dimethyl-4-i-propyl-1-indenyl)zirconium dichloride,
rac-Di(cyclohexyl)silylene-bis(2,7-dimethyl-4-i-propyl-1-indenyl)zirconium dichloride,
rac-Methylphenylsilylene-bis(2,7-dimethyl-4-i-propyl-1-indenyl)zirconium dichloride,
rac-Methylphenylsilylene-bis(2,7-dimethyl-4-t-butyl-1-indenyl)zirconium dichloride,
rac-Diphenylsilylene-bis(2,7-dimethyl-4-t-butyl-1-indenyl)zirconium dichloride,
rac-Diphenylsilylene-bis(2,7-dimethyl-4-i-propyl-1-indenyl)zirconium dichloride,
rac-Diphenylsilylene-bis(2,7-dimethyl-4-ethyl-1-indenyl)zirconium dichloride,
rac-Di(p-tolyl)silylene-bis(2,7-dimethyl-4-i-propyl-1-indenyl)zirconium dichloride,
rac-Di(p-chlorophenyl)silylene-bis(2,7-dimethyl-4-i-propyl-1-indenyl)zirconium dichloride,
rac-Dimethylsilylene-bis(2-methyl-4-i-propyl-7-ethyl-1-indenyl)zirconium dibromide,
rac-Dimethylsilylene-bis(2,3,7-trimethyl-4-ethyl-1-indenyl)zirconium dichloride,
rac-Dimethylsilylene-bis(2,3,7-trimethyl-4-n-propyl-1-indenyl)zirconium dichloride,
rac-Dimethylsilylene-bis(2,3,7-trimethyl-4-i-propyl-1-indenyl)zirconium dichloride,
rac-Dimethylsilylene-bis(2,3,7-trimethyl-4-n-butyl-1-indenyl)zirconium dichloride,
rac-Dimethylsilylene-bis(2,3,7-trimethyl-4-sec-butyl-1-indenyl)zirconium dichloride,
rac-Dimethylsilylene-bis(2,3,7-trimethyl-4-t-butyl-1-indenyl)zirconium dichloride,
rac-Dimethylsilylene-bis(2,3,7-trimethyl-4-n-pentyl-1-indenyl)zirconium dichloride,
rac-Dimethylsilylene-bis(2,3,7-trimethyl-4-n-hexyl-1-indenyl)zirconium dichloride,
rac-Dimethylsilylene-bis(2,3,7-trimethyl-4-cyclohexyl-1-indenyl)zirconium dichloride,
rac-Dimethylsilylene-bis(2,3,7-trimethyl-4-methylcyclohexyl-1-indenyl)zirconium dichloride,
rac-Dimethylsilylene-bis(2,3,7-trimethyl-4-trimethylsilylmethyl-1-indenyl)zirconium dichloride,
rac-Dimethylsilylene-bis(2,3,7-trimethyl-4-trimethylsiloxymethyl-1-indenyl)zirconium dichloride,
rac-Dimethylsilylene-bis(2,3,7-trimethyl-4-phenylethyl-1-indenyl)zirconium dichloride,
rac-Dimethylsilylene-bis(2,3,7-trimethyl-4-phenyldichloromethyl-1-indenyl)zirconium dichloride,
rac-Dimethylsilylene-bis(2,3,7-trimethyl-4-chloromethyl-1-indenyl)zirconium dichloride,
rac-Diethylsilylene-bis(2,3,7-trimethyl-4-i-propyl-1-indenyl)zirconium dichloride,
rac-Di(i-propyl)silylene-bis(2,3,7-trimethyl-4-i-propyl-1-indenyl)zirconium dichloride,
rac-Di(n-butyl)silylene-bis(2,3,7-trimethyl-4-i-propyl-1-indenyl)zirconium dichloride,
rac-Di(cyclohexyl)silylene-bis(2,3,7-trimethyl-4-i-propyl-1-indenyl)zirconium dichloride,
rac-Methylphenylsilylene-bis(2,3,7-trimethyl-4-i-propyl-1-indenyl)zirconium dichloride,
rac-Methylphenylsilylene-bis(2,3,7-trimethyl-4-t-butyl-1-indenyl)zirconium dichloride,
rac-Diphenylsilylene-bis(2,3,7-trimethyl-4-t-butyl-1-indenyl)zirconium dichloride,
rac-Diphenylsilylene-bis(2,3,7-trimethyl-4-i-propyl-1-indenyl)zirconium dichloride,
rac-Diphenylsilylene-bis(2,3,7-trimethyl-4-ethyl-1-indenyl)zirconium dichloride,
rac-Di(p-tolyl)silylene-bis(2,3,7-trimethyl-4-i-propyl-1-indenyl)zirconium dichloride,
rac-Di(p-chlorophenyl)silylene-bis(2,3,7-trimethyl-4-i-propyl-1-indenyl)zirconium dichloride, rac-Dimethylsilylene-bis(2-methyl-4-i-propyl-7-methyl-1-indenyl)zirconium dimethyl, rac-Dimethylsilylene-bis(2-methyl-4-i-propyl-7-methyl-1-indenyl)zirconium methylchloride, rac-Dimethylsilylene-bis(2-methyl-4-i-propyl-7-methyl-1-indenyl)zirconium-bis(methanesulfonato), rac-Dimethylsilylene-bis(2-methyl-4-i-propyl-7-methyl-1-indenyl)zirconium-bis(p-phenylsulfinato), rac-Dimethylsilylene-bis(2-methyl-3-methyl-4-i-propyl-7-methyl-1-indenyl)zirconium dichloride, rac-Dimethylsilylene-bis(2-ethyl-4-i-propyl-7-methyl-1-indenyl)zirconium dichloride, rac-Dimethylsilylene-bis(2-phenyl-4-i-propyl-7-methyl-1-indenyl)zirconium dichloride, rac-Dimethylsilylene-bis(2-methyl-4-i-propyl-7-methyl-1-indenyl)titanium dichloride, and rac-Dimethylsilylene-bis(2-methyl-4-i-propyl-7-methyl-1-indenyl)hafnium dichloride.

Of these, particularly preferable are compounds having a branched alkyl group such as i-propyl, sec-butyl or tert butyl at the 4-position.

In the invention, a racemic modification of the above-mentioned metallocene compound is generally used as the olefin polymerization catalyst component, but R type or S type is also employable.

The metallocene compounds can be synthesized from indene derivatives by known processes, for example, a process described in Japanese Patent Laid-Open Publication No. 268307/1992.

In the present invention, a compound represented by the following formula [B-a], which is described in European Patent No. 549,900 and Canadian Patent No. 2,084,017, is also preferably employed.

[B-a]

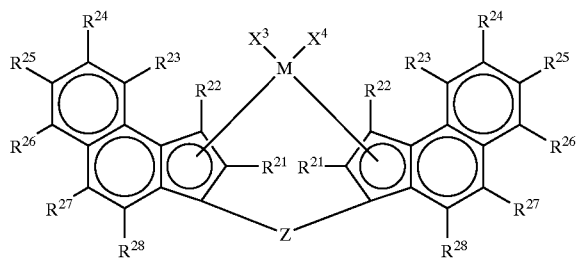

In the formula [B-a], M is a transition metal atom of Group IVB of the periodic table, specifically titanium, zirconium or hafnium, particularly preferably zirconium.

$R^{21}$s may be the same as or different from each other, and are each hydrogen, a halogen atom, preferably fluorine or chlorine, an alkyl group of 1 to 10 carbon atoms, preferably 1 to 4 carbon atoms, which may be halogenated, an aryl group of 6 to 10 carbon atoms, preferably 6 to 8 carbon atoms, —$NR_2$, —SR, —$OSiR_3$, —$SiR_3$ or —$PR_2$ (The R is a halogen atom, preferably chlorine, an alkyl group of 1 to 10 carbon atoms, preferably 1 to 3 carbon atoms, or an aryl group of 6 to 10 carbon atoms, preferably 6 to 8 carbon atoms).

$R^{22}$ to $R^{28}$ may be the same as or different from each other, and are each the same atom or group as described for $R^{21}$, and adjacent two or more groups out of $R^{22}$ to $R^{28}$ may form an aromatic or aliphatic ring together with an atom to which they are bonded.

$X^3$ and $X^4$ may be the same as or different from each other, and are each hydrogen, a halogen atom, OH group, an alkyl group of 1 to 10 carbon atoms, preferably 1 to 3 carbon atoms, an alkoxy group of 1 to 10 carbon atoms, preferably 1 to 3 carbon atoms, an aryl group of 6 to 10 carbon atoms, preferably 6 to 8 carbon atoms, an aryloxy group of 6 to 10 carbon atoms, preferably 6 to 8 carbon atoms, an alkenyl group of 2 to 10 carbon atoms, preferably 2 to 4 carbon atoms, an arylalkyl group of 7 to 40 carbon atoms, preferably 7 to 10 carbon atoms, an alkylaryl group of 7 to 40 carbon atoms, preferably 7 to 12 carbon atoms, or an arylalkenyl group of 8 to 40 carbon atoms, preferably 8 to 12 carbon atoms.

Z is

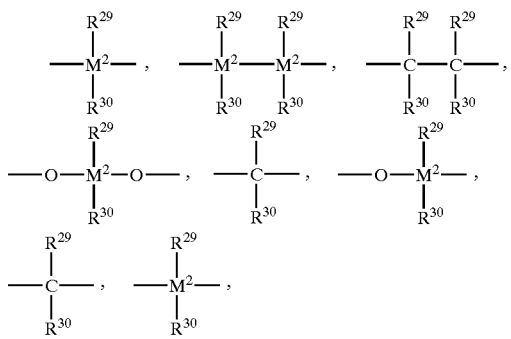

$=BR^{29}$, $=AlR^{29}$, —Ge, —Sn—, —O—, —S—, $=SO$, $—SO_2$, $=NR^{29}$, $=CO$, $=PR^{29}$ or $=p(O)R^{29}$.

In the above formulas, $R^{29}$ and $R^{30}$ may be the same as or different from each other, and are each hydrogen, a halogen atom, an alkyl group of 1 to 10 carbon atom, preferably 1 to 4 carbon atoms, particularly preferably methyl, a fluoroalkyl group of 1 to 10 carbon atoms, preferably $CF_3$, an aryl group of 6 to 10 carbon atoms, preferably 6 to 8 carbon atoms, a fluoroaryl group of 6 to 10 carbon atoms, preferably pentafluorophenyl, an alkoxy group of 1 to 10 carbon atoms, preferably 1 to 4 carbon atoms, particularly preferably methoxy, an alkenyl group of 2 to 10 carbon atoms, preferably 2 to 4 carbon atoms, an arylalkyl group of 7 to 40 carbon atoms, preferably 7 to 10 carbon atoms, an arylalkenyl group of 8 to 40 carbon atoms, preferably 8 to 12 carbon atoms, or an arylalkyl group of 7 to 40 carbon atoms, preferably 7 to 12 carbon atoms.

$R^{29}$ and $R^{30}$ may form a ring together with an atom to which they are bonded.

$M^2$ is silicon, germanium or tin.

The alkyl group is a straight chain or branched alkyl group, and the halogen (for halogenation) is fluorine, chlorine, bromine or iodine, preferably fluorine or chlorine.

Of the compounds of the formula [B-a], preferable are those wherein M is zirconium or hafnium; $R^{21}$s are the same as each other, and are each an alkyl group of 1 to 4 carbon atoms; $R^{22}$ to $R^{28}$ may be the same as or different from each other, and are each hydrogen or an alkyl group of 1 to 4 carbon atoms; $X^3$ and $X^4$ may be the same as or different from each other, and are each an alkyl group of 1 to 3 carbon atoms or a halogen atom; and Z preferably is

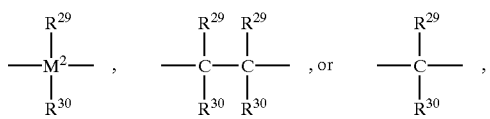

($M^2$ is silicon, and $R^{29}$ and $R^{30}$ may be the same as or different from each other, and are each an alkyl group of 1 to 4 carbon atom or an aryl group of 6 to 10 carbon atoms).

Among such compounds, more preferable are those wherein the substituents $R^{22}$ and $R^{28}$ are each hydrogen, and $R^{23}$ to $R^{27}$ are each an alkyl group of 1 to 4 carbon atoms or hydrogen.

Still more preferable are compounds wherein M is zirconium; $R^{21}$s are the same as each other, and are each an alkyl group of 1 to 4 carbon atoms; $R^{22}$ and $R^{28}$ are each hydrogen; $R^{23}$ to $R^{27}$ may be the same as or different from each other, and are each an alkyl group of 1 to 4 carbon atoms or hydrogen; $X^3$ and $X^4$ are each chlorine; and Z preferably is

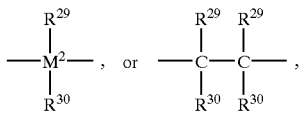

($M^2$ is silicon, and $R^{29}$ and $R^{30}$ may be the same as or different from each other, and are each an alkyl group of 1 to 4 carbon atom or an aryl group of 6 to 10 carbon atoms).

Particularly preferable are compounds wherein M is zirconium; $R^{21}$s are each methyl; $R^{22}$ to $R^{28}$ are each hydrogen; $X^3$ and $X^4$ are chlorine; and Z preferably is

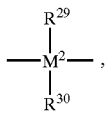

($M^2$ is silicon, and $R^{29}$ and $R^{30}$ may be the same as or different from each other, and are each methyl or phenyl).

Listed below are some examples of the compounds represented by the formula [B-a].

rac-Dimethylsilylene-bis{1-(2-methyl-4,5-benzoindenyl)} zirconium dichloride, rac-Dimethylsilylene-bis{1-(2-methyl-4,5-acenaphthocyclopentadienyl)}zirconium dichloride, rac-Dimethylsilylene-bis{1-(2,3,6-trimethyl-4,5-benzoindenyl)}zirconium dichloride, rac-Methylphenylsilylene-bis{1-(2-methyl-4,5-benzoindenyl)}zirconium dichloride, rac-Methylphenylsilylene-bis{1-(2-methyl-4,5-acenaphthocyclopentadienyl)}zirconium dichloride, rac-Methylphenylsilylene-bis{1-(4,5-benzoindenyl)} zirconium dichloride, rac-Methylphenylsilylene-bis{1-(2,6-dimethyl-4,5-benzoindenyl)}zirconium dichloride, and rac-Methylphenylsilylene-bis{1-(2,3,6-trimethyl-4,5-benzoindenyl)}zirconium dichloride.

Also employable are compounds wherein zirconium is replaced with titanium or hafnium in the above-exemplified compounds.

In the invention, a racemic modification of the metallocene compound represented by the formula [C-a] or [B-a] is generally used as the olefin polymerization catalyst component, but R type or S type is also employable.

The metallocene compounds mentioned above can be used in combination of two or more kinds.

The metallocene compound [a] employable for preparing the long-chain branched ethylene/a-olefin/nonconjugated polyene copolymer rubber (B2) and the long-chain branched ethylene/α-olefin copolymer rubber (F2) that is preferably used in the invention is, for example, a compound represented by the following formula [II].

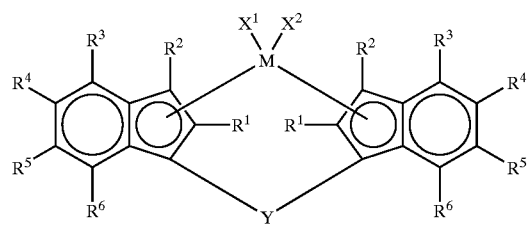

In the formula [II], M is a transition metal atom of Group IVB of the periodic table, specifically titanium, zirconium or hafnium, particularly preferably zirconium.

Substituent $R^1$ $R^1$ is a hydrocarbon group of 1 to 6 carbon atoms, and examples thereof include alkyl groups, such as methyl, ethyl, n-propyl, isopropyl, n-butyl, isobutyl, sec-butyl, tert-butyl, n-pentyl, neopentyl, n-hexyl and cyclohexyl; and alkenyl groups, such as vinyl and propenyl.

Of these, preferable are alkyl groups whose carbon bonded to the indenyl group is primary carbon. More preferable are alkyl groups of 1 to 4 carbon atoms, and particularly preferred are methyl and ethyl.

Substituents $R^2$, $R^4$, $R^5$ and $R^6$ $R^2$, $R^4$, $R^5$ and $R^6$ may be the same as or different from each other, and are each hydrogen, a halogen atom or the same hydrocarbon group of 1 to 6 carbon atoms as described for $R^1$.

The halogen atom is fluorine, chlorine, bromine or iodine.

Substituent $R^3$ $R^3$ is an aryl group of 6 to 16 carbon atoms. This aryl group may be substituted with a halogen atom, a hydrocarbon group of 1 to 20 carbon atoms or an organosilyl group.

Examples of the aryl groups include phenyl, α-naphthyl, β-naphthyl, anthracenyl, phenanthryl, pyrenyl, acenaphthyl, phenalenyl, aceanthrylenyl, tetrahydronaphthyl, indanyl and biphenylyl. Of these, phenyl, naphthyl, anthracenyl and phenanthryl are preferable.

Examples of the hydrocarbon groups of 1 to 20 carbon atoms serving as substituents of the aryl groups include:

alkyl groups, such as methyl, ethyl, propyl, butyl, hexyl, cyclohexyl, octyl, nonyl, dodecyl, eicosyl, norbornyl and adamantyl;

alkenyl groups, such as vinyl, propenyl and cyclohexenyl;

arylalkyl groups, such as benzyl, phenylethyl and phenylpropyl; and aryls groups, such as the above-exemplified aryl groups, tolyl, dimethylphenyl, trimethylphenyl, ethylphenyl, propylphenyl, methylnaphthyl and benzylphenyl.

Examples of the organosilyl groups include trimethylsilyl, triethylsilyl and triphenylsilyl.

Substituents $X^1$ and $X^2$ $X^1$ and $X^2$ are each hydrogen, a halogen atom, a hydrocarbon group of 1 to 20 carbon atoms which may be substituted with halogen, an oxygen-containing group or a sulfur-containing group. Examples of the halogen atoms and the hydrocarbon groups are the same as those mentioned above.

Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituents wherein oxygen is replaced with sulfur in the above-exemplified oxygen-containing groups; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzenesulfinato, p-toluenesulfinato, trimethylbenzenesulfinato and pentafluorobenzenesulfinato.

Of these, $X^1$ and $X^2$ are each preferably a halogen atom or a hydrocarbon group of 1 to 20 carbon atoms.

Y

Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, —NR$^7$—, —P(R$^7$)—, —P(O)(R$^7$)—, —BR$^7$— or —AlR$^7$— (The R$^7$ is hydrogen, a halogen atom, a hydrocarbon group of 1 to 20 carbon atoms or a halogenated hydrocarbon group of 1 to 20 carbon atoms).

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene.

Examples of the divalent halogenated hydrocarbon groups include those wherein the above-exemplified divalent hydrocarbon groups of 1 to 20 carbon atoms are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl) silylene; and alkyldisilyl, alkylaryldisilyl and aryldisilyl groups, such as tetramethyl-1,2-disilyl and tetraphenyl-1,2-disilyl.

Examples of the divalent germanium-containing groups include those wherein silicon is replaced with germanium in the above-exemplified divalent silicon-containing groups.

R$^7$ is the same halogen atom, hydrocarbon group of 1 to 20 carbon atoms or halogenated hydrocarbon group of 1 to 20 carbon atoms as described above.

Of these, Y is preferably a divalent silicon-containing group or a divalent germanium-containing group, more preferably a divalent silicon-containing group, particularly preferably an alkylsilylene group, an alkylarylsilylene group or an arylsilylene group.

Listed below are examples of the metallocene compounds represented by the above formula [II].

rac-Dimethylsilylene-bis(4-phenyl-1-indenyl)zirconium dichloride,
rac-Dimethylsilylene-bis{1-(2-methyl-4-phenylindenyl)} zirconium dichloride,
rac-Dimethylsilylene-bis(2-methyl-4-(α-naphthyl)-1-indenyl)zirconium dichloride,
rac-Dimethylsilylene-bis(2-methyl-4-(β-naphthyl)-1-indenyl)zirconium dichloride,
rac-Dimethylsilylene-bis(2-methyl-4-(1-anthracenyl)-1-indenyl)zirconium dichloride,
rac-Dimethylsilylene-bis(2-methyl-4-(2-anthracenyl)-1-indenyl)zirconium dichloride,
rac-Dimethylsilylene-bis(2-methyl-4-(9-anthracenyl)-1-indenyl)zirconium dichloride,
rac-Dimethylsilylene-bis(2-methyl-4-(9-phenanthryl)-1-indenyl)zirconium dichloride,
rac-Dimethylsilylene-bis(2-methyl-4-(p-fluorophenyl)-1-indenyl)zirconium dichloride,
rac-Dimethylsilylene-bis(2-methyl-4-(pentafluorophenyl)-1-indenyl)zirconium dichloride,
rac-Dimethylsilylene-bis(2-methyl-4-(p-chlorophenyl)-1-indenyl)zirconium dichloride,
rac-Dimethylsilylene-bis(2-methyl-4-(m-chlorophenyl)-1-indenyl)zirconium dichloride,
rac-Dimethylsilylene-bis(2-methyl-4-(o-chlorophenyl)-1-indenyl)zirconium dichloride,
rac-Dimethylsilylene-bis(2-methyl-4-(o,p-dichlorophenyl)-1-indenyl)zirconium dichloride,
rac-Dimethylsilylene-bis(2-methyl-4-(p-bromophenyl)-1-indenyl)zirconium dichloride,
rac-Dimethylsilylene-bis(2-methyl-4-(p-tolyl)-1-indenyl) zirconium dichloride,
rac-Dimethylsilylene-bis(2-methyl-4-(m-tolyl)-1-indenyl)zirconium dichloride,
rac-Dimethylsilylene-bis(2-methyl-4-(o-tolyl)-1-indenyl) zirconium dichloride,
rac-Dimethylsilylene-bis(2-methyl-4-(o,o'-dimethylphenyl)-1-indenyl)zirconium dichloride,
rac-Dimethylsilylene-bis(2-methyl-4-(p-ethylphenyl)-1-indenyl)zirconium dichloride,
rac-Dimethylsilylene-bis(2-methyl-4-(p-i-propylphenyl)-1-indenyl)zirconium dichloride,
rac-Dimethylsilylene-bis(2-methyl-4-(p-benzylphenyl)-1-indenyl)zirconium dichloride,
rac-Dimethylsilylene-bis(2-methyl-4-(p-biphenyl)-1-indenyl)zirconium dichloride,
rac-Dimethylsilylene-bis(2-methyl-4-(m-biphenyl)-1-indenyl)zirconium dichloride,
rac-Dimethylsilylene-bis(2-methyl-4-(p-trimethylsilylenephenyl)-1-indenyl)zirconium dichloride,
rac-Dimethylsilylene-bis(2-methyl-4-(m-trimethylsilylenephenyl)-1-indenyl)zirconium dichloride,
rac-Dimethylsilylene-bis(2-phenyl-4-phenyl)-1-indenyl) zirconium dichloride,
rac-Diethylsilylene-bis(2-methyl-4-phenyl)-1-indenyl) zirconium dichloride,
rac-Di(i-propyl)silylene-bis(2-methyl-4-phenyl-1-indenyl)}zirconium dichloride,
rac-Di(n-butyl)silylene-bis(2-methyl-4-phenyl-1-indenyl)zirconium dichloride,
rac-Dicyclohexylsilylene-bis(2-methyl-4-phenyl-1-indenyl)zirconium dichloride,
rac-Methylphenylsilylene-bis(2-methyl-4-phenyl-1-indenyl)zirconium dichloride,
rac-Diphenylsilylene-bis(2-methyl-4-phenyl-1-indenyl) zirconium dichloride,
rac-Di(p-tolyl)silylene-bis(2-methyl-4-phenyl-1-indenyl) zirconium dichloride,
rac-Di(p-chlorophenyl)silylene-bis(2-methyl-4-phenyl-1-indenyl)zirconium dichloride,
rac-Methylene-bis(2-methyl-4-phenyl-1-indenyl) zirconium dichloride,
rac-Ethylene-bis(2-methyl-4-phenyl-1-indenyl)zirconium dichloride,
rac-Dimethylgermylene-bis(2-methyl-4-phenyl-1-indenyl)zirconium dichloride, rac-Dimethylstannylene-bis(2-methyl-4-phenyl-1-indenyl)zirconium dichloride,
rac-Dimethylsilylene-bis(2-methyl-4-phenyl-1-indenyl)zirconium dibromide,
rac-Dimethylsilylene-bis(2-methyl-4-phenyl-1-indenyl)zirconium dimethyl,
rac-Dimethylsilylene-bis(2-methyl-4-phenyl-1-indenyl)zirconium methylchloride,
rac-Dimethylsilylene-bis(2-methyl-4-phenyl-1-indenyl)zirconium chloride SO₂Me,
rac-Dimethylsilylene-bis(2-methyl-4-phenyl-1-indenyl)zirconium chloride OSO₂Me,
rac-Dimethylsilylene-bis{1-(2-ethyl-4-phenylindenyl)}zirconium dichloride,
rac-Dimethylsilylene-bis{1-(2-ethyl-4-(α-naphthyl)indenyl)}zirconium dichloride,
rac-Dimethylsilylene-bis{1-(2-ethyl-4-(β-naphthyl)indenyl)}zirconium dichloride,
rac-Dimethylsilylene-bis{1-(2-ethyl-4-(2-methyl-1-naphthyl)indenyl)}zirconium dichloride,
rac-Dimethylsilylene-bis{1-(2-ethyl-4-(5-acenaphthyl)indenyl)}zirconium dichloride,
rac-Dimethylsilylene-bis{1-(2-ethyl-4-(9-anthracenyl)indenyl)}zirconium dichloride,
rac-Dimethylsilylene-bis{1-(2-ethyl-4-(9-phenanthryl)indenyl)}zirconium dichloride,
rac-Dimethylsilylene-bis{1-(2-ethyl-4-(o-methylphenyl)indenyl)}zirconium dichloride,
rac-Dimethylsilylene-bis{1-(2-ethyl-4-(m-methylphenyl)indenyl)}zirconium dichloride,
rac-Dimethylsilylene-bis{1-(2-ethyl-4-(p-methylphenyl)indenyl)}zirconium dichloride,
rac-Dimethylsilylene-bis{1-(2-ethyl-4-(2,3-dimethylphenyl)indenyl)}zirconium dichloride,
rac-Dimethylsilylene-bis{1-(2-ethyl-4-(2,4-dimethylphenyl)indenyl)}zirconium dichloride,
rac-Dimethylsilylene-bis{1-(2-ethyl-4-(2,5-dimethylphenyl)indenyl)}zirconium dichloride,
rac-Dimethylsilylene-bis{1-(2-ethyl-4-(2,4,6-trimethylphenyl)indenyl)}zirconium dichloride,
rac-Dimethylsilylene-bis{1-(2-ethyl-4-(o-chlorophenyl)indenyl)}zirconium dichloride,
rac-Dimethylsilylene-bis{1-(2-ethyl-4-(m-chlorophenyl)indenyl)}zirconium dichloride,
rac-Dimethylsilylene-bis{1-(2-ethyl-4-(p-chlorophenyl)indenyl)}zirconium dichloride,
rac-Dimethylsilylene-bis{1-(2-ethyl-4-(2,3-dichlorophenyl)indenyl)}zirconium dichloride,
rac-Dimethylsilylene-bis{1-(2-ethyl-4-(2,6-dichlorophenyl)indenyl)}zirconium dichloride,
rac-Dimethylsilylene-bis{1-(2-ethyl-4-(3,5-dichlorophenyl)indenyl)}zirconium dichloride,
rac-Dimethylsilylene-bis{1-(2-ethyl-4-(2-bromophenyl)indenyl)}zirconium dichloride,
rac-Dimethylsilylene-bis{1-(2-ethyl-4-(3-bromophenyl)indenyl)}zirconium dichloride,
rac-Dimethylsilylene-bis{1-(2-ethyl-4-(4-bromophenyl)indenyl)}zirconium dichloride,
rac-Dimethylsilylene-bis{1-(2-ethyl-4-(4-biphenylyl)indenyl)}zirconium dichloride,
rac-Dimethylsilylene-bis{1-(2-ethyl-4-(4-trimethylsilylphenyl)indenyl))}zirconium dichloride,
rac-Dimethylsilylene-bis{1-(2-n-propyl-4-phenylindenyl)}zirconium dichloride,
rac-Dimethylsilylene-bis{1-(2-n-propyl-4-(α-naphthyl)indenyl)}zirconium dichloride,
rac-Dimethylsilylene-bis{1-(2-n-propyl-4-(β-naphthyl)indenyl)}zirconium dichloride,
rac-Dimethylsilylene-bis{1-(2-n-propyl-4-(2-methyl-1-naphthyl)indenyl)}zirconium dichloride,
rac-Dimethylsilylene-bis{1-(2-n-propyl-4-(5-acenaphthyl)indenyl)}zirconium dichloride,
rac-Dimethylsilylene-bis{1-(2-n-propyl-4-(9-anthracenyl)indenyl)}zirconium dichloride,
rac-Dimethylsilylene-bis{1-(2-n-propyl-4-(9-phenanthryl)indenyl)}zirconium dichloride,
rac-Dimethylsilylene-bis{1-(2-i-propyl-4-phenylindenyl)}zirconium dichloride,
rac-Dimethylsilylene-bis{1-(2-i-propyl-4-(α-naphthyl)indenyl)}zirconium dichloride,
rac-Dimethylsilylene-bis{1-(2-i-propyl-4-(β-naphthyl)indenyl)}zirconium dichloride,
rac-Dimethylsilylene-bis{1-(2-i-propyl-4-(8-methyl-9-naphthyl)indenyl)}zirconium dichloride,
rac-Dimethylsilylene-bis{1-(2-i-propyl-4-(5-acenaphthyl)indenyl)}zirconium dichloride,
rac-Dimethylsilylene-bis{1-(2-i-propyl-4-(9-anthracenyl)indenyl)}zirconium dichloride,
rac-Dimethylsilylene-bis{1-(2-i-propyl-4-(9-phenanthryl)indenyl)}zirconium dichloride,
rac-Dimethylsilylene-bis{1-(2-s-butyl-4-phenylindenyl)}zirconium dichloride,
rac-Dimethylsilylene-bis{1-(2-s-butyl-4-(α-naphthyl)indenyl)}zirconium dichloride,
rac-Dimethylsilylene-bis{1-(2-s-butyl-4-(β-naphthyl)indenyl)}zirconium dichloride,
rac-Dimethylsilylene-bis{1-(2-s-butyl-4-(2-methyl-1-naphthyl)indenyl)}zirconium dichloride,
rac-Dimethylsilylene-bis{1-(2-s-butyl-4-(5-acenaphthyl)indenyl)}zirconium dichloride,
rac-Dimethylsilylene-bis{1-(2-s-butyl-4-(9-anthracenyl)indenyl)}zirconium dichloride,
rac-Dimethylsilylene-bis{1-(2-s-butyl-4-(9-phenanthryl)indenyl)}zirconium dichloride,
rac-Dimethylsilylene-bis{1-(2-n-pentyl-4-phenylindenyl)}zirconium dichloride,
rac-Dimethylsilylene-bis{1-(2-n-pentyl-4-(α-naphthyl)indenyl)}zirconium dichloride,
rac-Dimethylsilylene-bis{1-(2-n-butyl-4-phenylindenyl)}zirconium dichloride,
rac-Dimethylsilylene-bis{1-(2-n-butyl-4-(α-naphthyl)indenyl)}zirconium dichloride,
rac-Dimethylsilylene-bis{1-(2-n-butyl-4-(β-naphthyl)indenyl)}zirconium dichloride,
rac-Dimethylsilylene-bis{1-(2-n-butyl-4-(2-methyl-1-naphthyl)indenyl)}zirconium dichloride,
rac-Dimethylsilylene-bis{1-(2-n-butyl-4-(5-acenaphthyl)indenyl)}zirconium dichloride,
rac-Dimethylsilylene-bis{1-(2-n-butyl-4-(9-anthracenyl)indenyl)}zirconium dichloride,
rac-Dimethylsilylene-bis{1-(2-n-butyl-4-(9-phenanthryl)indenyl)}zirconium dichloride,
rac-Dimethylsilylene-bis{1-(2-i-butyl-4-phenylindenyl)}zirconium dichloride, rac-Dimethylsilylene-bis{1-(2-i-butyl-4-(α-naphthyl)indenyl)}zirconium dichloride,
rac-Dimethylsilyiene-bis{1-(2-i-butyl-4-(β-naphthyl)indenyl)}zirconium dichloride,
rac-Dimethylsilylene-bis{1-(2-i-butyl-4-(2-methyl-1-naphthyl)indenyl)}zirconium dichloride,
rac-Dimethylsilyiene-bis{1-(2-i-butyl-4-(5-acenaphthyl)indenyl)}zirconium dichloride,
rac-Dimethylsilylene-bis{1-(2-i-butyl-4-(9-anthracenyl)indenyl)}zirconium dichloride,
rac-Dimethylsilylene-bis{1-(2-i-butyl-4-(9-phenanthryl)indenyl)}zirconium dichloride,
rac-Dimethylsilylene-bis{1-(2-neopentyl-4-phenylindenyl)}zirconium dichloride,
rac-Dimethylsilylene-bis{1-(2-neopentyl-4-(α-naphthyl)indenyl)}zirconium dichloride,
rac-Dimethylsilylene-bis{1-(2-n-hexyl-4-phenylindenyl)}zirconium dichloride,
rac-Dimethylsilylene-bis{1-(2-n-hexyl-4-(α-naphthyl)indenyl)}zirconium dichloride,
rac-Methylphenylsilylene-bis{1-(2-ethyl-4-phenylindenyl)}zirconium dichloride,
rac-Methylphenylsilylene-bis{1-(2-ethyl-4-(α-naphthyl)indenyl)}zirconium dichloride,
rac-Methylphenylsilylene-bis{1-(2-ethyl-4-(9-anthracenyl)indenyl)}zirconium dichiloride,
rac-Methylphenylsilylene-bis{1-(2-ethyl-4-(9-phenanthryl)indenyl)}zirconium dichloride,
rac-Diphenylsilylene-bis{1-(2-ethyl-4-phenylindenyl)}zirconium dichloride,
rac-Diphenylsilylene-bis{1-(2-ethyl-4-(α-naphthyl)indenyl)}zirconium dichloride,
rac-Diphenylsilylene-bis{1-(2-ethyl-4-(9-anthracenyl)indenyl)}zirconium dichloride,
rac-Diphenylsilylene-bis{1-(2-ethyl-4-(9-phenanthryl)indenyl)}zirconium dichloride,
rac-Diphenylsilylene-bis{1-(2-ethyl-4-(4-biphenylyl)indenyl)}zirconium dichloride,
rac-Methylene-bis{1-(2-ethyl-4-phenylindenyl)} zirconium dichloride,
rac-Methylene-bis{1-(2-ethyl-4-(α-naphthyl)indenyl)} zirconium dichloride,
rac-Ethylene-bis{1-(2-ethyl-4-phenylindenyl)}zirconium dichloride,
rac-Ethylene-bis{1-(2-ethyl-4-(α-naphthyl)indenyl)} zirconium dichloride,
rac-Ethylene-bis{1-(2-n-propyl-4-(α-naphthyl)indenyl)} zirconium dichloride,
rac-Dimethylgermyl-bis{1-(2-ethyl-4-phenylindenyl)} zirconium dichloride,
rac-Dimethylgermyl-bis{1-(2-ethyl-4-(α-naphthyl)indenyl)}zirconium dichloride, and
rac-Dimethylgermyl-bis{1-(2-n-propyl-4-phenylindenyl)} zirconium dichloride.

Also employable are compounds wherein zirconium is replaced with titanium or hafnium in the above-exemplified compounds.

In the invention, a racemic modification of the metallocene compound is generally used as the catalyst component, but R type or S type is also employable.

The metallocene compounds mentioned above can be used in combination of two or more kinds.

The metallocene compounds can be prepared in accordance with "Journal of Organometallic Chem.", 288 (1985), pp. 63–67 and European Patent Application No. 0,320,762.

Other than the metallocene compound of the formula [II], a compound represented by the following formula [III] is also employable.

$$L^a MX_2 \quad [III]$$

wherein

M is a metal of Group IV of the periodic table or a metal of lanthanide series;

$L^a$ is a derivative of delocalization π bond group and imparts restraint geometrical shape to the metal M active site; and Xs are each independently hydrogen, a halogen atom, a hydrocarbon group containing 20 or less carbon atoms, silicon or germanium, a silyl group or a germyl group.

Of the compounds of the formula [III], preferable are those represented by the following formula [III-a].

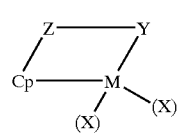

[III-a]

In the formula [III-a], M is titanium, zirconium or hafnium, and X is the same as described above.

Cp is π-bonded to M and is a substituted cyclopentadienyl group having a substituent Z or its derivative.

Z is oxygen, sulfur, boron or an element of Group IVA of the periodic table.

Y is a ligand containing nitrogen, phosphorus, oxygen or sulfur.

Z and Y may together form a condensed ring.

Listed below are examples of the compounds represented by the formula [III-a].

(Dimethyl(t-butylamide)(tetramethyl-$\eta^5$-cyclopentadienyl)silane)titanium dichloride,
((t-Butylamide)(tetramethyl-$\eta^5$-cyclopentadienyl)-1,2-ethanediyl)titanium dichloride,
(Dibenzyl(t-butylamide)(tetramethyl-$\eta^5$-cyclopentadienyl)silane)titanium dichloride,
(Dimethyl(t-butylamide)(tetramethyl-$\eta^5$-cyclopentadienyl)silane)dibenzyltitanium,
(Dimethyl(t-butylamide)(tetramethyl-$\eta^5$-cyclopentadienyl)silane)dimethyltitanium,
((t-Butylamide)(tetramethyl-$\eta^5$-cyclopentadienyl)-1,2-ethanediyl)dibenzyltitanium,
((Methylamide)(tetramethyl-$\eta^5$-cyclopentadienyl)-1,2-ethanediyl)dineopentyltitanium,
((Phenylphosphide)(tetramethyl-$\eta^5$cyclopentadienyl)methylene)diphenyltitanium,
(Dibenzyl(t-butylamide)(tetramethyl-$\eta^5$-cyclopentadienyl)silane)dibenzyltitanium,
(Dimethyl(benzylamide)($\eta^5$-cyclopentadienyl)silane)di(trimethylsilyl)titanium,
(Dimethyl(phenylphosphide)-(tetramethyl-$\eta^5$-cyclopentadienyl)silane)dibenzyltitanium,
(Tetramethyl-$\eta^5$-cyclopentadienyl)-1,2-ethanediyl)dibenzyltitanium,
(2-$\eta^5$-(Tetramethyl-cyclopentadienyl)-1methyl-ethanolate(2-))dibenzyltitanium, (2-η⁵-(Tetramethyl-cyclopentadienyl)-1methylethanolate (2-))dimethyltitanium, (2-((4a,4b,8a,9,9a-η)-9H-Fluorene-9-yl)cyclohexanolate (2-))dimethyltitanium, and (2-((4a,4b,8a,9,9a-η)-9H-Fluorene-9-yl)cyclohexanolate (2-))dibenzyltitanium.

In the invention, the metallocene compounds represented by the formula [III] can be used in combination of two or more kinds.

Some of titanium compounds are listed above as examples of the metallocene compounds, but compounds wherein titanium is replaced with zirconium or hafnium in the above-exemplified titanium compounds are also employable.

These compounds may be used alone or in combination of two or more kinds.

Of the above-mentioned various metallocene compounds, the metallocene compound represented by the formula [II] is preferably used in the preparation of the long-chained branched ethylene/α-olefin/nonconjugated polyene copolymer rubber (B2) and the long-chain branched ethylene/α-olefin copolymer rubber (F2).

Organoaluminum Oxy-compound [b]

The organoaluminum oxy-compound [b] used in the invention may be aluminoxane conventionally known or a benzene-insoluble organoaluminum oxy-compound exemplified in Japanese Patent Laid-Open Publication No. 78687/1990.

The conventionally known aluminoxane can be prepared by, for example, the following procedures.

(1) An organoaluminum compound such as trialkylaluminum is added to a hydrocarbon medium suspension of compounds containing adsorbed water or salts containing water of crystallization, e.g., magnesium chloride hydrate, copper sulfate hydrate, aluminum sulfate hydrate, nickel sulfate hydrate or cerous chloride hydrate, so as to allow the organoaluminum compound to react with the compound or the salt, followed by recovering aluminoxane as its hydrocarbon solution.

(2) Water, ice or water vapor is allowed to directly act on an organoaluminum compound such as trialkylaluminum in a medium such as benzene, toluene, ethyl ether or tetrahydrofuran, followed by recovering aluminoxane as its hydrocarbon solution.

(3) An organotin oxide such as dimethyltin oxide or dibutyltin oxide is allowed to react with an organoaluminum compound such as trialkylaluminum in a medium such as decane, benzene or toluene.

The aluminooxane may contain a small amount of an organometallic component. Further, it is possible that the solvent or the unreacted organoaluminum compound is distilled off from the recovered solution of aluminooxane and that the remainder is redissolved in a solvent.

Examples of the organoaluminum compounds used for preparing the aluminoxane include:

trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, particularly preferable are trialkylaluminums and tricycloalkylaluminums.

Also employable as the organoaluminum compound used for preparing the aluminoxane is isoprenylaluminum represented by the formula $(i-C_4H_9)_xAl_y(C_5H_{10})_z$ (wherein x, y, z are each a positive number, and $z \geq 2x$).

The organoaluminum compounds mentioned above can be used in combination of two or more kinds.

Examples of the solvents used for preparing the aluminoxane include:

aromatic hydrocarbons, such as benzene, toluene, xylene, cumene and cymene;

aliphatic hydrocarbons, such as pentane, hexane, heptane, octane, decane, dodecane, hexadecane and octadecane;

alicyclic hydrocarbons, such as cyclopentane, cyclohexane, cyclooctane and methylcyclopentane;

petroleum fractions, such as gasoline, kerosine and gas oil; and halides of these aromatic, aliphatic and alicyclic hydrocarbons, particularly chlorides and bromides thereof.

Also employable are ethers such as ethyl ether and tetrahydrofuran.

Of the solvents, particularly preferable are aromatic hydrocarbons.

Compound [c] which Reacts with the Metallocene Compound [a] to Form an Ion Pair

The compound [c] which reacts with the metallocene compound [a] to form an ion pair includes Lewis acid, ionic compounds, borane compounds and carborane compounds described in National Publications of international Patent No. 501950/1989 and No. 502036/1989, Japanese Patent Laid-Open Publication No. 179005/1991, No. 179006/1991, No. 207703/1991 and No. 207704/1991, and U.S. Pat. No. 5,321,106.

The Lewis acid includes Mg-containing Lewis acid, Al-containing Lewis acid and B-containing Lewis acid. Of these, B-containing Lewis acid is preferred.

The Lewis acid which contains a boron atom is, for example, a compound represented by the following formula:

wherein $R^1$, $R^2$ and $R^3$ are each independently a phenyl group which may have a substituent such as fluorine, methyl or trifluoromethyl, or a fluorine atom.

Examples of the compounds represented by the above formula include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron. Of these, particularly preferred is tris(pentafluorophenyl)boron.

The ionic compound employable in the invention is a salt comprising a cationic compound and an anionic compound. The anion reacts with the metallocene compound [a] to render the compound [a] cationic and to form an ion pair, thereby to stabilize the transition metal cation seed. Examples of such anions include organoboron compound anion, organoarsenic compound anion and organoaluminum compound anion. Preferable are anions which are relatively bulky and stabilize the transition metal cation seed. Examples of the cations include metallic cation, organometallic cation, carbonium cation, tripium cation, oxonium cation, sulfonium cation, phosphonium cation and ammonium cation. More specifically, there can be mentioned triphenylcarbenium cation, tributylammonium cation, N,N-dimethylammonium cation, ferrocenium cation, etc.

In the invention, ionic compounds containing an organoboron compound anion are preferred, and examples thereof include:

trialkyl-substituted ammonium salts, such as triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl)boron, tri(n-butyl)ammoniumtetra(o-tolyl)boron and tri(n-butyl)ammoniumtetra(4-fluorophenyl)boron;

N,N,-dialkylanilinium salts, such as N,N-dimethylaniliniumtetra(phenyl)boron, N,N-diethylaniliniumtetra(phenyl)boron and N,N-2,4,6-pentamethylaniliniumtetra(phenyl)boron;

dialkylammonium salts, such as di(n-propyl)ammoniumtetra(pentafluorophenyl)boron and dicyclohexylammoniumtetra(phenyl)boron; and triarylphosphonium salts, such as triphenylphosphoniumtetra(phenyl)boron, tri(methylphenyl)phosphoniumtetra(phenyl)boron and tri(dimethylphenyl)phosphoniumtetra(phenyl)boron.

As the ionic compounds containing a boron atom, triphenylcarbeniumtetrakis(pentafluorophenyl)borate, N,N-dimethylaniliniumtetrakis(pentafluorophenyl)borate and ferroceniumtetrakis(pentafluorophenyl)borate are also employable in the invention.

Further, the following ionic compounds containing a boron atom are also employable. (In the ionic compounds enumerated below, the counter ion is tri(n-butyl)ammonium, but the counter ion is in no way limited thereto.)

That is, there can be mentioned salts of anion, for example, bis[tri(n-butyl)ammonium]nonaborate, bis[tri(n-butyl)ammonium]decaborate, bis[tri(n-butyl)ammonium]undecaborate, bis[tri(n-butyl)ammonium]dodecaborate, bis(tri(n-butyl)ammoniumJdecachlorodecaborate, bis[tri(n-butyl)ammonium]dodecachlorododecaborate, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate and tri(n-butyl)ammoniumbromo-1-carbadodecaborate.

Moreover, borane compounds and carborane compounds are also employable. These compounds are used as the Lewis acid or the ionic compounds.

Examples of borane compounds, carborane complex compounds and salts of carborane anions include decaborane(14), 7,8-dicarbaundecaborane(13), 2,7-dicarbaundecaborane(13), undecahydride-7,8-dimethyl-7,8-dicarbaundecaborane, dodecahydride-11-methyl-2,7-dicarbaundecaborane, tri(n-butyl)ammonium-6-carbadecaborate(14), tri(n-butyl)ammonium-6-carbadecaborate(12), tri(n-butyl)ammonium-7-carbaundecaborate(13), tri(n-butyl)ammonium-7,8-dicarbaundecaborate(12), tri(n-butyl)ammonium-2,9-dicarbaundecaborate(12), tri(n-butyl)ammoniumdodecahydride-8-methyl-7,9-dicarbaundecaborate, tri(n-butyl)ammoniumundecahydride-8-ethyl-7,9-dicarbaundecaborate, tri(n-butyl)ammoniumundecahydride-8-butyl-7,9-dicarbaundecaborate, tri(n-butyl)ammoniumundecahydride-8-allyl-7,9-dicarbaundecaborate, tri(n-butyl)ammoniumundecahydride-9-trimethylsilyl-7,8-dicarbaundecaborate and tri(n-butyl)ammoniumundecahydride-4,6-dibromo-7-carbaundecaborate.

Examples of carborane compounds and salts of carboranes include 4-carbanonaborane(14), 1,3-dicarbanonaborane(13), 6,9-dicarbadecaborane(14), dodecahydride-1-phenyl-1,3-dicarbanonaborane, dodecahydride-1-methyl-1,3-dicarbanonaborane and undecahydride-1,3-dimethyl-1,3-dicarbanonaborane.

Furthermore, the following compounds are also employable. (In the ionic compounds enumerated below, the counter ion is tri(n-butyl)ammonium, but the counter ion is in no way limited thereto.)

That is, there can be mentioned salts of metallic carboranes and metallic borane anions, for example, tri(n-butyl)ammoniumbis(nonahydride-1,3dicarbanonaborate)cobaltate(III), tri(n-butyl)ammoniumbis(undecahydride-7,8-dicarbaundecaborate)ferrate(III), tri(n-butyl)ammoniumbis(undecahydride-7,8-dicarbaundecaborate)cobaltate(III), tri(n-butyl)ammoniumbis(undecahydride-7,8-dicarbaundecaborate)nickelate(III), tri(n-butyl)ammoniumbis(undecahydride-7,8-dicarbaundecaborate)cuprate(III), tri(n-butyl)ammoniumbis(undecahydride-7,8-dicarbaundecaborate)aurate(III), tri(n-butyl)ammoniumbis(nonahydride-7,8-dimethyl-7,8-dicarbaundecaborate)ferrate(III), tri(n-butyl)ammoniumbis(nonahydride-7,8-dimethyl-7,8-dicarbaundecaborate)chromate(III), tri(n-butyl)ammoniumbis(tribromooctahydride-7,8-dicarbaundecaborate)cobaltate(III), tri(n-butyl)ammoniumbis(dodecahydridedicarbadodecaborate)cobaltate(III), bis[tri(n-butyl)ammonium]bis(dodecahydridedodecaborate)nickelate(III), tris[tri(n-butyl)ammonium]bis(undecahydride-7-carbaundecaborate)chromate(III), bis[tri(n-butyl)ammonium]bis(undecahydride-7-carbaundecaborate)manganate(IV), bis[tri(n-butyl)ammonium]bis(undecahydride-7-carbaundecaborate)cobaltate(III) and bis[tri(n-butyl)ammonium]bis(undecahydride-7-carbaundecabaundecaborate)nickelate(IV).

The compounds [c] mentioned above can be used singly or in combination of two or more kinds.

Organoaluminum Compound [d]

The organoaluminum compound [d] used in the invention can be represented by, for example, the following general formula (a):

$$R^5_n AlX_{3-n} \tag{a}$$

wherein $R^5$ is a hydrocarbon group of 1 to 12 carbon atoms, X is a halogen atom or hydrogen, and n is 1 to 3.

In the formula (a), $R^5$ is a hydrocarbon group of 1 to 12 carbon atoms, e.g., an alkyl group, a cycloalkyl group or an aryl group. Examples of such groups include methyl, ethyl, n-propyl, isopropyl, isobutyl, pentyl, hexyl, octyl, cyclopentyl, cyclohexyl, phenyl and tolyl.

Examples of such organoaluminum compounds include:
trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound [d] is a compound represented by the following formula (b):

$$R^5{}_n AlY_{3-n} \quad (b)$$

wherein $R^5$ is the same as $R^5$ in the formula (a); Y is —$OR^6$ group, —$OSiR^7{}_3$ group, —$OAlR^8{}_2$ group, —$NR^9{}_2$ group, —$SiR^{10}{}_3$ group or —$N(R^{11})AlR^{12}{}_2$ group; n is 1 to 2; $R^6$, $R^7$, $R^8$ and $R^{12}$ are each methyl, ethyl, isopropyl, isobutyl, cyclohexyl, phenyl or the like; $R^9$ is hydrogen, methyl, ethyl, isopropyl, phenyl, trimethylsilyl or the like; and $R^{10}$ and $R^{11}$ are each methyl, ethyl or the like.

Examples of such organoaluminum compounds include:

(i) compounds of the formula $R^5{}_n Al(OR^6)_{3-n}$, e.g., dimethylaluminum methoxide, diethylaluminum ethoxide and diisobutylaluminum methoxide;

(ii) compounds of the formula $R^5{}_n Al(OSiR^7{}_3)_{3-n}$, e.g., $(C_2H_5)_2Al$ $(OSi(CH_3)_3)$, $(iso-C_4H_9)_2Al(OSi(CH_3)_3)$ and $(iso-C_4H_9)_2Al(OSi(C_2H_5)_3)$;

(iii) compounds of the formula $R^5{}_n Al(OAlR^8{}_2)_{3-n}$, e.g., $(C_2H_5)_2Al(OAl(C_2H_5)_2)$ and $(iso-C_4H_9)_2Al$ $(OAl(iso-C_4H_9)_2)$;

(iv) compounds of the formula $R^5{}_n Al(NR^9{}_2)_{3-n}$, e.g., $(CH_3)_2Al(N(C_2H_5)_2)$, $(C_2H_5)_2Al(NH(CH_3))$, $(CH_3)_2Al(NH(C_2H_5))$, $(C_2H_5)_2Al[N(Si(CH_3)_3)_2]$ and $(iso-C_4H_9)_2Al[N(Si(CH_3)_3)_2]$; and (v) compounds of the formula $R^5{}_n Al(SiR^{10}{}_3)_{3-n}$, e.g., $(iso-C_4H_9)_2Al(Si(CH_3)_3)$.

Of these, preferable are organoaluminum compounds of the formulae $R^5{}_3Al$, $R^5{}_nAl(OR^6)_{3-n}$, and $R^5{}_nAl(OAlR^8{}_2)_{3-n}$, and particularly preferred are compounds of said formulae wherein $R^5$ is an isoalkyl group and n is 2. The organoaluminum compounds mentioned above can be used in combination of two or more kinds.

The specific metallocene catalyst employable in the invention contains the metallocene compound [a], and the catalyst can be formed from, for example, the metallocene compound [a] and the organoaluminum oxy-compound [b] as mentioned above. The metallocene catalyst may be formed from the metallocene compound [a] and the compound [c] which reacts with the compound [a] to form an ion pair, or it may be formed from the metallocene compound [a], the organoaluminum oxy-compound [b] and the compound [c] which forms an ion pair. In these embodiments, it is particularly preferable to further use the organoaluminum compound [d] in combination.

In the present invention, the metallocene compound [a] is used in an amount of usually about 0.00005 to 0.1 mmol, preferably about 0.0001 to 0.05 mmol, in terms of the transition metal atom, based on 1 liter of the polymerization volume.

The organoaluminum oxy-compound [b] is used in such an amount that the amount of the aluminum atom becomes usually about 1 to 10,000 mol, preferably 10 to 5,000 mol, per 1 mol of the transition metal atom.

The compound [c] which reacts with the metallocene compound [a] to form an ion pair is used in such an amount that the amount of the boron atom becomes usually about 0.5 to 20 mol, preferably 1 to 10 mol, based on 1 mol of the transition metal atom.

The organoaluminum compound [d] is used optionally in an amount of usually about 0 to 1,000 mol, preferably about 0 to 500 mol, based on 1 mol of the aluminum atom in the organoaluminum oxy-compound [b] or the boron atom in the compound [c] which forms an ion pair.

By copolymerizing ethylene and an α-olefin of 3 to 20 carbon atoms or copolymerizing these components and a nonconjugated polyene using the above-mentioned metallocene catalyst, the linear or long-chain branched ethylene/α-olefin copolymer rubber (F) or the linear or long-chain branched ethylene/(α-olefin/nonconjugated polyene copolymer rubber (B) can be obtained with high polymerization activities.

However, even if ethylene, an α-olefin of 3 to 20 carbon atoms and a nonconjugated polyene are copolymerized using a Group VB transition metal compound catalyst such as a vanadium catalyst, it is impossible to obtain copolymer rubbers with high polymerization activity.

Further, in the preparation of, for example, an ethylene/1-butene/nonconjugated copolymer rubber or EPDM using the Group VB transition metal compound catalyst, the kinds of the nonconjugated polyenes employable are often limited to norbornene ring-containing polyenes such as ENB.

On the other hand, when the metallocene catalyst is used similarly to the present invention, the kinds of the nonconjugated polyenes are not limited to the norbornene ring-containing polyenes, and the aforementioned various kinds of polyenes including chain nonconjugated polyenes such as methyloctadiene (MOD, e.g., 7-methyl-1,6-octadiene) are also copolymerizable.

In the copolymerization of ethylene and an α-olefin of 3 to 20 carbon atoms or copolymerization of these components and a nonconjugated polyene, the metallocene compound [a], the organoaluminum oxy-compound [b] and the compound [c] which forms an ion pair, and optionally, the organoaluminum compound [d], all of which constitute the metallocene catalyst, may be separately fed to the polymerization reactor, or a preliminarily prepared metallocene catalyst containing the metallocene compound [a] may be added to the polymerization reaction system.

In the preparation of the metallocene catalyst, hydrocarbon solvents which are inert to the catalyst components can be employed. Examples of the inert hydrocarbon solvents include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; and halogenated hydrocarbons, such as ethylene chloride, chlorobenzene and dichloromethane. These hydrocarbon solvents can be used singly or in combination.

The metallocene compound [a], the organoaluminum oxy-compound [b], the compound [c] which forms an ion pair and the organoaluminum compound [d] can be contacted with each other at a temperature of usually −100 to 200° C., preferably −70 to 100° C.

In the present invention, copolymerization of ethylene, the α-olefin of 3 to 20 carbon atoms and the nonconjugated polyene can be carried out under the conditions of a temperature of usually 40 to 200° C., preferably 50 to 150° C., particularly preferably 60 to 120 ° C., and a pressure of atmospheric pressure to 100 kg/cm², preferably atmospheric pressure to 50 kg/cm², particularly preferably atmospheric pressure to 30 kg/cm². The residence time (polymerization reaction time) is in the range of usually 0.1 to 4 hours.

On the other hand, copolymerization of ethylene and the (α-olefin of 3 to 20 carbon atoms can be carried out under the conditions of a temperature of usually 40 to 250 ° C., preferably 50 to 200° C., particularly preferably 60 to 160° C., and a pressure of atmospheric pressure to 100 kg/cm², preferably atmospheric pressure to 50 kg/cm², particularly preferably atmospheric pressure to 30 kg/cm². The residence time (polymerization reaction time) is in the range of usually 0.1 to 4 hours, preferably 0.2 to 2 hours.

These polymerization reactions can be conducted by various polymerization processes, but they are preferably conducted by a solution polymerization process. In the solution polymerization process, the aforesaid hydrocarbon solvents are employable as the polymerization solvents.

Though the copolymerization can be carried out by any of batchwise, semi-continuous and continuous processes, it is preferably carried out continuously. The polymerization can be carried out in two more stages under different reaction conditions.

The ethylene/α-olefin/nonconjugated polyene copolymer rubber (B) and the ethylene/α-olefin copolymer rubber (F) used in the invention are obtained by the processes mentioned above, and the molecular weight of these copolymer rubbers can be modified by varying the polymerization conditions such as polymerization temperature or controlling the amount of hydrogen (molecular weight modifier).

EFFECT OF THE INVENTION

The olefin thermoplastic elastomer composition according to the invention comprises the crystalline polyolefin resin (A) and the ethylene/(α-olefin/nonconjugated polyene copolymer rubber (B) in a specific ratio. The copolymer rubber (B) is a random copolymer of ethylene, an α-olefin of 3 to 20 carbon atoms and a nonconjugated polyene prepared by the use of a metallocene catalyst containing a specific metallocene compound, and this copolymer rubber has a specific molar ratio of the units derived from ethylene to the units derived from the α-olefin of 3 to 20 carbon atoms, a specific iodine value and a specific intrinsic viscosity (η). Therefore, even if the composition of the invention is in the non-crosslinked form, it can provide molded products of more excellent tensile strength, elongation at break, elastomeric properties, heat resistance and low-temperature properties than the conventional non-crosslinked olefin thermoplastic elastomers.

The olefin thermoplastic elastomer composition of the invention comprises the components (A) and (B) in a specific ratio as described above, and therefore, especially when the composition is in the partially or completely crosslinked form, it can provide molded products of more excellent low-temperature properties, tensile strength, elongation at break and elastomeric properties than the conventional vulcanized rubbers.

The other olefin thermoplastic elastomer composition according to the invention comprises the crystalline polyolefin resin (E) and the specific ethylene/α-olefin copolymer rubber (F) in a specific ratio, and is crosslinked. Therefore, this composition can provide molded products of more excellent tensile properties such as tensile strength and elongation at break than the conventional vulcanized rubbers.

EXAMPLE

The present invention will be further described with reference to the following examples, but it should be construed that the invention is in no way limited to those examples.

Properties of the olefin thermoplastic elastomer compositions obtained in Examples 1 to 12 and Comparative Examples 1 to 6 were measured by the following methods.
Measurement of Properties (1) Tensile Strength The tensile strength at break was measured in accordance with JIS K 6301 at a stress rate of 200 mm/min.

(2) Elongation at Break

The elongation at break was measured in accordance with JIS K 6301 at a stress rate of 200 mm/min.

(3) Elongation Set

The elongation set was measured in accordance with JIS K 6301. In this method, the length maintained was a length corresponding to an elongation of 100%.

Properties of the olefin thermoplastic elastomer compositions obtained in Examples 13 to 19 and Comparative Examples 7 to 10 were measured by the following methods.
Measurement of Properties (1) Hardness The JIS A hardness was measured in accordance with JIS K 6301.

(2) Tensile Strength

The tensile strength at break was measured in accordance with JIS K 6301 at a stress rate of 200 mm/min.

(3) Elongation at Break

The elongation at break was measured in accordance with JIS K 6301 at a stress rate of 200 mm/min.

Examples 1-12 Relating to Olefin Thermoplastic Elastomer Compositions of the Invention, Comparative Examples 1-6

Reference Example 1

Pre-contact of Zirconium Compound with Methylaluminooxane and Preparation of Catalyst Solution Zirconium compound: rac-Dimethylsilylene-bis{1-(2-ethyl-4-isopropyl-7-methylindenyl)}zirconium dichloride

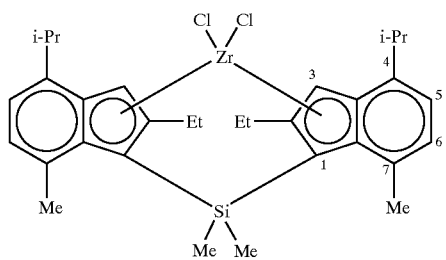

A zirconium compound of the above formula in a given amount and a toluene solution of methylaluminooxane (1.2 mg.atom/ml in terms of aluminum atom) were mixed under stirring at room temperature for 30 minutes in a dark place, to prepare a toluene solution of the zirconium compound and methylaluminooxane. The toluene solution had a Zr concentration of 0.004 mmol/ml and a methylaluminooxane concentration of 1.2 mg.atom/ml in terms of aluminum atom.

To the toluene solution was added hexane in an amount of 5 times as much as toluene with stirring, to prepare a catalyst solution having the following Zr concentration and methylaluminooxane concentration. This catalyst solution was used as a catalyst for polymerization reaction.

Zr concentration: 0.00067 mmol/ml (=0.67 mmol/l)

Methylaluminooxane concentration (in terms of aluminum atom): 0.20 mmol/ml (=200 mmol/l)

Polymerization

In a 15 liter stainless steel polymerization reactor equipped with a stirrer, copolymerization of ethylene, 1-butene and 5-ethylidene-2-norbornene (sometimes referred to as "ENB" hereinafter) was continuously carried out in the presence of the polymerization reaction catalyst obtained above.

That is, to the reactor were continuously fed, from an upper part of the reactor, dehydrated and purified hexane at a feed rate of 3.185 l/hr, the catalyst solution at a feed rate of 0.67 l/hr, a hexane solution of triisobutylaluminum (concentration: 17 mmol/l) at a feed rate of 0.3 l/hr and a hexane solution of ENB (concentration: 0.02 l/l) at a feed rate of 1.5 l/hr.

Further, to the reactor were continuously fed, from the upper part of the reactor, ethylene at a feed rate of 200 /hr and 1-butene at a feed rate of 155 l/hr. The copolymerization reaction was conducted under the conditions of a temperature of 80° C. and a mean residence time of 1 hour (polymerization scale: 5 liters).

Then, to the polymerization solution drawn out from the bottom of the reactor was added a small amount of methanol to terminate the polymerization reaction. The solution was then subjected to steam stripping to separate a polymer from the solvent. Then, the polymer was dried at 100° C. for 24 hours under reduced pressure (100 mmHg).

Thus, an ethylene/1-butene/ENB copolymer rubber (copolymer rubber (B-1)) was obtained in an yield of 250 g per hour.

The copolymer rubber thus obtained had a molar ratio of the units derived from ethylene to the units derived from 1-butene of 79/21 (ethylene/1-butene) and an iodine value based on ENB of 10.

The copolymer rubber had an intrinsic viscosity ($\eta$), as measured in decalin at 135° C., of 2.7 dl/g, an intensity ratio D of T$\alpha\beta$ to T$\alpha\alpha$ in the $^{13}$C-NMR spectrum of less than 0.01, a B value of 1.1, a glass transition temperature (Tg) of −56° C. and a g$\eta$* value of 0.98.

The results are set forth in Table 1

Reference Examples 2 and 3

Ethylene/$\alpha$-olefin/nonconjugated polyene copolymer rubbers (copolymer rubbers (B-2) and (B-3)) were prepared in the same manner as in Reference Example 1 except that the copolymerization reaction was carried out under the different polymerization conditions.

The molar ratio of the units derived from ethylene to the units derived from the $\alpha$-olefin, iodine value, intrinsic viscosity ($\eta$), D value, B value, Tg and g$\eta$* value of the copolymer rubbers are set forth in Table 1.

Reference Example 4

An ethylene/$\alpha$-olefin/nonconjugated polyene copolymer rubber (copolymer rubber (B-4)) was obtained in the same manner as in Reference Example 1 except that the following zirconium compound was used as a catalyst.

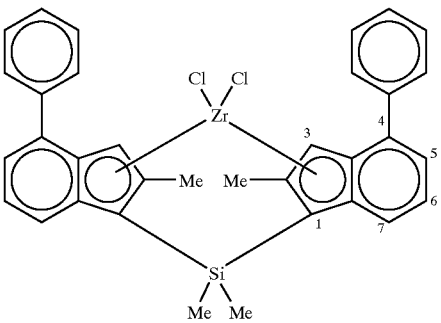

rac-Dimethylsilylene-bis{1-(2-methyl-4-phenylindenyl)}zirconium dichloride

The molar ratio of the units derived from ethylene to the units derived from the $\alpha$-olefin, iodine value, intrinsic viscosity ($\eta$), D value, B value, Tg and g$\eta$* value of the copolymer rubber are set forth in Table 1.

TABLE 1

|  | Ref. Ex. 1 | Ref. Ex. 2 | Ref. Ex. 3 | Ref. Ex. 4 |
| --- | --- | --- | --- | --- |
| Copolymer rubber | B-1 | B-2 | B-3 | B-4 |
| $\alpha$-Olefin | 1-butene | 1-octene | 1-butene | 1-butene |
| Ethylene/$\alpha$-Olefin (by mol) | 79/21 | 82/18 | 70/30 | 79/21 |
| Iodine value | 10 | 13 | 12 | 13 |
| ($\eta$) (dl/g) | 2.7 | 2.7 | 2.9 | 2.6 |
| D value | <0.01 | <0.01 | <0.01 | <0.01 |
| B value | 1.1 | 1.1 | 1.1 | 1.1 |
| Tg (° C.) | −56 | −54 | −59 | −56 |
| g$\eta$* value | 0.98 | 0.99 | 0.98 | 0.67 |

Examples Relating to Non-crosslinked Thermoplastic Elastomer Compositions

Example 1

50 Parts by weight of the ethylene/1-butene/5-ethylidene-2-norbornene copolymer rubber (B-1) obtained in Reference Example 1 and 50 parts by weight of a propylene homopolymer (A-1) having MFR (ASTM D 1238-65T, 230° C.) of 11 g/10 min and a density of 0.91 g/cm$^3$ were kneaded at 180° C. for 10 minutes by means of a Banbury mixer. The kneadate (which was an olefin thermoplastic elastomer composition) was passed through open rolls, and the resulting sheet was cut by a sheet cutter to obtain square pellets.

The pellets were injection molded to prepare a given specimen, and the properties (tensile strength, elongation at break and elongation set) of the specimen were measured by the methods previously described.

The results are set forth in Table 2.

Example 2

An olefin thermoplastic elastomer composition was prepared in the same manner as in Example 1 except that the ethylene/1-octene/5-ethylidene-2-norbornene copolymer rubber (B-2) obtained in Reference Example 2 was used in place of the ethylene/1-butene/5-ethylidene-2-norbornene copolymer rubber (B-1). The properties of the olefin thermoplastic elastomer composition were measured by the methods previously described.

The results are set forth in Table 2.

Example 3

An olefin thermoplastic elastomer composition was prepared in the same manner as in Example 1 except that the ethylene/1-butene/5-ethylidene-2-norbornene copolymer rubber (B-3) obtained in Reference Example 3 was used in place of the ethylene/1-butene/5-ethylidene-2-norbornene copolymer rubber (B-1). The properties of the olefin thermoplastic elastomer composition were measured by the methods previously described.

The results are set forth in Table 2.

Example 4

An olefin thermoplastic elastomer composition was prepared in the same manner as in Example 1 except that the ethylene/1-butene/5-ethylidene-2-norbornene (B-4) copolymer rubber obtained in Reference Example 4 was used in place of the ethylene/1-butene/5-ethylidene-2-norbornene copolymer rubber (B-1). The properties of the olefin thermoplastic elastomer composition were measured by the methods previously described.

The results are set forth in Table 2.

Comparative Example 1

An olefin thermoplastic elastomer composition was prepared in the same manner as in Example 1 except that an ethylene/propylene/5-ethylidene-2-norbornene copolymer rubber (EPDM-1), which has an ethylene content of 80% by mol, an iodine value of 10 and an intrinsic viscosity ($\eta$) of 2.8 dl/g and which was produced by using a catalyst having no aforesaid metallocene compound, was used in place of the ethylene/1-butene/5-ethylidene-2-norbornene copolymer rubber (B-1). The properties of the olefin thermoplastic elastomer composition were measured by the methods previously described.

The results are set forth in Table 2.

TABLE 2

|  | Ex. 1 | Ex. 2 | Ex. 3 | Ex. 4 | Comp. Ex. 1 |
|---|---|---|---|---|---|
| Tensile strength (kg/cm$^2$) | 103 | 98 | 107 | 106 | 79 |
| Elongation at break (%) | 530 | 550 | 510 | 570 | 410 |
| Elongation set (%) | 34 | 31 | 35 | 32 | 46 |

Example 5

An olefin thermoplastic elastomer composition was prepared in the same manner as in Example 1 except that the amount of the ethylene/1-butene/5-ethylidene-2-norbornene copolymer rubber (B-1) and the amount of the propylene homopolymer (A-1) were varied to 75 parts by weight and 25 parts by weight, respectively. The properties of the olefin thermoplastic elastomer composition were measured by the methods previously described.

The results are set forth in Table 3.

Comparative Example 2

An olefin thermoplastic elastomer composition was prepared in the same manner as in Example 5 except that the ethylene/propylene/5-ethylidene-2-norbornene copolymer rubber (EPDM-1) of Comparative Example 1 was used in place of the ethylene/1-butene/5-ethylidene-2-norbornene copolymer rubber (B-1). The properties of the olefin thermoplastic elastomer composition were measured by the methods previously described.

The results are set forth in Table 3.

TABLE 3

|  | Ex. 5 | Comp. Ex. 2 |
|---|---|---|
| Tensile strength (kg/cm$^2$) | 38 | 29 |
| Elongation at break (%) | 620 | 390 |
| Elongation set (%) | 11 | 16 |

Example 6

An olefin thermoplastic elastomer composition was prepared in the same manner as in Example 1 except that 40 parts by weight of a mineral oil type softener (trade name: PW-380, available from Idemitsu Kosan Co., Ltd.) and 20 parts by weight of talc (trade name: ET-5, available from Matsumura Sangyo K.K.) were further compounded in addition to the ethylene/1-butene/5-ethylidene-2-norbornene copolymer rubber (B-1) and the propylene homopolymer (A-1). The properties of the olefin thermoplastic elastomer composition were measured by the methods previously described.

The results are set forth in Table 4.

Comparative Example 3

An olefin thermoplastic elastomer composition was prepared in the same manner as in Example 6 except that the ethylene/propylene/5-ethylidene-2-norbornene copolymer rubber (EPDM-1) of Comparative Example 1 was used in place of the ethylene/1-butene/5-ethylidene-2-norbornene copolymer rubber (B-1). The properties of the olefin thermoplastic elastomer composition were measured by the methods previously described.

The results are set forth in Table 4.

TABLE 4

|  | Ex. 6 | Comp. Ex. 3 |
|---|---|---|
| Tensile strength (kq/cm$^2$) | 164 | 135 |
| Elongation at break (%) | 560 | 430 |
| Elongation set (%) | 33 | 46 |

Examples Relating to Partially or Completely Crosslinked Thermoplastic Elastomer Compositions Example 7

To 50 parts by weight of the ethylene/1-butene/5-ethylidene-2-norbornene copolymer rubber (B-1) obtained in Reference Example 1 and 50 parts by weight of the propylene homopolymer (A-1) of Example 1 were added 0.2 part by weight of organic peroxide (2,5-dimethyl-2,5-di(tert-butylperoxy)hexyne-3) and 0.3 part by weight of divinylbenzene (DVB), and they were sufficiently mixed in a Henschel mixer. The mixture was kneaded at 180° C. for 10 minutes by means of a Banbury mixer. The kneadate which was an olefin thermoplastic elastomer composition was passed through open rolls, and the resulting sheet was cut by a sheet cutter to obtain square pellets.

The pellets were injection molded to prepare a given specimen, and the properties of the specimen were measured by the methods previously described.

The results are set forth in Table 5.

Example 8

An olefin thermoplastic elastomer composition was prepared in the same manner as in Example 7 except that the ethylene/1-octene/5-ethylidene-2-norbornene copolymer rubber (B-2) was used in place of the ethylene/1-butene/5-ethylidene-2-norbornene copolymer rubber (B-1). The properties of the olefin thermoplastic elastomer composition were measured by the methods previously described.

The results are set forth in Table 5.

Example 9

An olefin thermoplastic elastomer composition was prepared in the same manner as in Example 7 except that the ethylene/1-butene/5-ethylidene-2-norbornene copolymer rubber (B-3) was used in place of the ethylene/1-butene/5-ethylidene-2-norbornene copolymer rubber (B-1). The properties of the olefin thermoplastic elastomer composition were measured by the methods previously described.

The results are set forth in Table 5.

Comparative Example 4

An olefin thermoplastic elastomer composition was prepared in the same manner as in Example 7 except that the ethylene/propylene/5-ethylidene-2-norbornene copolymer rubber (EPDM-1) of Comparative Example 1 was used in place of the ethylene/1-butene/5-ethylidene-2-norbornene copolymer rubber (B-1). The properties of the olefin thermoplastic elastomer composition were measured by the methods previously described.

The results are set forth in Table 5.

TABLE 5

|  | Ex. 7 | Ex. 8 | Ex. 9 | Comp. Ex. 4 |
|---|---|---|---|---|
| Tensile strength (kg/cm$^2$) | 254 | 240 | 260 | 178 |
| Elongation at break (%) | 620 | 600 | 640 | 510 |
| Elongation set (%) | 25 | 23 | 26 | 42 |
| Gel content (% by weight) | 70 | 68 | 72 | 48 |

Example 10

An olefin thermoplastic elastomer composition was prepared in the same manner as in Example 7 except that the amount of the ethylene/1-butene/5-ethylidene-2-norbornene copolymer rubber (B-1) and the amount of the propylene homopolymer (A-1) were varied to 75 parts by weight and 25 parts by weight, respectively. The properties of the olefin thermoplastic elastomer composition were measured by the methods previously described.

The results are set forth in Table 6.

Example 11

An olefin thermoplastic elastomer composition was prepared in the same manner as in Example 10 except that the ethylene/1-butene/5-ethylidene-2-norbornene copolymer rubber (B-4) was used in place of the ethylene/1-butene/5-ethylidene-2-norbornene copolymer rubber (B-1). The properties of the olefin thermoplastic elastomer composition were measured by the methods previously described.

The results are set forth in Table 6.

Comparative Example 5

An olefin thermoplastic elastomer composition was prepared in the same manner as in Example 10 except that the ethylene/propylene/5-ethylidene-2-norbornene copolymer rubber (EPDM-1) of Comparative Example 1 was used in place of the ethylene/1-butene/5-ethylidene-2-norbornene copolymer rubber (B-1). The properties of the olefin thermoplastic elastomer composition were measured by the methods previously described.

The results are set forth in Table 6.

TABLE 6

|  | Ex. 10 | Ex. 11 | Comp. Ex. 5 |
|---|---|---|---|
| Tensile strength (kg/cm$^2$) | 66 | 64 | 46 |
| Elongation at break (%) | 680 | 650 | 490 |
| Elongation set (%) | 4 | 3 | 8 |
| Gel content (% by weight) | 71 | 73 | 49 |

Example 12

An olefin thermoplastic elastomer composition was prepared in the same manner as in Example 7 except that 40 parts by weight of a mineral oil type softener (trade name: PW-380, available from Idemitsu Kosan Co., Ltd.) and 20 parts by weight of talc (trade name: ET-5, available from Matsumura Sangyo K.K.) were further compounded in addition to the ethylene/1-butene/5-ethylidene-2-norbornene copolymer rubber (B-1) and the propylene homopolymer (A-1). The properties of the olefin thermoplastic elastomer composition were measured by the methods previously described.

The results are set forth in Table 7.

Comparative Example 6

An olefin thermoplastic elastomer composition was prepared in the same manner as in Example 12 except that the ethylene/propylene/5-ethylidene-2-norbornene copolymer rubber (EPDM-1) of Comparative Example 1 was used in place of the ethylene/1-butene/5-ethylidene-2-norbornene copolymer rubber (B-1). The properties of the olefin thermoplastic elastomer composition were measured by the methods previously described.

The results are set forth in Table 7.

TABLE 7

|  | Ex. 12 | Comp. Ex. 6 |
|---|---|---|
| Tensile strength (kg/cm$^2$) | 256 | 220 |
| Elongation at break (%) | 630 | 550 |
| Elongation set (%) | 24 | 30 |
| Gel content (% by weight) | 69 | 50 |

Examples 13–19 Relating to Other Olefin Thermoplastic Elastomer Compositions of the Invention, Comparative Examples 7–10

Described below are starting materials used for preparing the olefin thermoplastic elastomer compositions in the following examples.

Crystalline Polyolefin Resin (E)
(E-1) Propylene/ethylene copolymer
  (1) ethylene content: 3% by mol
  (2) MFR (ASTM D 1238-65T, 230° C., load of 2.16 kg): 25 g/10 min
Olefin Rubber (G)
(G-1) Ethylene/propylene/5-ethylidene-2-norbornene copolymer rubber
  (1) ethylene content: 78% by mol
  (2) iodine value: 8.2
  (3) Mooney viscosity ($ML_{1+4}$(100° C.)): 62
(G-2) Butyl rubber
  (1) degree of unsaturation: 0.7% by mol
  (2) Mooney viscosity ($ML_{1+4}$(100° C.)): 55
(G-3) Ethylene/propylene copolymer rubber
  (1) density: 0.868 g/cm$^3$
  (2) ethylene content: 81% by mol
  (3) MFR (ASTM D 1238-65T, 190° C., load of 2.16 kg): 0.4 g/10 min
  (4) intrinsic viscosity ($\eta$) as measured in decalin at 135° C: 2.2 dl/g
  (5) mean molecular weight distribution (Mw/Mn): 2.19
  (6) flow index (FI): 70 sec$^{-1}$
Softener (H)
(H-1) Mineral oil type process oil
  trade name: PW-380, available from Idemitsu Kosan Co., Ltd.

Reference Example 5

Preparation of Catalyst Solution

In a dark place, 51 g of the rac-dimethylsilylene-bis{1-(2-methyl-4-phenylindenyl)}zirconium dichloride represented by the aforesaid formula, 1.57 liters of a toluene solution of methylaluminooxane (aluminum: 1.1 mol/l) and 2.76 liters of toluene were mixed under stirring at room temperature for 30 minutes to prepare a catalyst solution.

Polyperization

In a continuous solution polymerization apparatus, copolymerization of ethylene and 1-octene was carried out under the conditions of a total pressure of 6 kg/cm$^2$-G and a polymerization temperature of 90° C. Then, to the system were continuously fed the catalyst solution obtained above at a feed rate of 0.02 mmol/hr (in terms of zirconium atom) and triisobutylaluminum at a feed rate of 10 mmol/hr to perform polymerization. During the polymerization, ethylene, 1-octene and hydrogen were continuously fed to keep the monomer ratio constant (monomer ratio in gas state (by mol): ethylene/1-octene 0.83, hydrogen/ethylene= 0.002).

Thus, an ethylene/1-octene copolymer rubber (F-1) was obtained in an yield of 5 kg per hour.

The copolymer rubber (F-1) thus obtained had a molar ratio of the units derived from ethylene to the units derived from 1-octene of 83/17 (ethylene/1-octene).

The copolymer rubber had a density of 0.861 g/cm$^3$, MFR of 0.4 g/10 min, an intrinsic viscosity (i), as measured in decalin at 135° C., of 2.0 dl/g, an intensity ratio D of T$\alpha\beta$ to T$\alpha\alpha$ in the $^{13}$C-NMR spectrum of 0.01, a B value of 1.1, a glass transition temperature (Tg) of −65° C., a g$\eta$* value of 0.84, a mean molecular weight distribution (Mw/Mn) of 2.2 and a flow index (FI) of 125 sec$^{-1}$.

The flow index (FI) is defined as a shear rate given when the shear stress at 190° C. reaches 2.4×10$^6$ dyne/cm$^2$. The flow index (FI) of a resin can be determined in the following manner. The resin is extruded from a capillary with varying a shear rate to measure a shear stress, and the shear rate which corresponds to the shear stress of the above-mentioned value 2.4×10$^6$ dyne/cm$^2$ gives the flow index (F1). In the following examples, the flow index (FI) of the pellets was determined under the conditions of a resin temperature of 190° C. and a shear stress measured about 5×10$^4$ to 3×10$^6$ dyne/cm$^2$ by means of a capillary flow property tester manufactured by Toyo Seiki Seisakusho K.K.

The results are set forth in Table 8.

Reference Example 6

An ethylene/1-butene copolymer rubber (F-2) was prepared in the same manner as in Reference Example 5 except that the copolymerization reaction was carried out under the different polymerization conditions.

The molar ratio of the units derived from ethylene to the units derived from 1-butene, iodine value, intrinsic viscosity ($\eta$), D value, B value, Tg, g$\eta$* value, Mw/Mn and FI of the copolymer rubber (F-2) are set forth in Table 8.

TABLE 8

|  | Ref. Ex. 5 | Ref. Ex. 6 |
| --- | --- | --- |
| Copolymer rubber | F-1 | F-2 |
| α-Olefin | 1-octene | 1-butene |
| Ethylene/α-Olefin (by mol) | 83/17 | 80/20 |
| Density (g/cm$^3$) | 0.861 | 0.865 |
| MFR (g/10 min) | 0.4 | 0.6 |
| ($\eta$) (dl/g) | 2.0 | 1.7 |
| D value | 0.01 | 0.01 |
| B value | 1.1 | 1.0 |
| Tg (° C.) | −65 | −64 |
| g$\eta$* value | 0.84 | 0.82 |
| Mw/Mn | 2.2 | 2.1 |
| FI (sec$^{-1}$) | 125 | 175 |

Remarks:
(F-1), (F-2): long-chain branched copolymer rubber

Example 13

40 Parts by weight of pellets of the propylene/ethylene copolymer (E-1) and 60 parts by weight of pellets of the ethylene/1-octene random copolymer (F-1) were kneaded at 180° C. for 5 minutes in a nitrogen atmosphere by means of a Banbury mixer. The resulting kneadate was passed through rolls to give a sheet, and the sheet was cut by a shear cutter into square pellets.

Then, 100 parts by weight of the square pellets, 0.3 part by weight of 2,5-di(t-butylperoxy)hexane and 0.4 part by weight of divinylbenzene were mixed under stirring by means of a Henschel mixer, and the resulting mixture was extruded at 220° C. in a nitrogen atmosphere by means of a twin-screw extruder having L/D of 30 and a screw diameter of 50 mm, to prepare pellets of a thermoplastic elastomer composition.

From the pellets of the thermoplastic elastomer composition, a given specimen was prepared by means of an injection molding machine, and the properties of the specimen were measured by the methods previously described.

The results are set forth in table 9.

Example 14

Pellets of a thermoplastic elastomer composition were prepared in the same manner as in Example 13 except that 60 parts by weight of the ethylene/1-butene copolymer rubber (F-2) was used in place of the ethylene/1-octene copolymer rubber (F-1).

From the pellets of the thermoplastic elastomer composition, a specimen was prepared in the same manner as in Example 13, and the properties of the specimen were measured by the methods previously described.

The results are set forth in table 9.

Example 15

Pellets of a thermoplastic elastomer composition were prepared in the same manner as in Example 13 except that 20 parts by weight of the pellets of the propylene/ethylene copolymer (E-1), 60 parts by weight of the pellets of the ethylene/1-octene copolymer rubber (F-1) and 20 parts by weight of the ethylene/propylene/5-ethylidene-2-norbornene copolymer rubber (G-1) were used.

From the pellets of the thermoplastic elastomer composition, a specimen was prepared in the same manner as in Example 13, and the properties of the specimen were measured by the methods previously described.

The results are set forth in table 9.

Example 16

Pellets of a thermoplastic elastomer composition were prepared in the same manner as in Example 15 except that 20 parts by weight of the butyl rubber (G-2) was used in place of the ethylene/propylene/5-ethylidene-2-norbornene copolymer rubber (G-1).

From the pellets of the thermoplastic elastomer composition, a specimen was prepared in the same manner as in Example 15, and the properties of the specimen were measured by the methods previously described.

The results are set forth in table 9.

Example 17

Pellets of a thermoplastic elastomer composition were prepared in the same manner as in Example 13 except that 17 parts by weight of the pellets of the propylene/ethylene copolymer (E-1), 50 parts by weight of the pellets of the ethylene/1-octene copolymer rubber (F-1), 17 parts by weight of the butyl rubber (G-2) and 16 parts by weight of the mineral oil type process oil (H-1) were used.

From the pellets of the thermoplastic elastomer composition, a specimen was prepared in the same manner as in Example 13, and the properties of the specimen were measured by the methods previously described.

The results are set forth in table 9.

Comparative Example 7

Pellets of a thermoplastic elastomer composition were prepared in the same manner as in Example 13 except that 60 parts by weight of the ethylene/propylene copolymer rubber (G-3) was used in place of the ethylene/1-octene copolymer rubber (F-1).

From the pellets of the thermoplastic elastomer composition, a specimen was prepared in the same manner as in Example 13, and the properties of the specimen were measured by the methods previously described.

The results are set forth in table 9.

Comparative Example 8

Pellets of a thermoplastic elastomer composition were prepared in the same manner as in Example 15 except that 60 parts by weight of the ethylene/propylene copolymer rubber (G-3) was used in place of the ethylene/1-octene copolymer rubber (F-1).

From the pellets of the thermoplastic elastomer composition, a specimen was prepared in the same manner as in Example 15, and the properties of the specimen were measured by the methods previously described.

The results are set forth in table 9.

Comparative Example 9

Pellets of a thermoplastic elastomer composition were prepared in the same manner as in Example 16 except that 60 parts by weight of the ethylene/propylene copolymer rubber (G-3) was used in place of the ethylene/1-octene copolymer rubber (F-1).

From the pellets of the thermoplastic elastomer composition, a specimen was prepared in the same manner as in Example 16, and the properties of the specimen were measured by the methods previously described.

The results are set forth in table 9.

Comparative Example 10

Pellets of a thermoplastic elastomer composition were prepared in the same manner as in Example 17 except that 50 parts by weight of the ethylene/propylene copolymer rubber (G-3) was used in place of the ethylene/1-octene copolymer rubber (F-1).

From the pellets of the thermoplastic elastomer composition, a specimen was prepared in the same manner as in Example 17, and the properties of the specimen were measured by the methods previously described.

The results are set forth in table 9.

TABLE 9

|  | Example 13 | Example 14 | Example 15 | Example 16 | Example 17 | Comparative Example 7 | Comparative Example 8 | Comparative Example 9 | Comparative Example 10 |
|---|---|---|---|---|---|---|---|---|---|
| Crystalline polyolefin resin E-1 | 40 | 40 | 20 | 20 | 17 | 40 | 20 | 20 | 17 |
| Ethylene/α-olefin copolymer |  |  |  |  |  |  |  |  |  |
| F-1 | 60 | — | 60 | 60 | 50 | — | — | — | — |
| F-2 | — | 60 | — | — | — | — | — | — | — |

TABLE 9-continued

| | Example 13 | Example 14 | Example 15 | Example 16 | Example 17 | Comparative Example 7 | Comparative Example 8 | Comparative Example 9 | Comparative Example 10 |
|---|---|---|---|---|---|---|---|---|---|
| Olefin rubber | | | | | | | | | |
| G-1 | — | — | 20 | — | — | — | 20 | — | — |
| G-2 | — | — | — | 20 | 17 | — | — | 20 | 17 |
| G-3 | — | — | — | — | — | 60 | 60 | 60 | 50 |
| Softener H-1 | — | — | — | — | 16 | — | — | — | 16 |
| POX | 0.3 | 0.3 | 0.3 | 0.3 | 0.3 | 0.3 | 0.3 | 0.3 | 0.3 |
| DVB | 0.4 | 0.4 | 0.4 | 0.4 | 0.4 | 0.4 | 0.4 | 0.4 | 0.4 |
| JIS Hardness | 91 | 92 | 73 | 63 | 60 | 94 | 78 | 65 | 61 |
| Tensile strength (MPa) | 15.3 | 12.4 | 7.2 | 4.4 | 4.2 | 6.9 | 4.0 | 2.8 | 2.1 |
| Tensile elongation (%) | 640 | 520 | 480 | 420 | 390 | 290 | 280 | 220 | 190 |
| Gel content (%) | 78 | 80 | 76 | 73 | 74 | 80 | 75 | 72 | 73 |

Note 1:
POX: 2,5-di-(t-butylperoxy)hexane
DVB: divinylbenzene
Note.2:
The quantities of the components of the compostions are expressed by "part(s) by weight".

Reference Example 7

Preparation of Ethylene/1-octene Copolymer Rubber Preparation of Catalyst Solution To a glass flask thoroughly purged with nitrogen, 0.5 mg of bis(1,3-dimethylcyclopentadienyl)zirconium dichloride was introduced. To the flask were added 1.57 ml of a toluene solution of methylaluminooxane (Al: 1.1 mol/l) and 2.76 ml of toluene to obtain a catalyst solution.

Polymerization

To a 2 liter stainless steel autoclave thoroughly purged with nitrogen, 600 ml of hexane and 400 ml of 1-octene were introduced, and the temperature of the system was elevated to 80° C. Then, 1 mmol of triisobutylaluminum and 0.5 ml (0.001 mmol in terms of Zr) of the catalyst solution prepared above were injected into the autoclave together with ethylene to initiate polymerization. Thereafter, only ethylene was continuously fed to maintain the total pressure at 4.0 kg/cm²-G, and the polymerization was performed at 90° C. for 30 minutes. Then, a small amount of ethanol was fed to the system to terminate the polymerization, and the unreacted ethylene was purged out. The reaction solution was introduced into a large excess of methanol to precipitate a polymer. The polymer was separated by filtration and dried overnight under reduced pressure, to obtain a linear ethylene/1-octene copolymer rubber (F-3).

The copolymer rubber (F-3) thus obtained had a molar ratio of the units derived from ethylene to the units derived from 1-octene of 90/10 (ethylene/1-octene), a density of 0.885 g/cm³, MFR of 3.5 g/10 min, an intrinsic viscosity [η], as measured in decalin at 135° C., of 1.5 dl/g, a glass transition temperature (Tg) of −58° C., a crystallinity, as measured by X-ray diffractometry, of 14%, a mean molecular weight distribution (Mw/Mn), as measured by GPC, of 2.5, a D value of not more than 0.01, a B value of 1.03 and a gη* value of 1.00. These properties are set forth in Table 10.

Reference Example 8

Polymerization was carried out in the same manner as in Reference Example 7 except that 1-butene was used in place of 1-octene and the polymerization pressure and the polymerization temperature were varied to 20 kg/cm²-G and 110° C., respectively, to obtain an ethylene/1-butene copolymer rubber (F-4).

The copolymer rubber (F-4) thus obtained had a molar ratio of the units derived from ethylene to the units derived from 1-butene of 88/12 (ethylene/1-butene), a density of 0.886 g/cm³, MFR of 3.5 g/l min, an intrinsic viscosity (i), as measured in decalin at 135° C., of 1.5 dl/g, a glass transition temperature (Tg) of −57° C., a crystallinity, as measured by X-ray diffractometry, of 10%, a mean molecular weight distribution (Mw/Mn), as measured by GPC, of 2.2, a D value of not more than 0.01, a B value of 1.02 and a gη* value of 1.00. These properties are set forth in Table 10.

TABLE 10

| | Ref. Ex. 7 | Ref. Ex. 8 |
|---|---|---|
| Copolymer rubber | F-3 | F-4 |
| α-Olefin | 1-octene | 1-butene |
| Ethylene/α-Olefin (by mol) | 90/10 | 88/12 |
| Density (g/cm³) | 0.885 | 0.886 |
| MFR (g/10 min) | 3.5 | 3.5 |
| (η) (dl/g) | 1.5 | 1.5 |
| D value | ≦0.01 | ≦0.01 |
| B value | 1.03 | 1.02 |
| Tg (° C.) | −58 | −57 |
| Crystallinity (%) | 14 | 10 |
| gη* value | 1.00 | 1.00 |
| Mw/Mn | 2.5 | 2.2 |

Remarks:
(F-3), (F-4): linear copolymer rubber

Example 18

Pellets of a thermoplastic elastomer composition were prepared in the same manner as in Example 13 except that 60 parts by weight of the ethylene/1-octene copolymer rubber (F-3) prepared in Reference Example 7 was used in place of the ethylene/1-octene copolymer rubber (F-1).

From the pellets of the thermoplastic elastomer composition, a specimen was prepared in the same manner as in Example 13, and the properties of the specimen were measured by the methods previously described.

The results are set forth in table 11.

Example 19

Pellets of a thermoplastic elastomer composition were prepared in the same manner as in Example 13 except that 60 parts by weight of the ethylene/1-butene copolymer rubber (F-4) prepared in Reference Example 8 was used in place of the ethylene/1-octene copolymer rubber (F-1).

From the pellets of the thermoplastic elastomer composition, a specimen was prepared in the same manner as in Example 13, and the properties of the specimen were measured by the methods previously described.

The results are set forth in table 11.

TABLE 11

|  | Ex. 18 | Ex. 19 |
|---|---|---|
| Crystalline polyolefin resin E-1 | 40 | 40 |
| Ethylene/α-olefin copolymer |  |  |
| F-3 | 60 | — |
| F-4 | — | 60 |
| Olefin rubber |  |  |
| G-1 | — | — |
| G-2 | — | — |
| G-3 | — | — |
| Softener | — | — |
| H-1 |  |  |
| POX | 0.3 | 0.3 |
| DVB | 0.4 | 0.4 |
| JIS A Hardness | 92 | 94 |
| Tensile strength (MPa) | 16.4 | 14.5 |
| Tensile elongation (%) | 610 | 480 |
| Gel content (%) | 78 | 79 |

Remarks:
POX: 2,5-di(t-butylperoxy)hexane
DVB: divinylbenzene
The quantities of the components of the compositions are expressed by "part(s) by weight".

What is claimed is:

1. An olefin thermoplastic elastomer composition comprising a crystalline polyolefin resin (A) in an amount of not less than 10 parts by weight and less than 60 parts by weight and an ethylene/α-olefin/nonconjugated polyene copolymer rubber (B) which comprises ethylene, an α-olefin of 3 to 20 carbon atoms and a nonconjugated polyene in an amount of not more than 90 parts by weight and more than 40 parts by weight, the total amount of said components (A) and (B) being 100 parts by weight, and which is dynamically heat treated to be partially or completely crosslinked, wherein the ethylene/α-olefin/nonconjugated polyene copolymer rubber (B) is obtained by random copolymerizing ethylene, an α-olefin of 3 to 20 carbon atoms and a nonconjugated polyene in the presence of a metallocene catalyst, wherein said polyene contains only one carbon-to-carbon double bond, in one molecule, polymerizable by the metallocene catalyst among carbon-to carbon double bonds, wherein said copolymer rubber (B) has a long-chain branched structure, and has the following properties:

(1) said copolymer rubber contains (a) units derived from ethylene and (b) units derived from the α-olefin of 3 to 20 carbon atoms in a molar ratio of 40/60 to 95/5;

(2) the iodine value is in the range of 1 to 50, in terms of grams based on 100 grams of the copolymer rubber (B);

(3) the intrinsic viscosity (η), as measured in decalin at 135° C., is in the range of 0.1 dl/g to 10 dl/g; and (4) the ratio gη* of the intrinsic viscosity (η) of said copolymer rubber (B) determined in the property (3) to the intrinsic viscosity $(\eta)_{blank}$ of a linear ethylene/propylene copolymer having the same weight-average molecular weight, measured by a light scattering method, as the copolymer rubber (B) and having an ethylene content of 70% by mol, $(\eta)/(\eta)_{blank}$, is 0.2 to 0.95.

2. The olefin thermoplastic elastomer composition as claimed in claim 1, wherein the ethylene/α-olefin/nonconjugated polyene copolymer rubber (B) has the following further properties:

(5) the intensity ratio D of Tαβ to Tαα in the $^{13}$C-NMR spectrum, Tαβ/Tαα, is not more than 0.5; and (6) the B value, as determined by the $^{13}$C-NMR spectrum and the following equation, is in the range of 1.00 to 1.50;

$$B \text{ value} = (P_{OE})/(2 \cdot (P_E \cdot P_O))$$

wherein ($P_E$) is a molar fraction of the units derived from ethylene (a) in the copolymer rubber (B), ($P_O$) is a molar fraction of the units derived from the α-olefin (b) in the copolymer rubber (B), and ($P_{OE}$) is a proportion of the number of the α-olefin/ethylene sequences to the number of all the dyad sequences in the copolymer rubber (B).

3. The olefin thermoplastic elastomer composition of claim 1 wherein the dynamic heat treatment is carried out at a temperature of 150 to 250° C. for 1 to 20 minutes.

4. The olefin thermoplastic elastomer composition of claim 1 wherein the metallocene catalyst is rac-Dimethylsilylene-bis(1-(2-methyl-4-phenylindenyl) zirconium dichloride.

5. The olefin thermoplastic elastomer composition of claim 1, wherein the metallocene catalyst is represented by the following formula (II):

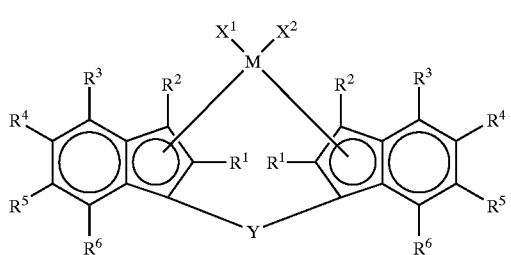

wherein M is a transition metal atom of Group IVB of the periodic table, $R^1$ is a hydrocarbon group of 1 to 6 carbon atoms, $R^2$, $R^4$, $R^5$ and $R^6$ may be the same as or different from each other, and are each hydrogen, a halogen atom or a hydrocarbon group of 1 to 6 carbon atoms, $R^3$ is an aryl group of 6 to 16 carbon atoms, $X^1$ and $X^2$ are each hydrogen, a halogen atom, a hydrocarbon group of 1 to 20 carbon atoms optionally substituted with halogen, an oxygen-containing group or a sulfur-containing group, Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, —NR$^7$—, —P(R$^7$)—, —P(O)(R$^7$)—, —BR$^7$— or —AlR$^7$, in which R$^7$ is hydrogen, a halogen atom, a hydrocarbon group of 1 to 20 carbon atoms, or a halogenated by hydrocarbon group of 1 to 20 carbon atoms.

\* \* \* \* \*